(12) United States Patent
You et al.

(10) Patent No.: US 9,466,261 B2
(45) Date of Patent: Oct. 11, 2016

(54) DISPLAY DEVICE AND DRIVING METHOD THEREOF

(71) Applicant: SAMSUNG DISPLAY CO., LTD., Yongin, Gyeonggi-Do (KR)

(72) Inventors: Bong Hyun You, Yongin-si (KR); Joon-Chul Goh, Hwaseong-si (KR); Uk Chul Choi, Cheonan-si (KR); Jung-Won Kim, Seoul (KR); Nam-Gon Choi, Asan-si (KR); Dong-Won Park, Hwaseong-si (KR)

(73) Assignee: SAMSUNG DISPLAY CO., LTD. (KR)

(*) Notice: Subject to any disclaimer, the term of this patent is extended or adjusted under 35 U.S.C. 154(b) by 864 days.

(21) Appl. No.: 13/691,446

(22) Filed: Nov. 30, 2012

(65) Prior Publication Data

US 2013/0321483 A1    Dec. 5, 2013

(30) Foreign Application Priority Data

May 31, 2012  (KR) .................. 10-2012-0058172
Jun. 29, 2012  (KR) .................. 10-2012-0070922

(51) Int. Cl.
*G09G 5/10* (2006.01)
*G09G 3/20* (2006.01)
(Continued)

(52) U.S. Cl.
CPC ............ *G09G 5/10* (2013.01); *G02F 1/134336* (2013.01); *G09G 3/2025* (2013.01);
(Continued)

(58) Field of Classification Search
CPC .... G09G 5/10; G09G 3/3659; G09G 3/2025; G09G 3/3651; G09G 3/2081; G09G 3/3607; G09G 3/2047; G09G 2300/0852; G09G 2300/0876; G09G 2300/0871; G09G 2320/0633; G09G 3/204; G09G 2300/0426; G09G 2320/0252; G09G 3/2022; G09G 2300/0809; G09G 2310/0237; G09G 2300/0447; G09G 2320/0673; G09G 2320/064; G09G 2320/0266; G09G 2320/068; G09G 2300/0804; G09G 2300/0861; G09G 3/3614; G02F 1/134336; G02F 2001/134345

See application file for complete search history.

(56) References Cited

U.S. PATENT DOCUMENTS 5,847,688 A   12/1998  Ohi et al.
7,095,394 B2   8/2006  Hong
(Continued)

FOREIGN PATENT DOCUMENTS

JP    2011007889 A    1/2011
KR   1020060132122 A   12/2006
(Continued)

OTHER PUBLICATIONS

European Search Report—European Patent Application No. 12194803.8 dated Aug. 20, 2015.

*Primary Examiner* — Aneeta Yodichkas
*Assistant Examiner* — Joseph Fox
(74) *Attorney, Agent, or Firm* — Cantor Colburn LLP

(57) ABSTRACT

A display device includes a memory which stores gamma data for gamma curves including a first gamma curve and a second gamma curve; a gray voltage generator which generates gray voltages based on the gamma data; a data driver which receives an input image signal from a signal controller and converts the input image signal into a data voltage using the gray voltages; and a display panel including pixels which receives the data voltage and may display an image, where the pixel displays images corresponding to the input image signal during one frame set, one frame set includes consecutive frames, the images displayed by a pixel includes first and second images displayed based on the first and second gamma curves, respectively, a luminance of the first image is not less than a luminance of the second image, and the second image is displayed in two consecutive frames.

73 Claims, 64 Drawing Sheets

(51) Int. Cl.
   *G09G 3/36*        (2006.01)
   *G02F 1/1343*      (2006.01)

(52) U.S. Cl.
   CPC .......... *G09G3/2074* (2013.01); *G09G 3/2081* (2013.01); *G09G 3/3607* (2013.01); *G09G 3/3651* (2013.01); *G02F 2001/134345* (2013.01); *G09G 3/204* (2013.01); *G09G 3/2022* (2013.01); *G09G 3/3614* (2013.01); *G09G 2300/0426* (2013.01); *G09G 2300/0447* (2013.01); *G09G 2300/0804* (2013.01); *G09G 2300/0809* (2013.01); *G09G 2300/0852* (2013.01); *G09G 2300/0861* (2013.01); *G09G 2300/0871* (2013.01); *G09G 2300/0876* (2013.01); *G09G 2310/0237* (2013.01); *G09G 2320/0252* (2013.01); *G09G 2320/0266* (2013.01); *G09G 2320/064* (2013.01); *G09G 2320/068* (2013.01); *G09G 2320/0633* (2013.01); *G09G 2320/0673* (2013.01)

(56) References Cited

U.S. PATENT DOCUMENTS

| | | | |
|---|---|---|---|
| 7,548,288 B2 | 6/2009 | Kim et al. | |
| 7,724,224 B2 | 5/2010 | Kwon et al. | |
| 7,764,294 B2 | 7/2010 | Lee | |
| 7,843,473 B2 | 11/2010 | Arimoto et al. | |
| 7,898,536 B2 | 3/2011 | Shin et al. | |
| 8,044,910 B2 | 10/2011 | Song et al. | |
| 8,130,188 B2 | 3/2012 | Shin | |
| 2006/0238471 A1* | 10/2006 | Kim | G09G 3/2074 345/89 |
| 2006/0238472 A1* | 10/2006 | Lee | G09G 3/3688 345/89 |
| 2007/0046601 A1* | 3/2007 | Shin | G09G 3/3607 345/89 |
| 2007/0052721 A1* | 3/2007 | Im | G09G 3/3607 345/613 |
| 2008/0024418 A1 | 1/2008 | Kim | |
| 2008/0094335 A1 | 4/2008 | Kim et al. | |
| 2008/0122814 A1* | 5/2008 | Shin | G09G 3/3648 345/204 |
| 2008/0129673 A1 | 6/2008 | Kim et al. | |
| 2008/0136761 A1 | 6/2008 | Hong et al. | |
| 2008/0246908 A1* | 10/2008 | Lee | G02F 1/134309 349/144 |
| 2009/0140964 A1 | 6/2009 | Chiang | |
| 2009/0153533 A1 | 6/2009 | Umeda et al. | |
| 2009/0167664 A1 | 7/2009 | Song et al. | |
| 2009/0167734 A1* | 7/2009 | Chian-Hung | G09G 3/2081 345/205 |
| 2009/0303167 A1 | 12/2009 | Mori et al. | |
| 2010/0007639 A1 | 1/2010 | Jeong et al. | |
| 2010/0033513 A1* | 2/2010 | Choi | G09G 3/3406 345/690 |
| 2010/0156964 A1* | 6/2010 | Masuda | G09G 3/342 345/691 |
| 2012/0105494 A1 | 5/2012 | Lee et al. | |
| 2012/0113154 A1* | 5/2012 | Ge | G09G 3/3614 345/690 |

FOREIGN PATENT DOCUMENTS

| | | |
|---|---|---|
| KR | 1020080062475 A | 7/2008 |
| KR | 1020090117510 A | 11/2009 |

\* cited by examiner

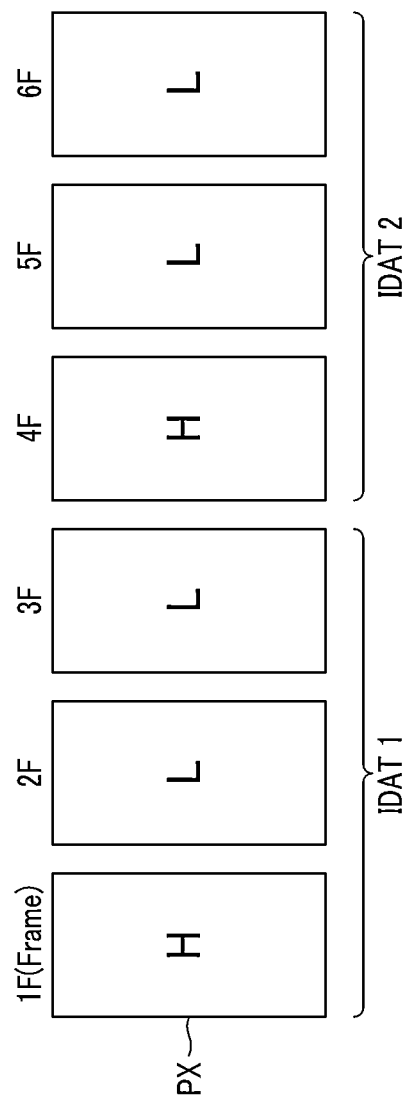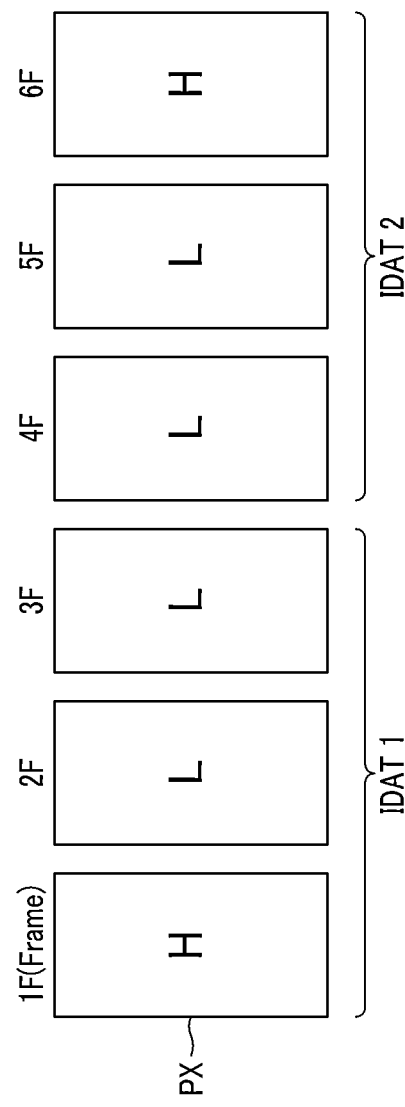

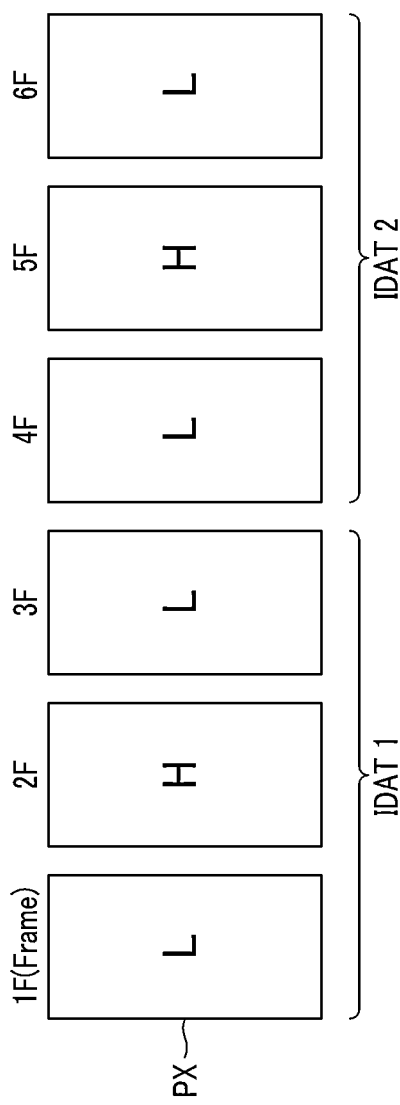
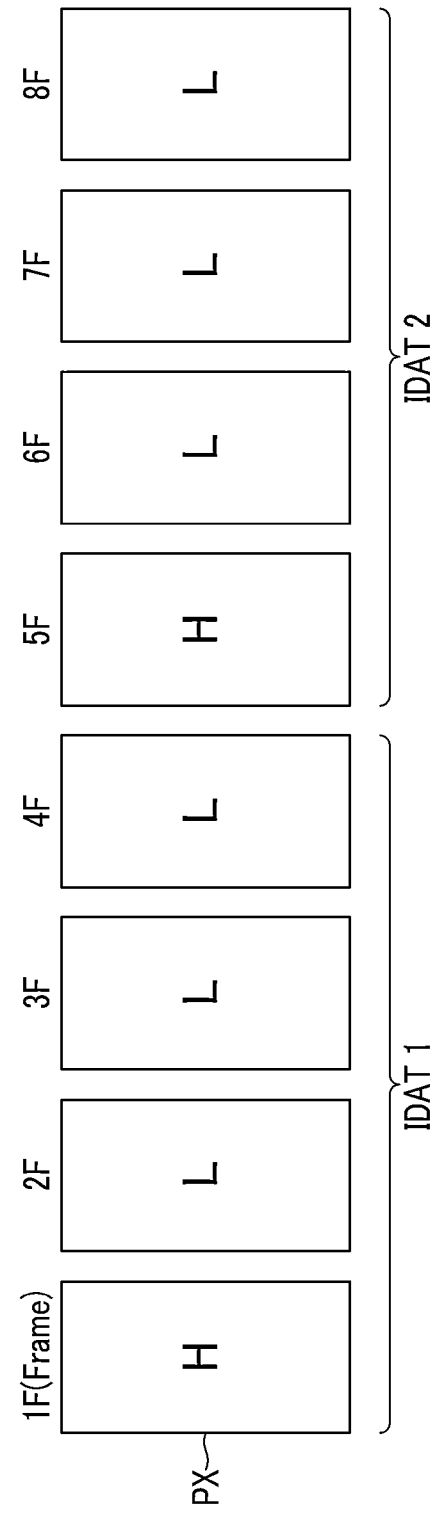

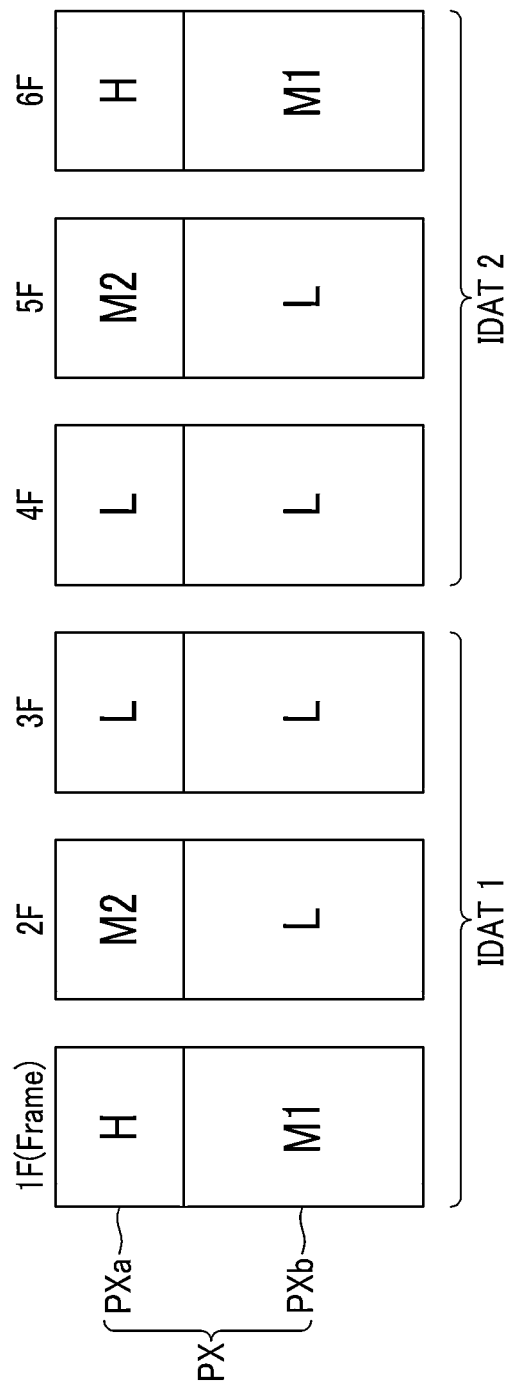

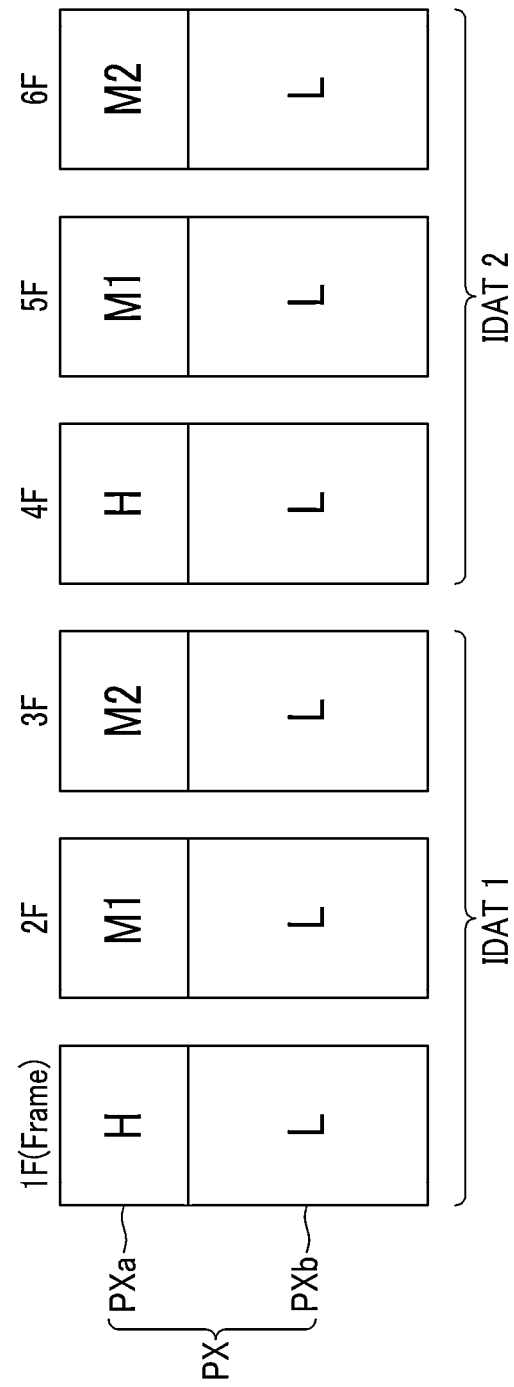

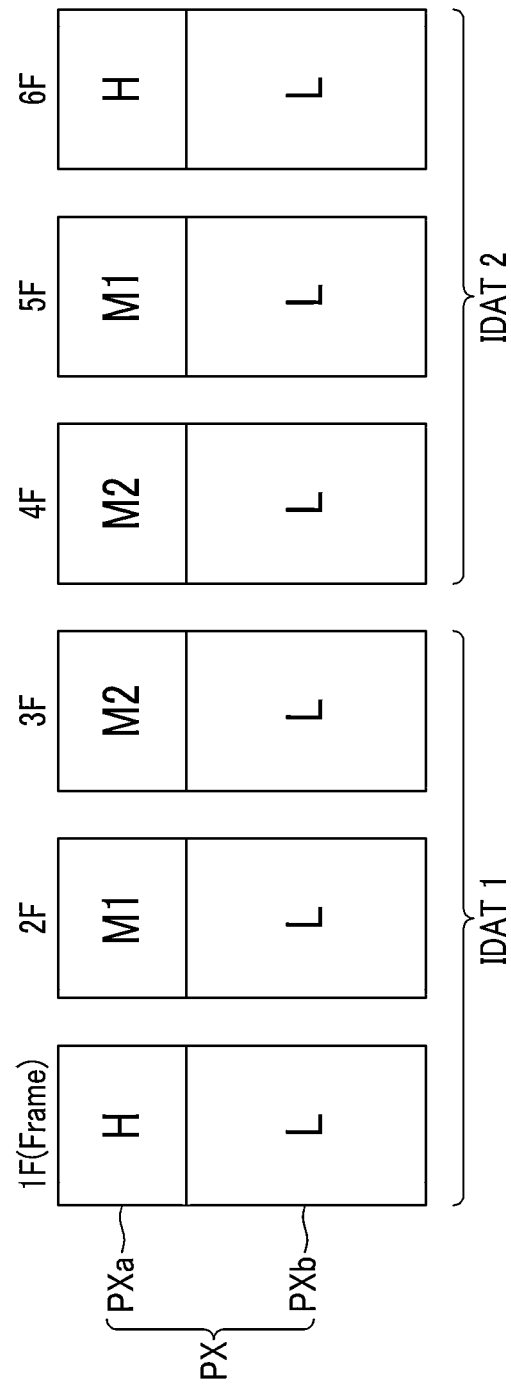

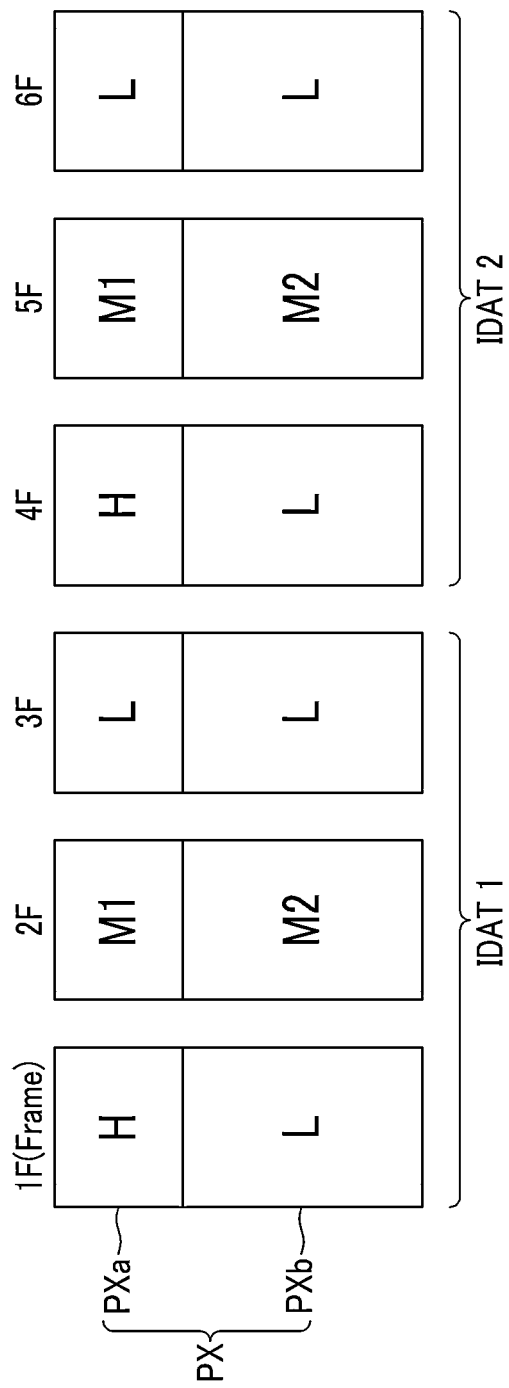

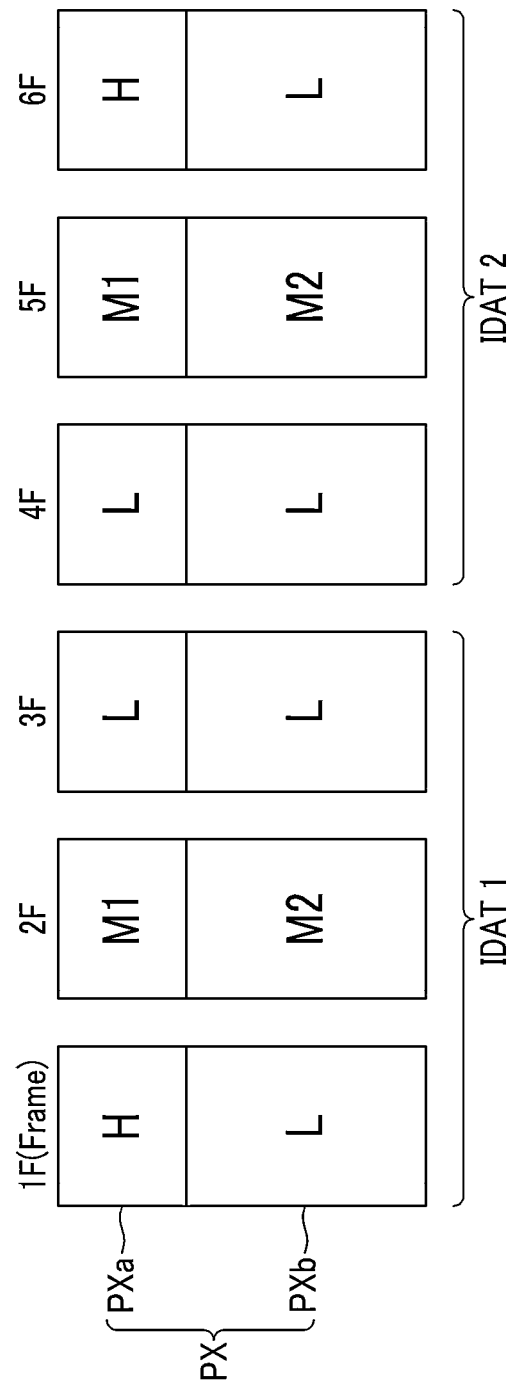

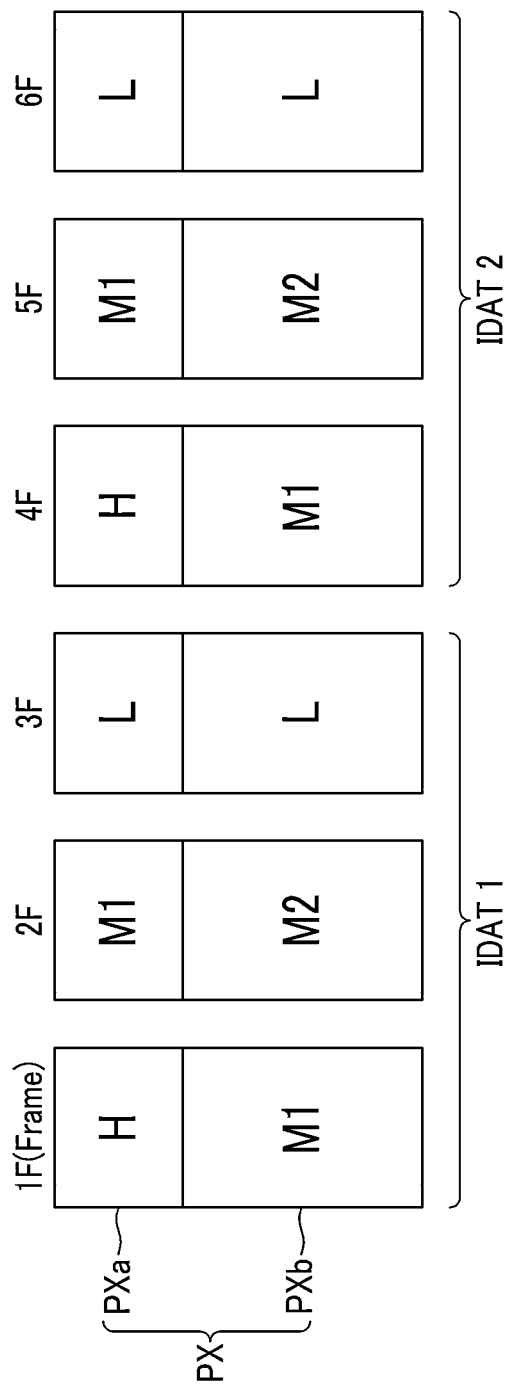

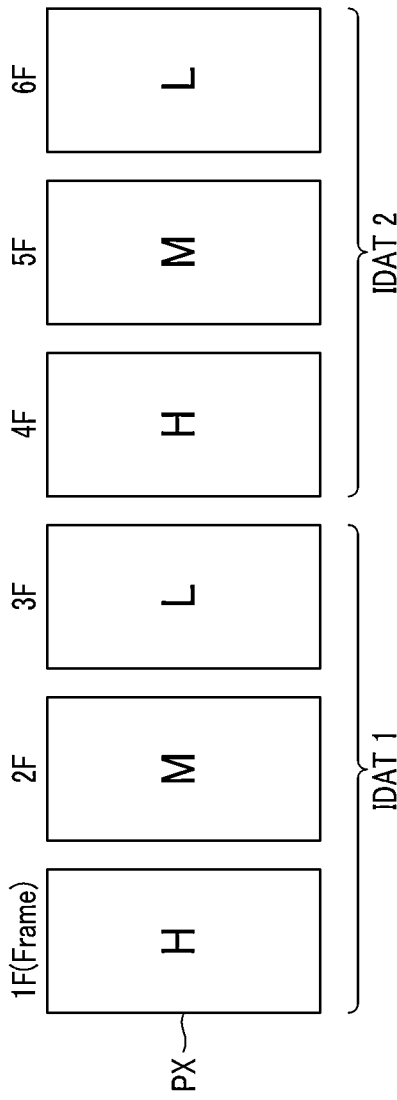
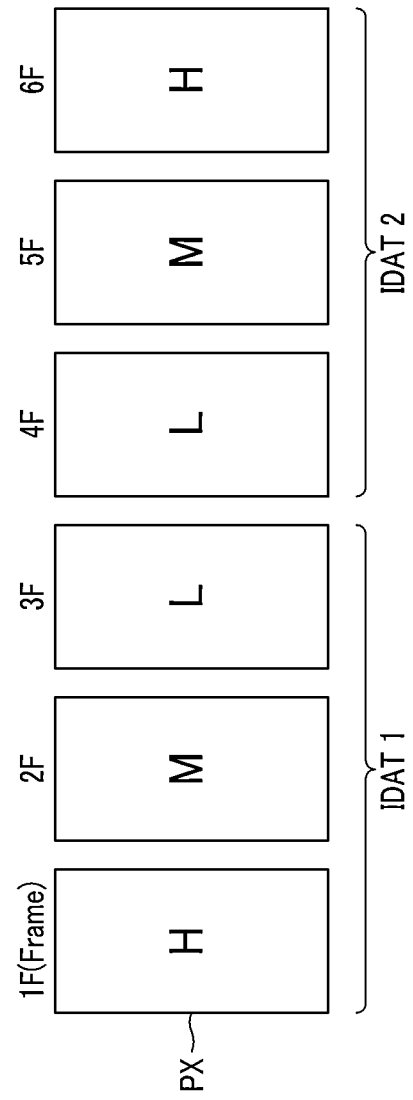

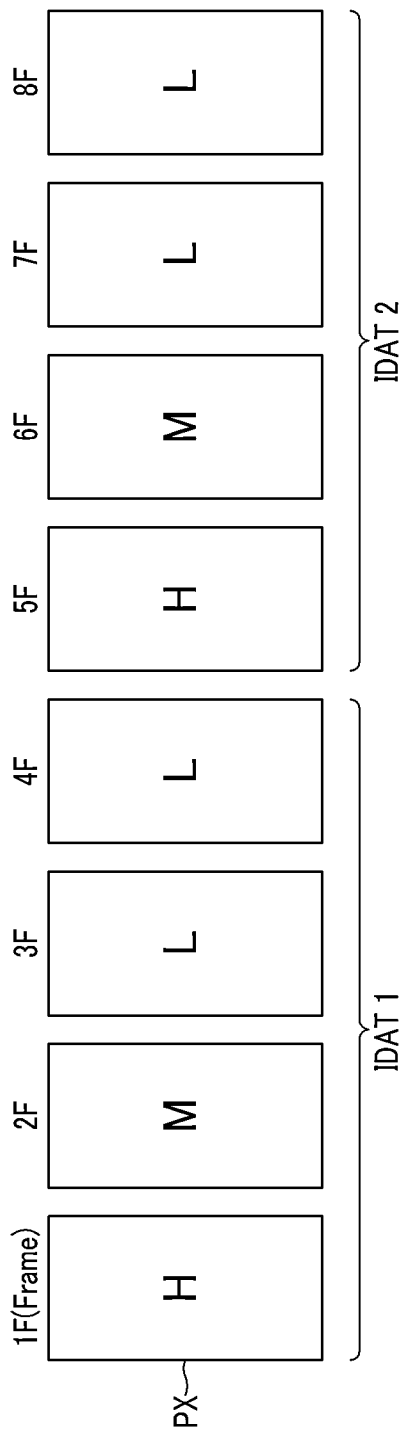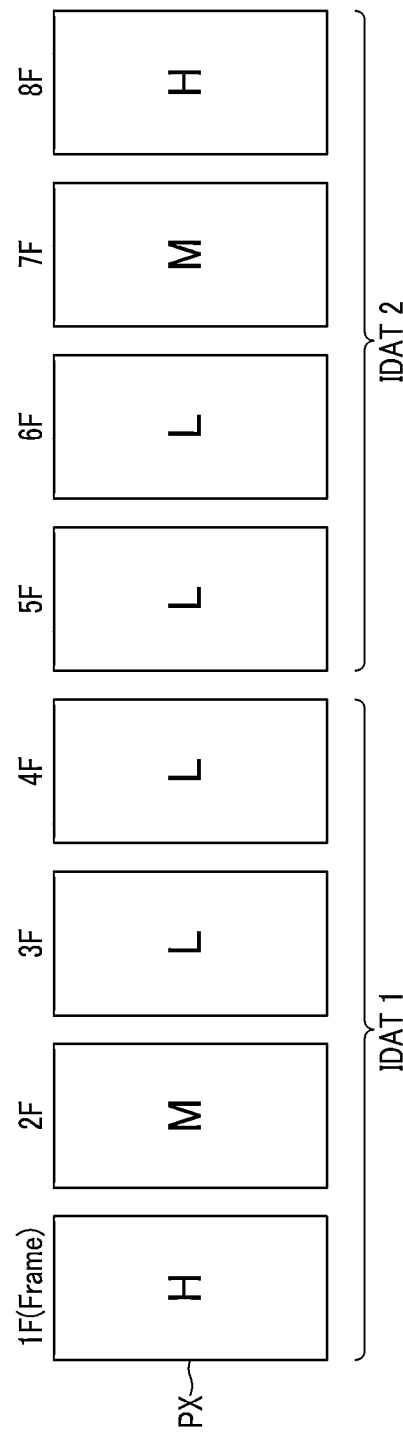

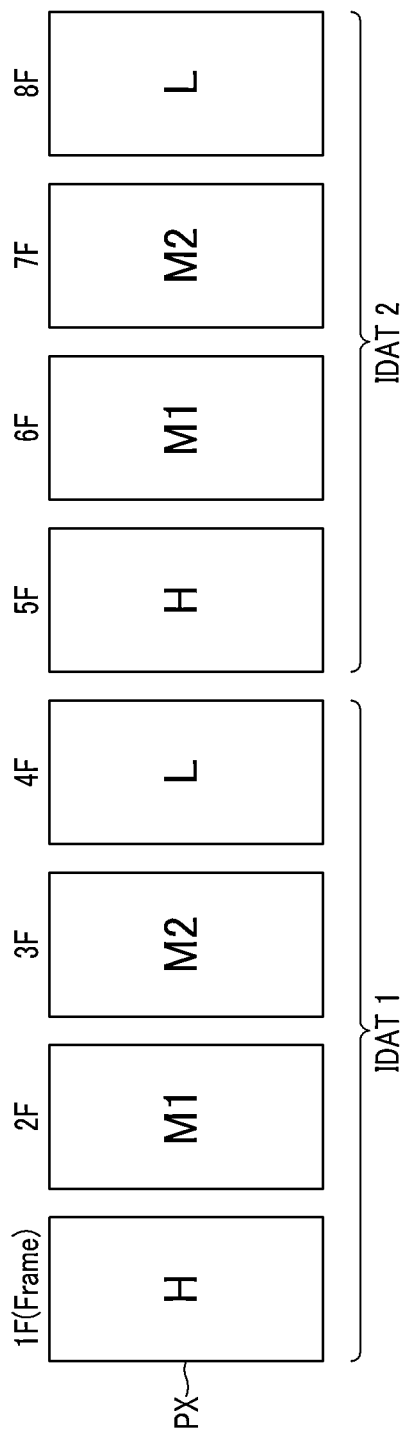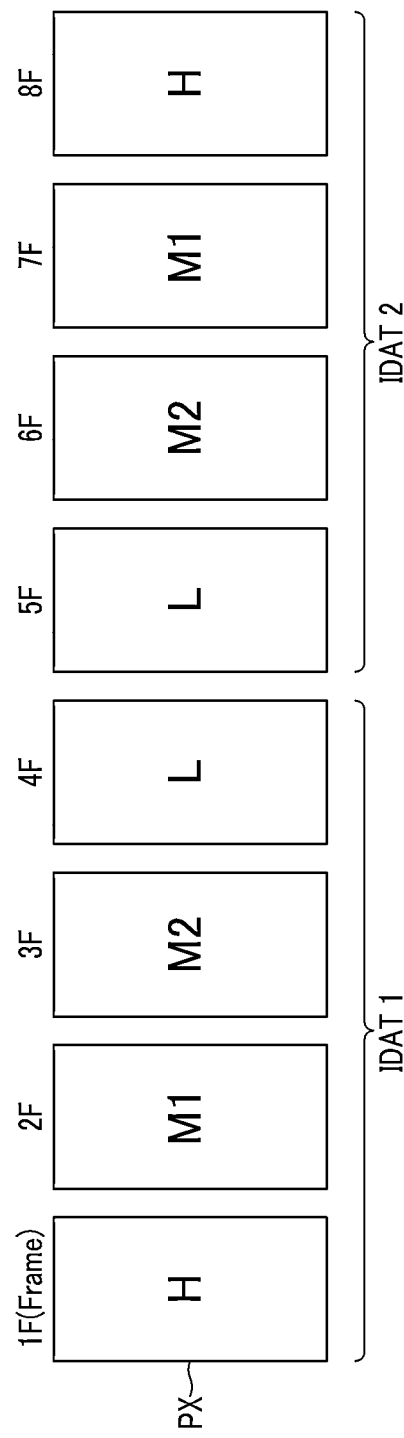

DISPLAY DEVICE AND DRIVING METHOD THEREOF

This application claims priority to Korean Patent Application No. 10-2012-0058172 filed on May 31, 2012 and Korean Patent Application No. 10-2012-0070922 filed on Jun. 29, 2012, and all the benefits accruing therefrom under 35 U.S.C. §119, the contents of which in their entireties are herein incorporated by reference.

BACKGROUND (a) Field

Exemplary embodiments of the invention relates to a display device and a driving method thereof. More particularly, the invention relates to a display device with improved visibility, and a driving method thereof.

(b) Description of the Related Art

A display device, such as a liquid crystal display ("LCD") and an organic light emitting diode ("OLED") display, generally includes a display panel including a plurality of pixels including a switching element and a plurality of signal lines, a gray voltage generator that generates a gray reference voltage, and a data driver that generates a plurality of gray voltages using the gray reference voltage and applies the gray voltage corresponding to an input image signal among the generated gray voltages as a data signal to a data line.

The LCD typically includes two display panels having a pixel electrode and an opposing electrode, and a liquid crystal layer having dielectric anisotropy and interposed therebetween. The pixel electrode is arranged in a matrix form and is connected to a switching element such as a thin film transistor ("TFT") to sequentially receive the data voltage row by row. The opposing electrode is disposed through substantially the entire surface of the display panel and receives a common voltage. The pixel electrode and the opposing electrode are applied with the voltages to generate an electric field in the liquid crystal layer such that the intensity of the electric field is controlled and transmittance of light passing through the liquid crystal layer is controlled, thereby obtaining a desired image.

In the LCD, lateral visibility may be lower than frontal visibility. Accordingly, it has been proposed that one pixel should be bisected into two sub-pixels, while different voltages are applied thereto. When one pixel is divided into two subpixels, an area of an opening for passing the light is decreased such that the transmittance may be deteriorated.

SUMMARY

Exemplary embodiments of the invention relates to a display device with increased display quality by improving transmittance and lateral visibility, and a driving method thereof.

According to an exemplary embodiment, a display device includes a memory which stores gamma data corresponding to a plurality of gamma curves including a first gamma curve and a second gamma curve; a gray voltage generator which generates a plurality of gray voltages based on the gamma data; a signal controller which receives an input image signal; a data driver which receives the input image signal from the signal controller and converts the input image signal into a data voltage using the gray voltages; and a display panel including a plurality of pixels which receives the data voltage and displays an image on a frame-by-frame basis, where the pixel may display a plurality of images corresponding to the input image signal during one frame set, one frame set includes a plurality of consecutive frames, the images displayed by a pixel of the pixels during one frame set includes a first image displayed based on the first gamma curve and a second image displayed based on the second gamma curve, a luminance of the first image is equal to or greater than a luminance of the second image, and the second image is displayed in two consecutive frames.

In an exemplary embodiment, a sequence of the images displayed by the pixel in a first frame set may be opposite to a sequence of the images displayed by the pixel in a second frame set following the first frame set.

In an exemplary embodiment, one frame set may include three or more consecutive frames, the first image may be displayed during one frame in one frame set, and the second image may be displayed during two or more consecutive frames in one frame set.

In an exemplary embodiment, the memory may further store gamma data for a third gamma curve different from the first and second gamma curves, the pixel may further display a third image based on the third gamma curve in one frame set, a luminance of the third image may be equal to or less than the a luminance of the first image, and the luminance of the third image may be equal to or greater than the luminance of the second image.

In an exemplary embodiment, the pixels may include a first pixel and a second pixel, which are adjacent to each other and receive different input image signals during one frame set, each of the first pixel and the second pixel display a plurality of images corresponding to a same input image signal during one frame set, the images displayed by each of the first pixel and the second pixel during one frame set includes the first image and the second image, and the first and second pixels may display images based on different gamma curves during a frame of one frame set.

In an exemplary embodiment, the memory may further store gamma data for a third gamma curve different from the first and second gamma curves, the pixel may further display a third image based on the third gamma curve in one frame set, a luminance of the third image may be equal to or less than the a luminance of the first image, and the luminance of the third image may be equal to or greater than the luminance of the second image.

In an exemplary embodiment, one frame set may include three or more consecutive frames.

In an exemplary embodiment, the frame in which the pixel may display the third image may be between the frame in which the pixel may display the first image and the frame in which the pixel may display the second image in one frame set.

In an exemplary embodiment, a sequence of the images displayed by the pixel in a first frame set may be opposite to a sequence of the images displayed by the pixel in a second frame set following the first frame set.

In an exemplary embodiment, the third image may be displayed in two consecutive frames.

In an exemplary embodiment, the pixels may include a first pixel and a second pixel, which are adjacent to each other and receive different input image signals during one frame set, each of the first pixel and the second pixel may display a plurality of images corresponding to a same input image signal during one frame set, the images displayed by each of the first pixel and the second pixel during one frame set may include the first image and the second image, and the first and second pixels may display images based on different gamma curves during a frame of one frame set.

In an exemplary embodiment, the memory may further store gamma data for a fourth gamma curve different from the first, second and third second gamma curves, the pixel may further display a fourth image based on the fourth gamma curve during one frame set, a luminance of the fourth image may be equal to or less than the luminance of the third image, and the luminance of the fourth image may be equal to or greater than the luminance of the second image.

In an exemplary embodiment, the frame in which the pixel may display the fourth image may be between the frame in which the pixel may display the third image and the frame in which the pixel may display the second image in one frame set.

In an exemplary embodiment, a sequence of the images displayed by the pixel in a first frame set may be opposite to the sequence of the images displayed by the pixel in a second frame set following the first frame set.

In an exemplary embodiment, the pixels may include a first pixel and a second pixel, which are adjacent to each other and receive different input image signals during one frame set, each of the first pixel and the second pixel may display images corresponding to a same input image signal during one frame set including a plurality of consecutive frames, each of the images displayed by the first pixel and the second pixel during one frame set includes the first image and the second image, and a gamma curve for the image displayed by the first pixel may be different from a gamma curve for the image displayed by the second pixel during a frame of one frame set.

In an exemplary embodiment, the display device may further include: a backlight unit which provides light to the display panel, where one frame set may include a first frame and a second frame following the first frame, the pixel may display the first image in the first frame and may display the second image in the second frame, and the backlight unit may provide light having a first luminance to the display panel in the first frame and light having a second luminance, which may be lower than the first luminance, to the display panel in the second frame.

In an exemplary embodiment, a luminance of the second image displayed in the second frame may be substantially zero, and the backlight unit may be turned off during the second frame and may not provide light to the pixel.

In an exemplary embodiment, the backlight unit may be turned on during a first period in the second frame to provide light to the pixel, and a duty ratio of the first period may be less than one.

In an exemplary embodiment, the display device may further include: a backlight unit which provides light to the display panel, where one frame set may include a first frame and a second frame following the first frame, the pixel may display the second image in the first frame and may display the first image in the second frame, and luminance of the light provided to the pixel by the backlight unit in the second frame may be higher than luminance of the light provided to the pixel by the backlight unit in the first frame.

In an exemplary embodiment, a luminance of the second image displayed in the first frame may be substantially zero, or a luminance of the first image displayed in the second frame may be a highest luminance.

In an exemplary embodiment, the display panel further may include a liquid crystal layer including a plurality of liquid crystal molecules, and when the pixel displays an image of a second luminance lower than a first luminance after the pixel displays an image of the first luminance in two adjacent frames, a response speed of the liquid crystal molecules may be less than or equal to about 4.17 milliseconds when a frame frequency may be about 240 hertz and a luminance of the image displayed by the pixel may be changed from about 99% to about 1% of a difference between the first luminance and the second luminance.

In an exemplary embodiment, the display panel further may include a liquid crystal layer including a plurality of liquid crystal molecules, and when the pixel displays an image of a second luminance less than a first luminance after the pixel displays an image of the first luminance in two adjacent frames, a response speed of the liquid crystal molecules may be less than or equal to about 8.3 milliseconds when a frame frequency may be about 120 hertz and a luminance of the image displayed by the pixel may be changed from about 99% to about 1% of a difference between the first luminance and the second luminance.

According to another exemplary embodiment, a display device includes: a memory which stores gamma data for a plurality of gamma curves; a gray voltage generator which generates a plurality of gray voltages based on the gamma data; a signal controller which receives an input image signal; a data driver which receives the input image signal from the signal controller and converting the input image signal into a data voltage using the gray voltages; and a display panel including a first pixel and a second pixel, where each of the first and second pixels receives the data voltage and may display an image on a frame-by-frame basis, where the first pixel and the second pixel may be adjacent to each other and receive different input image signals during one frame set including a plurality of consecutive frames, each of the first pixel and the second pixel may display a plurality of images corresponding to a same input image signal during one frame set based on the gamma curves, and the first and second pixels display images based on different gamma curves during a frame of one frame set.

In an exemplary embodiment, each of the first pixel and the second pixel may include a first subpixel and a second subpixel which receive the same input image signal during one frame set, and a gamma curve, based on which an image may be displayed by one of the first subpixel and the second subpixel of the first pixel, may be different from a gamma curve, based on which an image may be displayed by the one of the first subpixel and the second subpixel of the second pixel, during the frame of one frame set.

According to another exemplary embodiment, a display device includes: a memory which stores gamma data for a plurality of gamma curves including a first gamma curve and a second gamma curve; a gray voltage generator which generates a plurality of gray voltages based on the gamma data; a signal controller which receives an input image signal; a data driver which receives the input image signal from the signal controller and converts the input image signal into a data voltage using the gray voltages; and a display panel including a plurality of pixels which receives the data voltage and may display an image on a frame-by-frame basis, a backlight unit which provides light to the display panel, where a pixel of the pixels may display a plurality of images corresponding to a same input image signal during one frame set including a plurality of consecutive frames, one frame set includes a first frame and a second frame following the first frame, the pixel may display a first image based on the first gamma curve in the first frame and may display a second image based on the second gamma curve in the second frame, a luminance of the first image may be equal to or greater than a luminance of the second image, and the backlight unit provides light having a first luminance to the display panel in the first frame and provides light having a second luminance lower than the first luminance to the display panel in the second frame.

According to another exemplary embodiment, a display device includes a memory which stores gamma data for a plurality of gamma curves including a first gamma curve and a second gamma curve; a gray voltage generator which generates a plurality of gray voltages based on the gamma data; a signal controller which receives an input image signal; a data driver which receives the input image signal from the signal controller and converts the input image signal into a data voltage using the gray voltages; and a display panel including a plurality of pixels which receives the data voltage and may display an image on a frame-by-frame basis; and a backlight unit which provides light to the display panel, where a pixel of the pixels may display a plurality of images corresponding to a same input image signal during one frame set including a plurality of consecutive frames, one frame set includes a first frame and a second frame following the first frame, the pixel may display a second image based on the second gamma curve in the first frame and may display a first image based on the first gamma curve in the second frame, a luminance of the first image is equal to or greater than a luminance of the second image, and luminance of the light provided to the pixel by the backlight unit in the second frame is higher than luminance of the light provided to the pixel by the backlight unit in the first frame.

According to an exemplary embodiment of a method of driving a display device, the method includes: displaying a first image in a pixel based on a first gamma curve during a first frame of one frame set including a plurality of consecutive frames; and displaying a second image in the pixel based on a second gamma curve during a second frame of one frame set, where the display device includes: a memory which stores gamma data for a plurality of gamma curves including the first gamma curve and the second gamma curve; a gray voltage generator which generates a plurality of gray voltages based on the gamma data; a signal controller which receives an input image signal; a data driver which receives the input image signal from the signal controller and converts the input image signal into a data voltage using the gray voltages; and a display panel including a plurality of pixels including the pixel which receives the data voltage and may display an image on a frame-by-frame basis, the first and second images correspond to a same input image signal applied to the pixel during one frame set, a luminance of the first image is equal to or greater than a luminance of the second image, and the second image is displayed by a same pixel of the display device in two consecutive frames.

In an exemplary embodiment of the method, the pixels may include a first pixel and a second pixel, which are adjacent to each other and receive different input image signals during one frame set, each of the first pixel and the second pixel display a plurality of images corresponding to a same input image signal during one frame set, the images displayed by each of the first pixel and the second pixel during one frame set includes the first image and the second image, and a gamma curve, based on which an image may be displayed by the first pixel, may be different from a gamma curve, based on which an image may be displayed by the second pixel, during a frame of one frame set.

In an exemplary embodiment of the method, the pixel may include a first subpixel and a second subpixel which receive the same input image signal, each of the first subpixel and the second subpixel may display a plurality of images corresponding to the same input image signal during one frame set, and the second image displayed by one of the first subpixel and the second subpixel may be displayed in two consecutive frames.

According to another exemplary embodiment of a method of driving a display device, the method includes: displaying a first image in a pixel based on a first gamma curve during a first frame of one frame set including a plurality of consecutive frames; and displaying a second image in the pixel based on a second gamma curve during a second frame of one frame set, where the display device includes: a memory which stores gamma data for a plurality of gamma curves including the first gamma curve and the second gamma curve; a gray voltage generator which generates a plurality of gray voltages based on the gamma data; a signal controller which receives an input image signal; a data driver which receives the input image signal from the signal controller and converts the input image signal into a data voltage using the gray voltages; and a display panel including a plurality of pixels including the pixel which receives the data voltage and may display an image on a frame-by-frame basis; and a backlight unit which provides light to the display panel, the first and second images correspond to a same input image signal applied to the pixel during one frame set, a luminance of the first image is equal to or greater than a luminance of the second image, and the backlight unit provides light having a first luminance to the display panel in the first frame and the light having a second luminance lower than the first luminance to the display panel in the second frame.

In an exemplary embodiment of the method, the luminance of the second image displayed in the second frame may be substantially zero, and the backlight unit may be turned off during the second frame and does not provide light to the pixel.

In an exemplary embodiment of the method, the backlight unit may be turned on during a first time in the second frame to provide light to the pixel, and a duty ratio of the first time may be less than one.

According to another exemplary embodiment of a method of driving a display device, the method includes: displaying a second image in a pixel based on a second gamma curve during a first frame of one frame set including a plurality of consecutive frames; and displaying a first image in the pixel based on a first gamma curve during a second frame of one frame set, where the display device includes: a memory which stores gamma data for a plurality of gamma curves including the first gamma curve and the second gamma curve; a gray voltage generator which generates a plurality of gray voltages based on the gamma data; a signal controller which receives an input image signal; a data driver which receives the input image signal from the signal controller and converts the input image signal into a data voltage using the gray voltages; and a display panel including a plurality of pixels including the pixel which receives the data voltage and may display an image on a frame-by-frame basis; and a backlight unit which provides light to the display panel, the first and second images correspond to a same input image signal applied to the pixel during one frame set, where a luminance of the first image is equal to or greater than a luminance of the second image, and luminance of light provided to the pixel by the backlight unit in the second frame is higher than luminance of light provided to the pixel by the backlight unit in the first frame.

According to another exemplary embodiment of a method of driving a display device including a plurality of pixels including a first pixel and a second pixel neighboring each other and which may display an image on a frame-by-frame basis, the method includes: storing gamma data for a plurality of gamma curves to a memory of the display device; generating gray voltages based on the gamma data in the gray voltage generator of the display device; receiving an input image signal and converting the input image signal into a data voltage using the gray voltages in the data driver; and applying the data voltage to the first pixel and the second pixel, and displaying a plurality of images corresponding to a same input image signal in each of the first pixel and the second pixel during a first frame set including a plurality of consecutive frames, where the images are displayed by each of the first pixel and the second pixel during the first frame set based on different gamma curves, the first and second pixels display images based on different gamma curves during a frame of one frame set, and images displayed by two pixels neighboring each other and representing a same color among the pixels are based on different gamma curves.

In an exemplary embodiment of the method, the images displayed by the first pixel during the first frame set includes a first image based on the first gamma curve and a second image based on the second gamma curve, a luminance of the first image may be equal to or greater than a luminance of the second image, and the second image for the first pixel may be displayed in two consecutive frames.

In an exemplary embodiment of the method, a sequence of the first image and the second image displayed by the first pixel in the first frame set may be opposite to a sequence of the first image and the second image displayed by the first pixel in a second frame following the first frame set.

In an exemplary embodiment of the method, polarities of data voltages applied to two adjacent data lines may be opposite to each other.

In an exemplary embodiment of the method, the pixels arranged in a pixel column direction may be alternately connected to two different data lines of the display device.

In an exemplary embodiment of the method, a polarity of the data voltage applied to the pixels may be inverted every frame.

In an exemplary embodiment of the method, a polarity of the data voltage applied to the pixels may be inverted every n frames, where n may be a natural number greater than two.

In an exemplary embodiment of the method, the pixels arranged in a pixel column direction may be connected to a same data line.

In an exemplary embodiment of the method, an image displayed by the first pixel during the first frame set includes a first image based on the first gamma curve and a second image based on the second gamma curve, a luminance of the first image may be equal to or greater than a luminance of the second image, and the first image and the second image for the first pixel may be alternately displayed by the frame.

In an exemplary embodiment of the method, polarities of data voltages applied to two adjacent data lines may be opposite to each other.

In an exemplary embodiment of the method, the pixels arranged in a pixel column direction may be alternately connected to two different data lines.

In an exemplary embodiment of the method, a polarity of the data voltage applied to the pixels may be inverted every frame.

In an exemplary embodiment of the method, a polarity of the data voltage applied to the pixels may be inverted every n frames, where n may be a natural number greater than two.

In an exemplary embodiment of the method, the pixels arranged in a pixel column direction may be connected to a same data line.

In an exemplary embodiment of the method, a polarity of the data voltage applied to the pixels may be inverted every frame.

In an exemplary embodiment of the method, a polarity of the data voltage applied to the pixels may be inverted every n frames, where n may be a natural number greater than two.

In an exemplary embodiment of the method, a polarity arrangement sequence of the data voltage applied to the first pixel in the first frame set may be opposite to a polarity arrangement sequence of the data voltage applied to the first pixel in a second frame set following the first frame set.

In an exemplary embodiment of the method, each of the first pixel and the second pixel may include a first subpixel and a second subpixel.

According to an exemplary embodiment, a display device includes: a memory which stores gamma data for a plurality of gamma curves; a gray voltage generator which generates gray voltages based on the gamma data; a signal controller which receives an input image signal; a data driver which receives the input image signal from the signal controller and converts the input image signal into a data voltage using the gray voltages; and a display panel including: a plurality of data lines which transmits the data voltage; and a plurality of pixels, each of which receives the data voltage and may display an image on a frame-by-frame basis, where the pixels include a first pixel and a second pixel neighboring each other, where each of the first and second pixels may display an image corresponding to a corresponding input image signal, the first pixel and the second pixel display a plurality of images corresponding to a same input image signal during a first frame set including a plurality of consecutive frames, images displayed by the first pixel and the second pixel during the first frame set are based on different gamma curves, the first and second pixels display images based on different gamma curves during the frame, and images displayed by two pixels neighboring each other and representing a same color among the plurality of pixels are based on different gamma curves.

In an exemplary embodiment, an image displayed by the first pixel during the first frame set includes a first image based on the first gamma curve and a second image based on the second gamma curve, a luminance of the first image may be equal to or greater than a luminance of the second image, and the second image for the first pixel may be displayed in two consecutive frames.

In an exemplary embodiment, a sequence of the first image and the second image displayed by the first pixel in the first frame set may be opposite to a sequence of the first image and the second image displayed by the first pixel in a second frame following the first frame set.

In an exemplary embodiment, polarities of data voltages applied to two adjacent data lines may be opposite to each other.

In an exemplary embodiment, the pixels arranged in a pixel column direction may be alternately connected to two different data lines.

In an exemplary embodiment, a polarity of the data voltage applied to the plurality of pixels may be inverted every frame.

In an exemplary embodiment, a polarity of the data voltage applied to the plurality of pixels may be inverted every n frames, where n may be a natural number greater than two.

In an exemplary embodiment, the pixels arranged in a pixel column direction may be connected to a same data line.

In an exemplary embodiment, a polarity of the data voltage applied to the plurality of pixels may be inverted every frame.

In an exemplary embodiment, a polarity of the data voltage applied to the plurality of pixels may be inverted every n frames, where n may be a natural number greater than two.

In an exemplary embodiment, an image displayed by the first pixel during the first frame set includes a first image based on the first gamma curve and a second image based on the second gamma curve, a luminance of the first image may be equal to or greater than a luminance of the second image, and the first image and the second image for the first pixel may be alternately displayed by the frame.

In an exemplary embodiment, polarities of data voltages applied to two adjacent data lines may be opposite to each other.

In an exemplary embodiment, the pixels arranged in a pixel column direction may be alternately connected to two different data lines.

In an exemplary embodiment, a polarity of the data voltage applied to the plurality of pixels may be inverted every frame.

In an exemplary embodiment, a polarity of the data voltage applied to the plurality of pixels may be inverted every n frames, where n may be a natural number greater than one.

In an exemplary embodiment, the pixels arranged in a pixel column direction may be connected to a same data line.

In an exemplary embodiment, a polarity of the data voltage applied to the plurality of pixels may be inverted every frame.

In an exemplary embodiment, a polarity of the data voltage applied to the plurality of pixels may be inverted every n frames, where n may be a natural number greater than one.

In an exemplary embodiment, a polarity arrangement sequence of the data voltage applied to the first pixel in the first frame set may be opposite to a polarity arrangement sequence of the data voltage applied to the first pixel in a second frame set following the first frame set.

In an exemplary embodiment, each of the first pixel and the second pixel may include a first subpixel and a second subpixel.

According to one or more exemplary embodiment of the invention, the display quality of the display device is substantially improved by improving the transmittance of a display device and the lateral visibility thereof.

BRIEF DESCRIPTION OF THE DRAWINGS

The above and other features of the invention will become more apparent by describing in further detail exemplary embodiments thereof with reference to the accompanying drawings, in which:

FIG. 4 to FIG. 6 are views showing luminance of a pixel during a frame sequence in an exemplary embodiment of a display device according to the invention;

FIG. 24A to FIG. 30B are views of luminance of a pixel during a frame sequence based a gamma curve applied thereto in exemplary embodiments a display device according to the invention;

FIG. 31A to FIG. 33B are views of luminance of a pixel during a frame sequence based on a gamma curve applied thereto in the display device shown in FIG. 2;

DETAILED DESCRIPTION

Figure 1A:
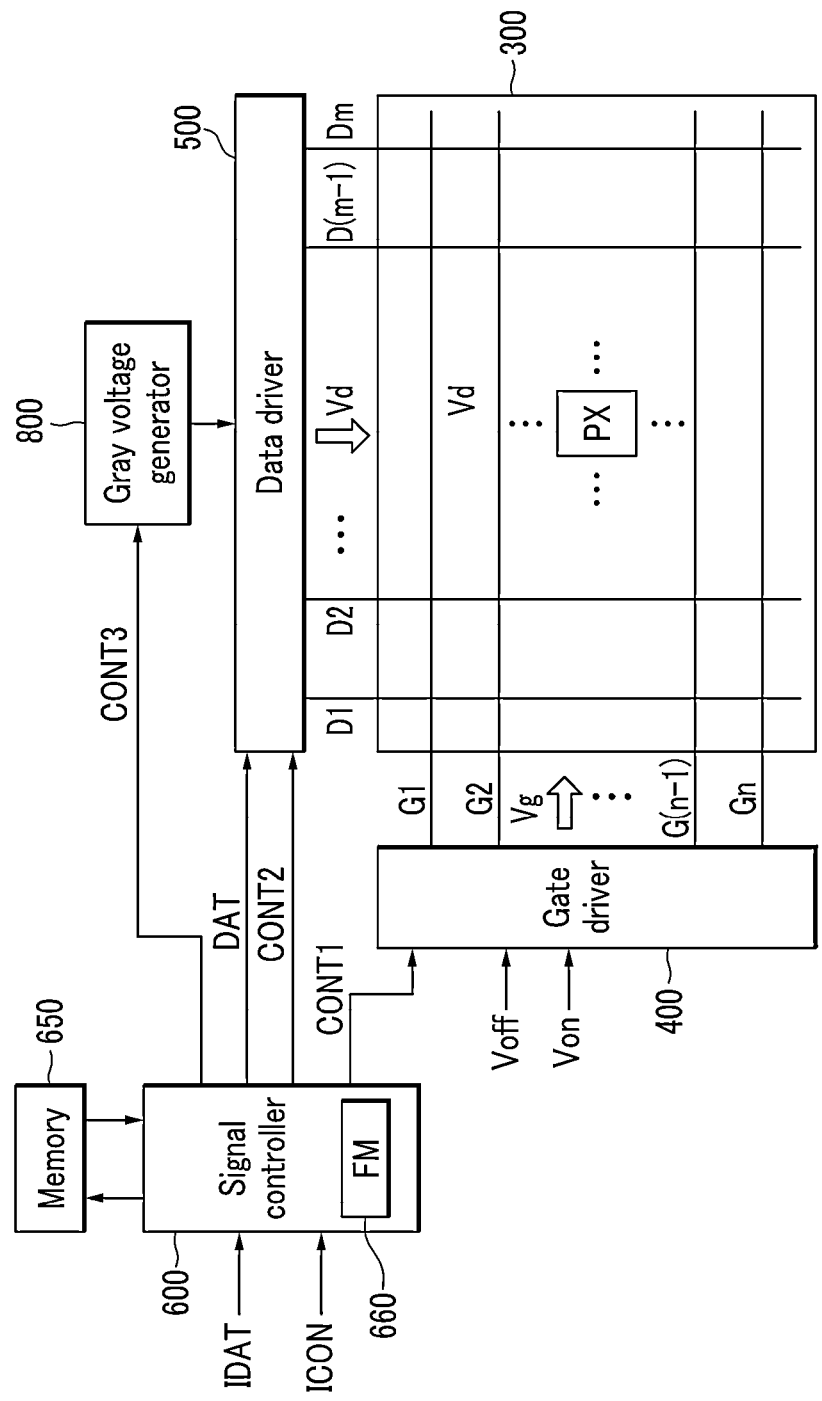
FIG. 1A and FIG. 1B are block diagrams showing exemplary embodiments of a display device according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Now, exemplary embodiments of a display device and a driving method thereof according to the invention will be described with the accompanying drawings.

Figure 1B:
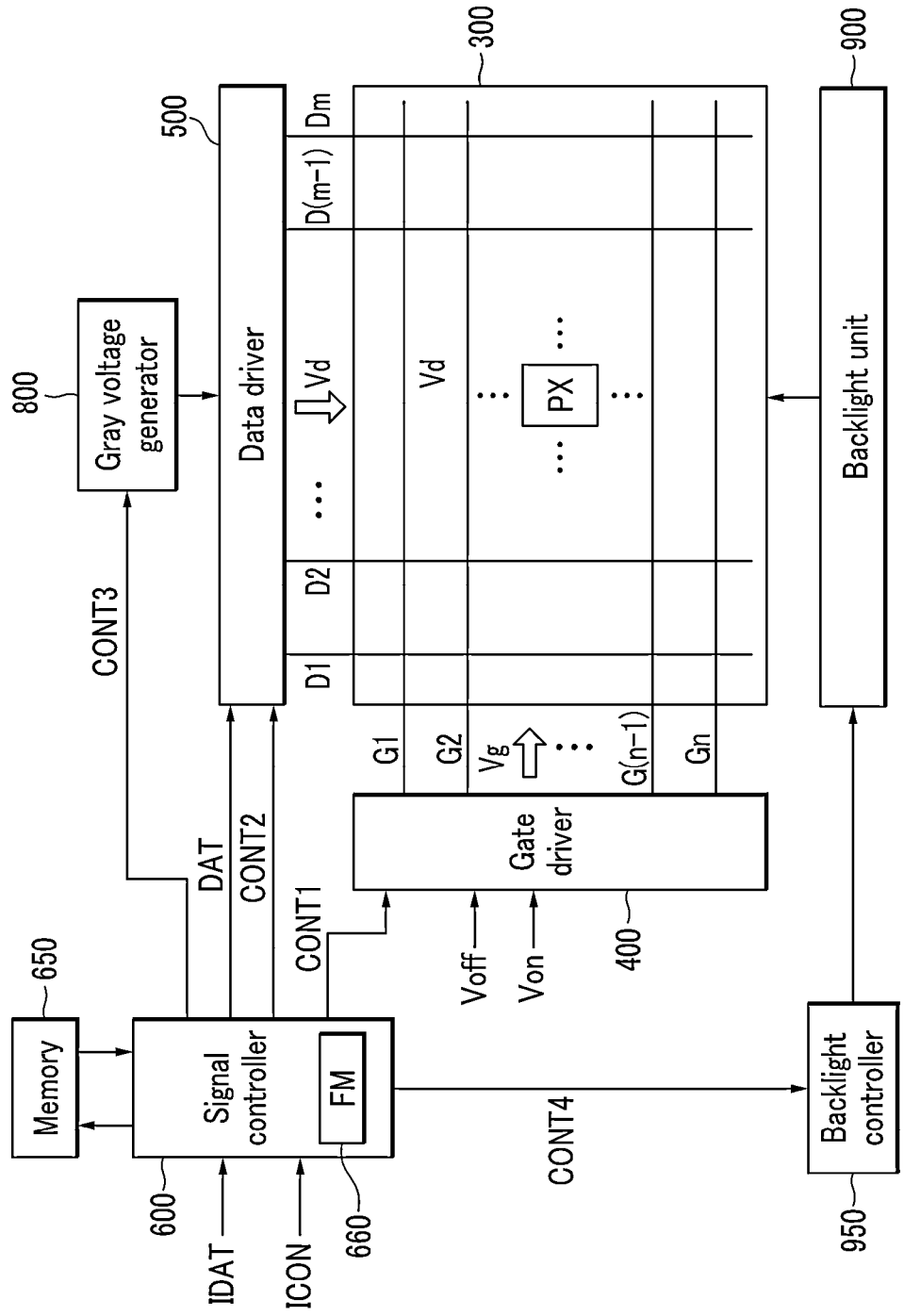

FIG. 1A and FIG. 1B are block diagrams showing exemplary embodiments of a display device according to the invention.

An exemplary embodiment of a display device according to the invention includes a display panel 300, a gate driver 400 and a data driver 500, each of which is connected to the display panel 300, a gray voltage generator 800 connected to the data driver 500, a signal controller 600 that controls the gate driver 400, the data driver 500 and the gray voltage generator 800, and a memory 650 connected to the signal controller 600.

In an exemplary embodiment, the display panel 300 includes a plurality of signal lines, and a plurality of pixels PX connected to the signal lines and arranged substantially in a matrix form. In an exemplary embodiment, where the display device is a liquid crystal display, the display panel 300 includes lower and upper panels (not shown) facing each other and a liquid crystal layer (not shown) interposed therebetween, when viewed from a cross-sectional view.

The signal lines include a plurality of gate lines G1-Gn that transmit a gate signal (referred to as a "scanning signal") and a plurality of data lines D1-Dm that transmit a data voltage.

In an exemplary embodiment, each pixel PX may display one of primary colors (spatial division) or may alternately display primary colors (temporal division) to display a color image using a spatial and temporal summation of primary colors. A unit of pixels (also referred to as "dot") may be defined by a plurality of adjacent pixels PX that display different primary colors. In such an embodiment, the dot may display a white image.

The gate driver 400 is connected to the gate lines G1-Gn and applies a gate signal Vg having a gate-on voltage Von and a gate-off voltage Voff to the gate lines G1-Gn.

The memory 650 is connected to the signal controller 600, and stores a gamma data for a gamma curve and then transmits the gamma data to the signal controller 600. The gamma curve is a curved line of a luminance or a transmittance for the grayscale levels of the input image signal IDAT, and gray voltages or reference gray voltages may be determined based on the gamma curve. The gamma data stored in the memory 650 may include gamma data for two different gamma curves. In an alternative exemplary embodiment, the memory 650 may be included in the signal controller 600 or the gray voltage generator 800, or in the data driver 500.

The gray voltage generator 800 generates gray voltages for all grayscale levels or a predetermined number of gray voltages (hereinafter referred to as "reference gray voltages") related to transmittance of the pixels PX. The (reference) gray voltages may be positive or negative with respect to the common voltage. The gray voltage generator 800 may receive the gamma data from the signal controller 600 and generate the (reference) gray voltages based on the gamma data.

In an alternative exemplary embodiment of the invention, the gray voltage generator 800 may be included in the data driver 500.

The data driver 500 is connected to the data line, selects a gray voltage among the gray voltages from the gray voltage generator 800, and applies the selected gray voltage to the data line as a data signal. In an exemplary embodiment, where the gray voltage generator 800 does not provide the gray voltage for all grayscale levels, but provides the predetermined number of reference gray voltages, the data driver 500 may generate gray voltages for all gray levels by dividing the reference gray voltages and then select a data signal among the divided reference gray voltages.

The signal controller 600 controls an operation of drivers, e.g., the gate driver 400 and the data driver 500, for example. The signal controller 600 may further include a frame memory ("FM") 660 that stores the input image signal IDAT by a frame unit.

As shown in FIG. 1B, an alternative exemplary embodiment of the display device according to the invention may further include a backlight unit 900 and a backlight controller 950 that provides light to the display panel 300.

The backlight controller 950 receives a backlight control signal CONT4 from the signal controller 600 to control the backlight unit 900. The backlight control signal CONT4 may include a pulse width modulation ("PWM") control signal for controlling a turn-on time of the partial or entire backlight unit 900.

Next, a display operation of the display device will be described.

The signal controller 600 receives an input image signal IDAT and an input control signal ICON for controlling display of an image corresponding to the input image signal IDAT from the outside. The input image signal IDAT has luminance information of each pixel PX, and the luminance corresponds to a predetermined number of grayscale levels, for example $1024=2^{10}$, $256=2^8$, or $64=2^6$. In an exemplary embodiment, the input control signal ICON may include a vertical synchronization signal, a horizontal synchronizing signal, a main clock signal and a data enable signal, for example.

The signal controller 600 processes the input image signal IDAT based on the input image signal IDAT and the input control signal ICON to convert the input image signal IDAT into an output image signal DAT, and generates a gate control signal CONT1, a data control signal CONT2 and a gamma control signal CONT3. The signal controller 600 outputs the gate control signal CONT1 to the gate driver 400, the data control signal CONT2 and the output image signal DAT to the data driver 500, and the gamma control signal CONT3 to the gray voltage generator 800. The gamma control signal CONT3 may include the gamma data stored in the memory 650.

As shown in FIG. 1B, in an exemplary embodiment, where the display device further includes the backlight unit 900 and the backlight controller 950, the signal controller 600 further generates and outputs a backlight control signal CONT4 to the backlight controller 950.

The gray voltage generator 800 generates and outputs the gray voltages or the predetermined number of reference gray voltages to the data driver 500 based on the gamma control signal CONT3. The gray voltages may be respectively provided for the different gamma curves, and the gray voltages may be generated for a gamma curve selected through a separate process.

The data driver 500 receives the output image data DAT, which may be in a digital form for the pixels PX of a pixel row based on the data control signal CONT2 from the signal controller 600 and selects the gray voltage corresponding to each output image data DAT to convert the output image data DAT into the analog data voltage Vd, and then applies the converted analog data voltage to the corresponding data lines D1-Dm.

In an exemplary embodiment, a frame frequency (referred to as an "input frequency" or a "gamma frequency"), at which the data driver 500 outputs the data voltage Vd to the data lines D1-Dm to display one image to each pixel PX, may be different from an image frequency (referred to as an "output frequency)" having two or more consecutive frames (referred to as a "frame set") for displaying the image for one input image signal IDAT as a unit. In such an embodiment, the image frequency may be 1/n (where n is a natural number of two or more) of the frame frequency. In one exemplary embodiment, for example, the frame frequency is about 120 hertz (Hz), and the image frequency may be about 60 Hz. In one exemplary embodiment, for example, the frame frequency is about 240 Hz, and the image frequency may be one of about 60 Hz, about 80 Hz and about 120 Hz.

The gate driver 400 applies the gate-on voltage Von to the gate lines G1-Gn based on the gate control signal CONT1 from the signal controller 600 to turn on the switching element connected to the gate lines G1-Gn. The data voltage supplied to the data lines is supplied to a corresponding pixel PX through the turned-on switching element. When the pixel PX is applied with the data voltage, the pixel PX may display the luminance corresponding to the data voltage through various optical conversion elements. In one exemplary embodiment, for example, where the display device is the liquid crystal display, an inclination decree of the liquid crystal molecules of the liquid crystal layer is controlled to control polarization of light, thereby displaying the luminance corresponding to the grayscale level of the input image signal IDAT. In such an embodiment, the partial or entire backlight unit 900 is turned on or turned off based on the control of the backlight controller 950, thereby providing light to the display panel 300.

By repeating the process described above, which is a process in a unit of one horizontal period (also written as "1H" and that is the same as one period of the horizontal synchronizing signal and the data enable signal), the gate-on voltage Von is sequentially applied to the plurality of gate lines G1-Gn to apply the data signal to the plurality of pixels PX, thereby displaying images of one frame.

When one frame ends, the next frame starts, and a state of the inversion signal applied to the data driver 500 may be controlled such that the polarity of the data signal applied to each pixel PX is inversed, e.g., changed to be opposite to a polarity of the previous frame ("frame inversion"). The polarity of the data voltage Vd applied to all pixels PX may be inverted every at least one frame in the frame inversion. In an exemplary embodiment, the polarity of the image data voltage flowing through one of the data lines D1-Dm is changed based on the characteristic of the inversion signal even in one frame, or the polarities of the data voltage Vd applied to the data lines D1-Dm of one pixel PX row may be different from each other.

Next, an exemplary embodiment of a display device and an exemplary embodiment of a driving method thereof according to the invention will be described with reference to FIG. 2 to FIG. 6.

Figure 2:
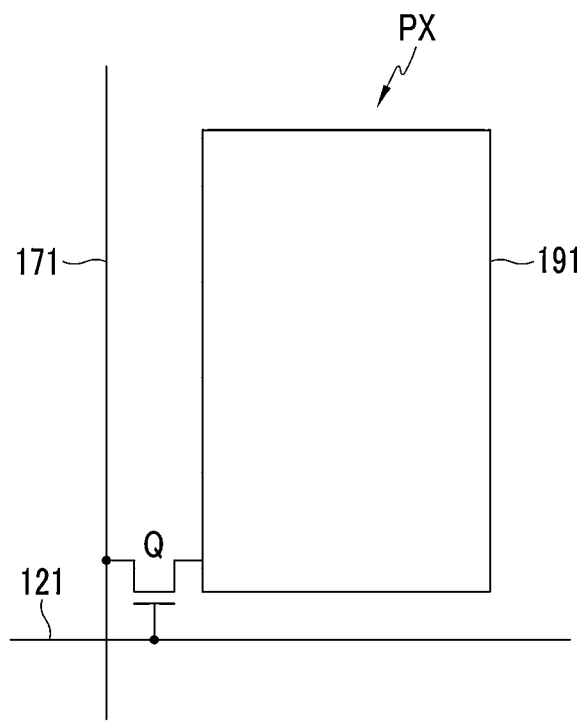
FIG. 2 is a circuit diagram showing an exemplary embodiment of a pixel of a display device according to the invention.
Figure 3:
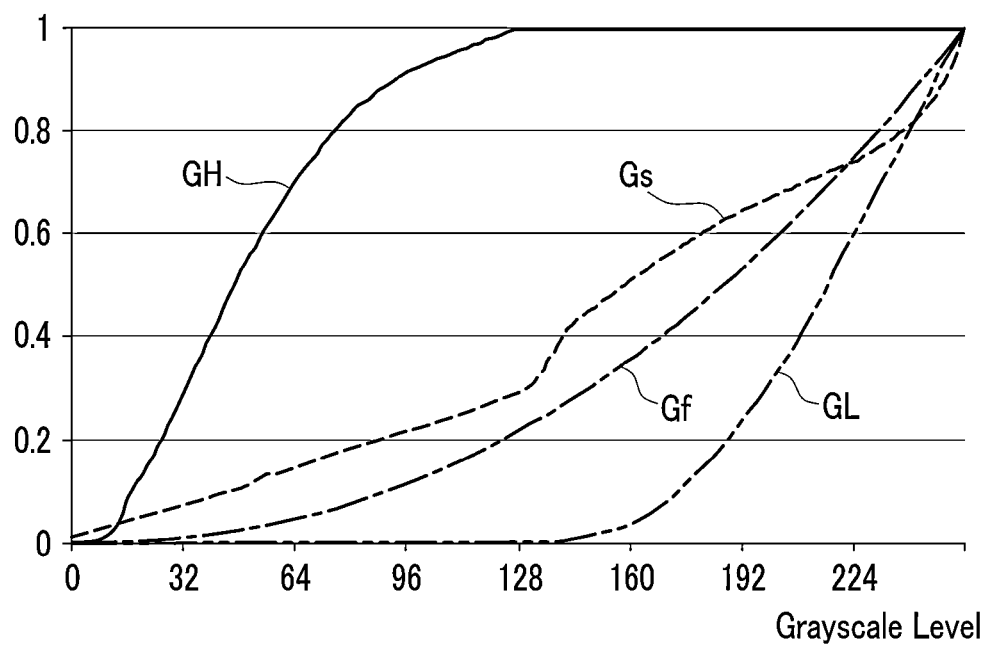
FIG. 3 is a graph of a gamma curve of an exemplary embodiment of a display device according to the invention.
Figure 4:
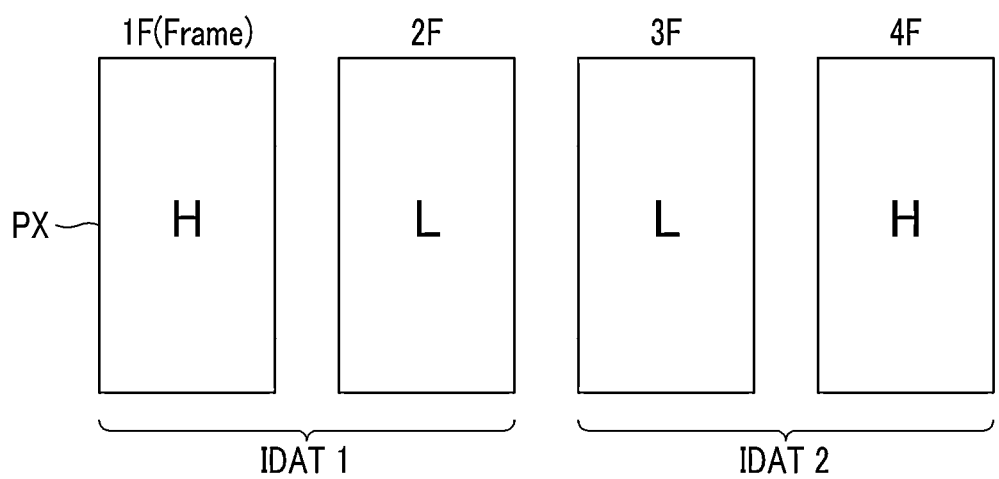

FIG. 2 is a circuit diagram showing a pixel of an exemplary embodiment of a display device according to the invention, FIG. 3 is a graph of a gamma curve of an exemplary embodiment of a display device according to the invention, and FIG. 4 to FIG. 6 are views showing luminance of a pixel during a frame sequence in an exemplary embodiment of a display device according to the invention.

Referring to FIG. 2, a pixel PX of an exemplary embodiment of the display device according to the invention may include a switching element Q connected to a data line, e.g., a j-th data line Dj, and at least one gate line, e.g., an i-th gate line Gi, and a pixel electrode 191 connected to the switching element Q. The switching element Q may include a thin film transistor, and is controlled according to the gate signal Vg transmitted by the gate line Gi, thereby transmitting the data voltage Vd transmitted by the data line Dj to the pixel electrode 191.

In an exemplary embodiment, the gamma data included in the memory 650 or the data driver 500 of the display device may include the gamma data for two and more different gamma curves.

In an exemplary embodiment, a pixel PX receives the data voltage Vd based on the different gamma curve during a plurality of frames of one frame set to display the image, and this is referred to as temporal division driving.

In an exemplary embodiment, referring to FIG. 3, the gamma data may include the gamma data for the first gamma curve GH and the second gamma curve GL. In such an embodiment, the luminance of the image based on the first gamma curve GH may be equal to or higher than the luminance of the image based on the second gamma curve GL.

The pixel PX receives the data voltage Vd based on the first gamma curve GH and the data voltage Vd based on the second gamma curve GL during the frame set including two or more consecutive frames for one input image signal IDAT to display the image. The image frequency may be 1/n (n is a natural number of 2 or more) of the frame frequency.

The first and second gamma curves GH and GL may be controlled to improve the lateral visibility such that a combination gamma curve in the front of the first and second gamma curves GH and GL conforms with a front gamma curve Gf (e.g., a gamma curve with a gamma value of about 2.2), which is determined to substantially maximize the display quality of the display device, and the combination gamma curve in the side is substantially close to the front gamma curve Gf in the front.

An exemplary embodiment of a driving method that improves the lateral visibility using the first and second gamma curves GH and GL will be described in greater detail with reference to FIG. 4 to FIG. 6.

Firstly, referring to FIG. 4, the pixel PX of an exemplary embodiment of the display device according to the invention may be driven on a frame-set-by-frame-set basis, where each frame set includes two consecutive frames. In one exemplary embodiment, for example, the image for the input image signal, e.g., a first input image signal IDAT1, may be displayed in two consecutive frames, e.g., first and second frames 1F and 2F, and the image for the next input image signal, e.g., a second input image signal IDAT2, may be displayed in next two consecutive frames, e.g., third and fourth frames 3F and 4F.

One of two frames included in one frame set displays an image (referred to as a first image H) based on the first gamma curve GH, and the other frame displays the image (referred to as a second image L) based on the second gamma curve GL. In an exemplary embodiment, where the method is based on temporal division driving, the images based on the different gamma curves are displayed in the consecutive frames such that the combination gamma curve in the side is substantially close to the front gamma curve, thereby substantially improving the lateral visibility. In an alternative exemplary embodiment, one pixel PX is not divided such that the transmittance may be improved.

In an exemplary embodiment, as shown in FIG. 4, when the first image H is displayed in the first frame of the frame set for a input image signal, e.g., the first input image signal IDAT1, and the second image L is displayed in the second frame, the second image L is displayed in the first frame and the first image H is displayed in the second frame in the frame set for the next input image signal, e.g., the second input image signal IDAT2. In such an embodiment, in the frame set for the next input image signal, e.g., the second input image signal IDAT2, the first image H may be displayed prior to the second image L.

As described above, in an exemplary embodiment where the display device is the liquid crystal display, when a display sequence of the first image H and the second image L in the consecutive frame set may be reversed, the second image L having the lower luminance is displayed in the consecutive frame such that the slow response speed of the liquid crystal molecules may be compensated. In such an embodiment a decreasing response speed when the inclination direction of the liquid crystal molecules is changed from the high luminance of the image to the low luminance may be obtained over a predetermined level to substantially improve the lateral visibility by applying the temporal division driving method, and at this time, the second image L having the low luminance is displayed in two consecutive frames such that the low gray may be effectively displayed in the temporal division driving, thereby substantially improving the lateral visibility.

In an exemplary embodiment of the invention, the decreasing response speed of the liquid crystal molecules may be effectively prevented to maximize the visibility. In one exemplary embodiment, for example, when the image is changed from the high luminance to the low luminance, the decreasing response speed of the liquid crystal molecules when the luminance of the image is changed from 99% to 1% of the difference between the two luminances may be less than about 4.17 milliseconds (ms) when the frame frequency is about 240 Hz and may be less than about 8.3 ms when the frame frequency is about 120 Hz.

As described above, when the sequence for displaying the first image H and the second image L may be reversed in the consecutive frame set, the first image H having the high luminance may also be displayed in the consecutive frames. Accordingly, when displaying the image of the high luminance after displaying the image of the low luminance, the response speed of the liquid crystal molecules is compensated, thereby substantially improving display quality in the high gray.

Next, referring to FIG. 5A, FIG. 5B, and FIG. 5C, the pixel PX of an exemplary embodiment of the display device may display the image for one input image signal IDAT during three frames as one frame set. In one exemplary embodiment, for example, the image for the first input image signal IDAT1 may be displayed in three consecutive frames, e.g., a first frame 1F, a second frame 2F and a third frame 3F, and the image for the next input image signal, e.g., the second input image signal IDAT2, may be displayed in next three consecutive frames, e.g., a fourth frame 4F, a fifth frame 5F and a sixth frame 6F.

In one exemplary embodiment, for example, as shown in FIG. 5A, the first frame of three frames included in one frame set may display the first image H and the other two frames may display the second image L. In such an embodiment, two consecutive frames display the second image L having the low luminance such that the slow response speed of the liquid crystal molecules of the liquid crystal display is compensated as described above, thereby substantially improving the lateral visibility.

As shown in FIG. 5B, the sequence of displaying the first image H and the second image L may be reversed in the consecutive frame set such that the second image L having the low luminance may be consecutively displayed in four consecutive frames and the first image H having the high luminance may be displayed in two consecutive frames.

As shown in FIG. 5C, the arrangement sequence of the first image H and the second image L may be substantially the same as each other in the consecutive frame set. In one exemplary embodiment, for example, among three frames included in one frame set, the first frame and the final frame may display the second image L and the second frame may display the first image H. In such an embodiment, two consecutive frames between two adjacent frame sets display the second image L having the low luminance such that the slow response speed of the liquid crystal molecules of the liquid crystal display is compensated, thereby substantially improving the lateral visibility. In such an embodiment, the first image H having the high luminance may be displayed in two consecutive frames, such that the slow response speed of the liquid crystal molecules may be compensated when displaying the image of the high luminance in the low luminance.

In an alternative exemplary embodiment, referring to FIG. 6, the pixel PX may display the image for an input image signal IDAT during four consecutive frames as one frame set. In one exemplary embodiment, for example, the image for the first input image signal IDAT1 may be displayed in four consecutive frames, e.g., a first frame 1F, a second frame 2F, a third frame 3F and a fourth frame 4F, and the image for the next input image signal, e.g., the second input image signal IDAT2, may be displayed in four consecutive frames, e.g., a fifth frame 5F, a sixth frame 6F, a seventh frame 7F and an eighth frame 8F. As shown in FIG. 6, the first frame among four frames included in one frame set may display the first image H and the other three frames may display the second image L. In such an embodiment, three consecutive frames display the second image L having the low luminance such that the slow response speed of the liquid crystal molecules of the liquid crystal display is compensated substantially in a same manner as described above, thereby substantially improving the lateral visibility.

In an alternative exemplary embodiment, the sequence of displaying the first image H and the second image L may be reversed from the sequence shown in FIG. 6 in the consecutive frame set, and the second image L may be displayed in six consecutive frames and the first image H may be displayed in two consecutive frames.

In an alternative exemplary embodiment, the image for an input image signal IDAT may be displayed during five or more consecutive frames as one frame set. In such an embodiment, the frame of the second image L having the low luminance sufficiently and consecutively displays the low gray at a maximum in the frame set, thereby substantially improving the lateral visibility.

Next, referring to FIG. 7, an exemplary embodiment of a display device according to the invention will be described.

Figure 7:
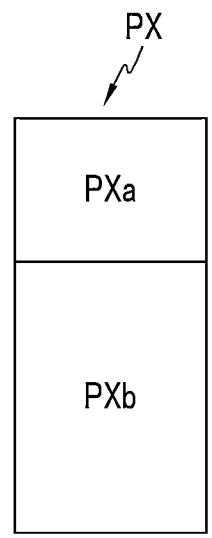
FIG. 7 is a view of two subpixels of a pixel of an exemplary embodiment of a display device according to the invention.

FIG. 7 is a view of two subpixels in a pixel of an exemplary embodiment of a display device according to the invention.

Referring to FIG. 7, in an exemplary embodiment, a pixel PX of the display device may include a first subpixel PXa and a second subpixel PXb. The first subpixel PXa and the second subpixel PXb may display the image of a same input image signal IDAT based on different gamma curve or may display the image of the same input image signal IDAT based on a same gamma curve. In an exemplary embodiment, when the first and second subpixels PXa and PXb display the image of the same input image signal IDAT based on the different gamma curve, the lateral visibility is substantially improved, and this is referred to as a spatial division driving. In an exemplary embodiment, areas of the first subpixel PXa and the second subpixel PXb may be substantially the same as each other. In an alternative exemplary embodiment, the area of the second subpixel PXb may be greater than the area of the first subpixel PXa.

Structures of the display device including the first subpixel PXa and the second subpixel PXb will be described in greater detail with reference to FIG. 8 to FIG. 16.

Firstly, referring to FIG. 8, FIG. 9 and FIG. 10, an exemplary embodiment of the display device according to the invention will be described.

Figure 8:
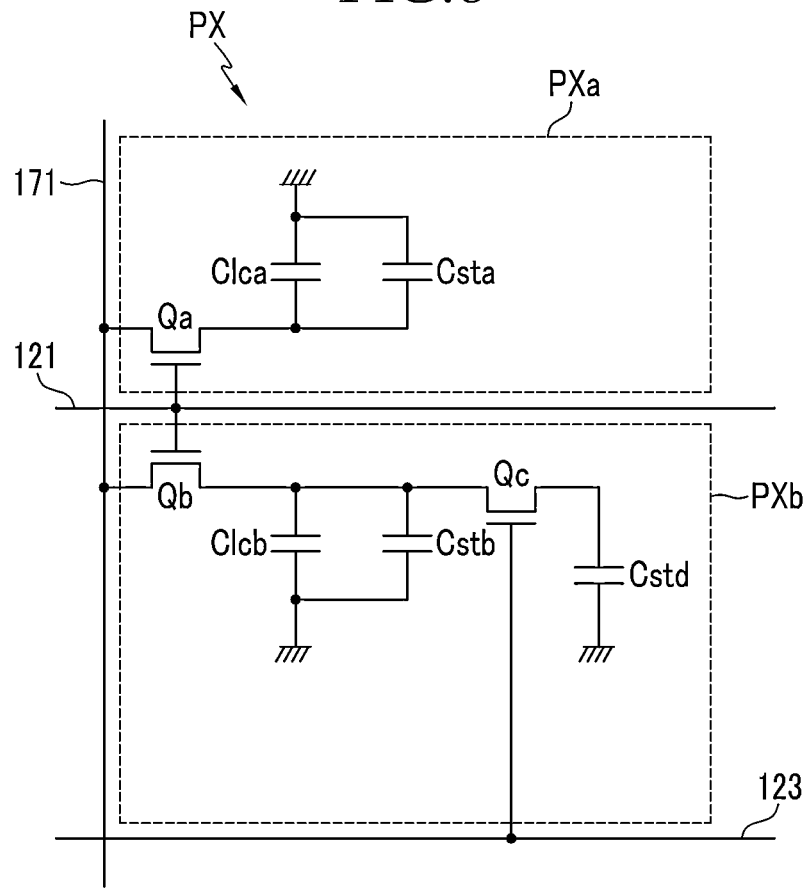
FIG. 8 is an equivalent circuit diagram showing a pixel of an exemplary embodiment of a display device according to the invention.
Figure 9:
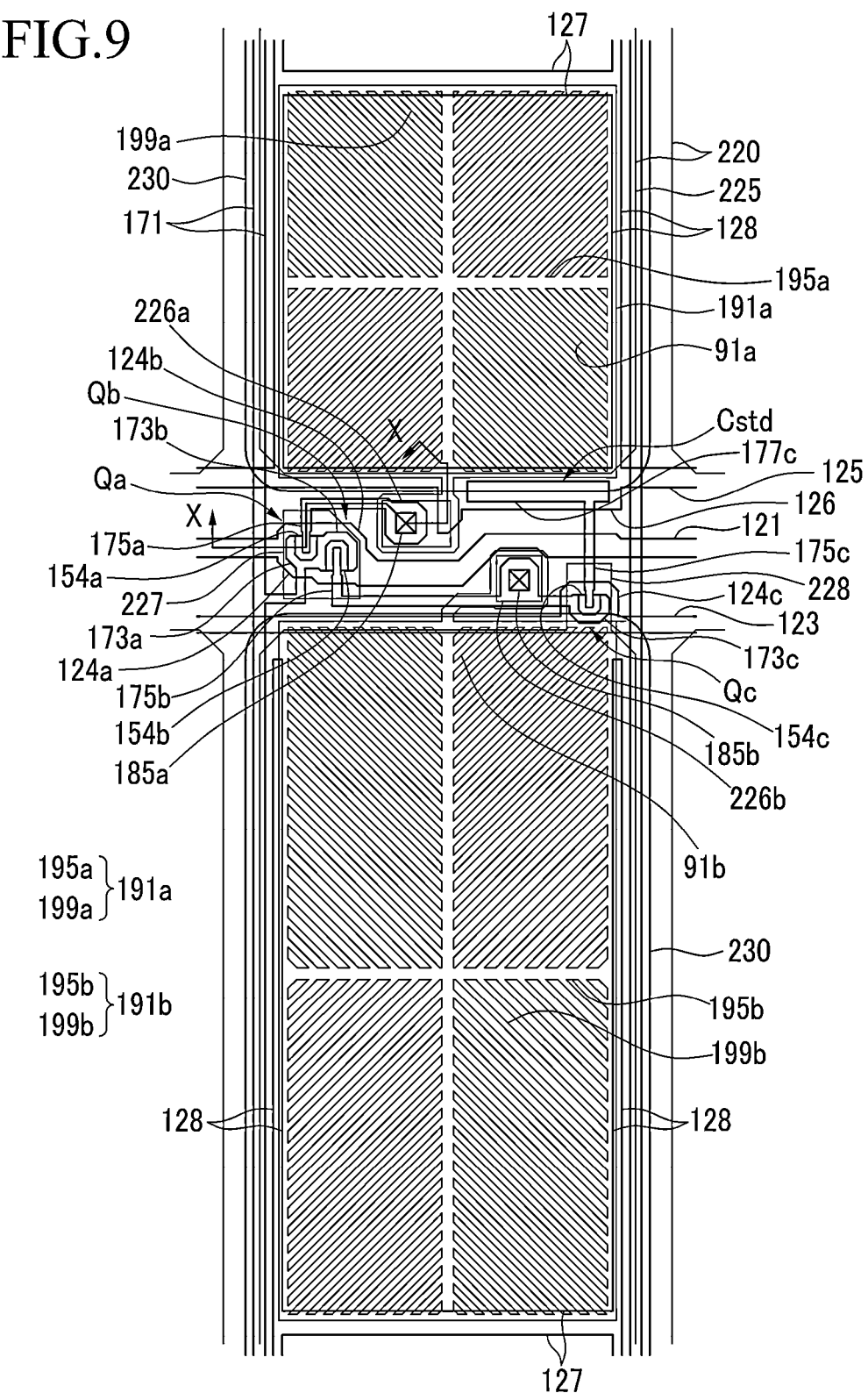
FIG. 9 is a top plan view of a pixel of an exemplary embodiment of a display device according to the invention.
Figure 10:
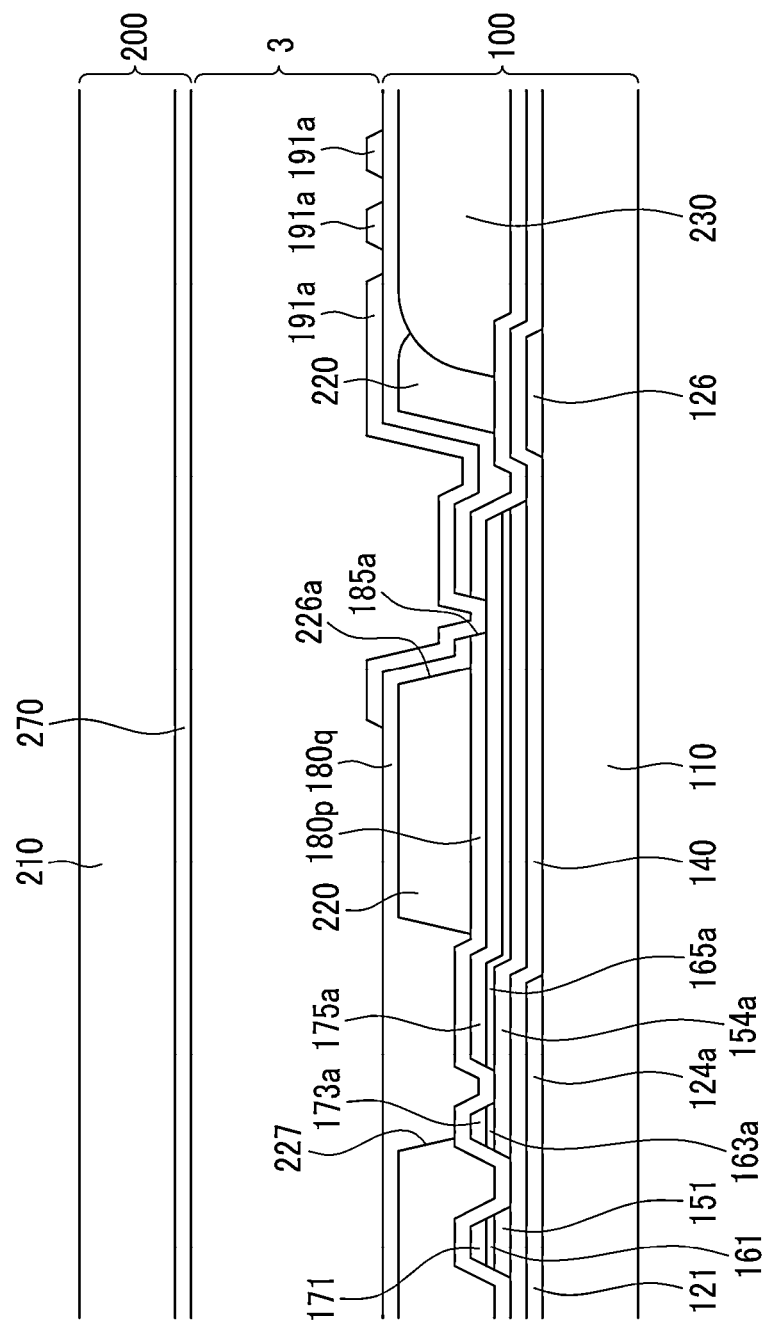
FIG. 10 is a cross-sectional view of taken along line X-X the display device of FIG. 9.

FIG. 8 is an equivalent circuit diagram showing a pixel of an exemplary embodiment of a display device according to the invention, FIG. 9 is a top plan view of a pixel of an exemplary embodiment of a display device according to the invention, and FIG. 10 is a cross-sectional view taken along line X-X of the display device of FIG. 9.

Firstly, referring to FIG. 8, an exemplary embodiment of the display device according to the invention is a liquid crystal display, and the display device includes signal lines including a gate line 121, a down gate line 123 and a data line 171, and a pixel PX connected to the signal lines.

Each pixel PX includes first and second subpixels PXa and PXb. The first subpixel PXa includes a first switching element Qa, a first liquid crystal capacitor Clca and a first storage capacitor Csta, and the second subpixel PXb includes second and third switching elements Qb and Qc, a second liquid crystal capacitor Clcb, a second storage capacitor Cstb and a down capacitor Cstd.

The first and second switching elements Qa and Qb are connected to the gate line 121 and the data line 171, respectively, and the third switching element Qc is connected to the down gate line 123.

Each of the first and second switching elements Qa and Qb, which may be three-terminal elements such as thin film transistors, include a control terminal connected to the gate line 121, an input terminal connected to the data line 171, and an output terminal connected to the first or second liquid crystal capacitors Clca or Clcb and the first or second storage capacitors Csta or Cstb.

The third switching element Qc, which may be a three-terminal element such as a thin film transistor, includes a control terminal connected to the down gate line 123, an input terminal connected to the second liquid crystal capacitor Clcb, and an output terminal connected to the down capacitor Cstd.

The down capacitor Cstd is connected to the output terminal of the third switching element Qc and a common voltage.

The operation of the pixel PX will be described in detail. When the gate line 121 is applied with the gate-on voltage, the first and second thin film transistors Qa and Qb connected to the gate line 121 are turned on. Accordingly, the data voltage of the data line 171 is applied to the first and second liquid crystal capacitors Clca and Clcb through the turned-on first and second switching elements Qa and Qb such that the first and second liquid crystal capacitors Clca and Clcb are charged with a difference between the data voltages Vd and the common voltage. At this time, the down gate line 123 is applied with the gate-off voltage Voff.

When the gate line 121 is applied with the gate-off voltage, and simultaneously the down gate line 123 is applied with the gate-on voltage, the first and second switching elements Qa and Qb connected to the gate line 121 are turned off, and the third switching element Qc is turned on. Accordingly, the charged voltage of the second liquid crystal capacitor Clcb connected to the output terminal of the second switching element Qb is decreased.

In an exemplary embodiment, where the liquid crystal display is driven by frame inversion and the data voltage Vd of the positive polarity with reference to the common voltage is applied to the data line 171 in a current frame, the negative charges are gathered at the down capacitor Cstd after a previous frame end. When the third switching element Qc is turned on in the current frame, the positive charges of the second liquid crystal capacitor Clcb flow to the down capacitor Cstd through the third switching element Qc such that the positive charges are gathered at the down capacitor Cstd and the voltage of the second liquid crystal capacitor Clcb is decreased. In a subsequent frame, in such an embodiment, the negative charges are charged to the second liquid crystal capacitor Clcb, and as the third switching element Qc is turned on, the negative charges of the second liquid crystal capacitor Clcb flow into the down capacitor Cstd such that the negative charges are gathered at the down capacitor Cstd and the voltage of the second liquid crystal capacitor Clcb is also decreased.

As described above, in an exemplary embodiment, the charged voltage of the second liquid crystal capacitor Clcb is lower than the charged voltage of the first liquid crystal capacitor Clca regardless of the polarity of the data voltage. Accordingly, the charged voltages of the first and second liquid crystal capacitors Clca and Clcb are different such that the lateral view of the liquid crystal display is substantially improved.

Next, referring to FIG. 9 and FIG. 10, the structure of the liquid crystal display shown in FIG. 8 will be described in detail.

Referring to FIG. 9 and FIG. 10, the liquid crystal display includes two display panels, e.g., a lower panel 100 and an upper panel 200, disposed opposite to, e.g., facing, each other, and a liquid crystal layer 3 interposed between the two display panels 100 and 200. Polarizers (not shown) may be provided on outer surfaces of the two display panels 100 and 200.

Firstly, the upper panel 200 will be described. In the upper panel 200, an opposing electrode 270 is disposed, e.g., formed, on an insulation substrate 210 of the upper panel 200. The opposing electrode 270 may include a transparent conductor or metal such as indium tin oxide ("ITO") and indium zinc oxide ("IZO"). An alignment layer (not shown) may be provided on the opposing electrode 270.

The liquid crystal layer 3 between the lower panel 100 and the upper panel 200 includes liquid crystal molecules having negative dielectric anisotropy, and may be oriented such that the longitudinal axes of the liquid crystal molecules of the liquid crystal layer 3 are substantially perpendicular to the surfaces of the two display panels 100 and 200 when no electric field is generated in the liquid crystal layer 3. The liquid crystal molecules of the liquid crystal layer 3 may be arranged to be pretilted substantially parallel to a length direction of minute branches 199a and 199b of first and second subpixel electrodes 191a and 191b. In an exemplary embodiment, the liquid crystal layer 3 may further include an alignment assistant including a reactive mesogen.

Next, the lower panel 100 will be described.

In the lower panel 100, a plurality of gate conductors including a plurality of gate lines 121, a plurality of down gate lines 123 and a plurality of storage electrode lines 125 are disposed on an insulation substrate 110 of the lower panel 100.

The gate lines 121 and the down gate lines 123 transfer gate signals and extend substantially in a horizontal direction. Each gate line 121 includes a first gate electrode 124a and a second gate electrode 124b protruding upwardly and downwardly therefrom, and each down gate line 123 includes a third gate electrode 124c protruding upwardly therefrom. The first gate electrode 124a and the second gate electrode 124b are connected to each other, thereby defining a protrusion.

The storage electrode line 125 may extend substantially in the horizontal direction and may be positioned directly on the gate line 121, and transmits a predetermined voltage such as a common voltage. The storage electrode line 125 includes a storage expansion 126, a pair of vertical portions 128, which is substantially vertical to the gate line 121, and a horizontal portion 127, which connects a pair of longitudinal portions 128 to each other, however the structure of the storage electrode line 125 is not limited thereto.

A gate insulating layer 140 is disposed on the gate conductors 121, 123 and 125.

A plurality of semiconductor stripes 151 including hydrogenated amorphous silicon ("a-Si") or polysilicon, for example, are disposed on the gate insulating layer 140. The semiconductor stripes 151 extend in the vertical direction, and each semiconductor stripe 151 includes first and second semiconductors 154a and 154b extending toward the first and second gate electrodes 124a and 124b and connected to each other, and a third semiconductor 154c connected to the second semiconductor 154b.

A plurality of ohmic contact stripes 161 are disposed on the semiconductor stripes 151, ohmic contacts 163a and 165a are disposed on the first semiconductor 154a, and ohmic contacts are disposed on the second semiconductor 154b and the third semiconductor 154c. The ohmic contact 165a may extend from the ohmic contact stripe 161. In an alternative exemplary embodiment, the ohmic contacts 161 and 165a may be omitted. In one exemplary embodiment, for example, the semiconductors 151, 154a and 154b may be oxide semiconductors, and the ohmic contacts 161 and 165 may be omitted.

A data conductor including a plurality of data lines 171, a plurality of first drain electrodes 175a, a plurality of second drain electrodes 175b, and a plurality of third drain electrodes 175c is disposed on the ohmic contacts 161 and 165a.

The data lines 171 transmit data signals and extend substantially in the vertical direction and crossing the gate lines 121 and the down gate lines 123. Each data line 171 may include a first source electrode 173a and a second source electrode 173b extending toward the first gate electrode 124a and the second gate electrode 124b.

The first drain electrode 175a, the second drain electrode 175b and the third drain electrode 175c have one end portion having a wide area and the other end portion having a bar shape. The bar end portions of the first drain electrode 175a and the second drain electrode 175b are partially enclosed by the first source electrode 173a and the second source electrode 173b. The wide end portion of the second drain electrode 175b further extends, thereby forming a third source electrode 173c of a U-like shape. A wide end 177c of the third drain electrode 175c overlaps the storage expansion 126, thereby defining a down capacitor Cstd, and the bar end portion is partially enclosed by the third source electrode 173c.

The first/second/third gate electrode 124a/124b/124c, the first/second/third source electrode 173a/173b/173c, and the first/second/third drain electrode 175a/175b/175c collectively define a first/second/third thin film transistor ("TFT") Qa/Qb/Qc, respectively, along with the first/second/third semiconductor 154a/154b/154c, and a channel of the thin film transistor is respectively formed in the semiconductor 154a/154b/154c between the source electrode 173a/173b/173c and the drain electrode 175a/175b/175c.

A lower passivation layer 180p including an inorganic insulator such as silicon nitride or silicon oxide is disposed on the data conductors 171, 175a, 175b and 175c and the exposed semiconductors 154a, 154b and 154c.

A color filter 230 and a light blocking member 220 may be disposed on the lower passivation layer 180. The light blocking member 220 may include a portion covering a region where the first thin film transistor Qa, the second thin film transistor Qb and the third thin film transistor Qc are positioned and a portion extending along the data line 171. The light blocking member 220 may include an opening 227 formed in a position corresponding to, e.g., overlapping, the first thin film transistor Qa and the second thin film transistor Qb, an opening 226a formed in a position corresponding to the wide end of the first drain electrode 175a, an opening 226b formed in a position corresponding to the wide end of the second drain electrode 175b, and an opening 228 formed in a position corresponding to the third thin film transistor Qc. In an alternative exemplary embodiment, at least one of the color filter 230 and the light blocking member 220 may be disposed in the upper panel 200.

An upper passivation layer 180q is disposed on the color filter 230 and the light blocking member 220.

A plurality of contact holes, e.g., a first contact hole 185a and a second contact hole 185b, exposing the wide ends of the first drain electrode 175a and the second drain electrode 175b, respectively, is formed in the lower passivation layer 180p and the upper passivation layer 180q. The contact holes 185a and 185b are formed in positions corresponding to the openings 226a and 226b of the light blocking member 220.

A pixel electrode including the first subpixel electrode 191a and the second subpixel electrode 191b is disposed on the upper passivation layer 180q.

The first and second subpixel electrodes 191a and 191b may be adjacent to each other in the vertical direction, or in a column direction of the pixels, which may be substantially in a matrix form, and a height of the second subpixel electrode 191b is greater than the height of the first subpixel electrode 191a.

An overall shape of the first subpixel electrode 191a is substantially quadrangular, and includes an outer portion defining the overall shape, a cross stem 195a including a horizontal stem and a vertical stem, and a plurality of minute branches 199a obliquely extending from the cross stem 195a. A minute slit 91a is defined between the adjacent minute branches 199a.

An overall shape of the second subpixel electrode 191b is substantially quadrangular, and includes an outer portion defining the overall shape, a cross stem 195b including a horizontal stem and a vertical stem, and a plurality of minute branches 199b obliquely extending from the cross stem 195b. A minute slit 91b is defined between the adjacent minute branches 199b.

Each of the first subpixel electrode 191a and the second subpixel electrode 191b is divided into four subregions by the cross stems 195a and 195b. Referring to FIG. 9, in an exemplary embodiment, each subregion of the second subpixel electrode 191b may include a region where the interval between the minute branches 199b is different according to the position, however not being limited thereto. In an alternative exemplary embodiment, the interval between the minute branches 199b may be substantially uniform. The detailed structure of the first and second subpixel electrodes 191a and 191b is not limited to those shown in FIG. 9 and may be variously changed, and an area of each portion may be changed according to design factors such as a cell gap, type and characteristics of the liquid crystal layer 3.

The first subpixel electrode 191a receives the data voltage from the first drain electrode 175a through the first contact hole 185a, and the second subpixel electrode 191b receives the data voltage from the second drain electrode 175b through the second contact hole 185b.

An alignment layer (not shown) may be disposed on the first and second subpixel electrodes 191a and 191b and the upper passivation layer 180q.

The first and second sub-pixel electrodes 191a and 191b form an electric field along with the opposing electrode 270 of the upper panel 200, and the electric field determines the direction of the liquid crystal molecules in the liquid crystal layer 3 between the two electrodes 191 and 270. The change degree of the polarization of light that is incident to the liquid crystal layer 3 is changed according to the inclination degree of the liquid crystal molecules, and such a change of polarization appears as a change of transmittance by the polarizer, thereby displaying images of the liquid crystal display.

In an exemplary embodiment, the edges of the minute branches 199a and 199b or the minute slits 91a and 91b included in the first and second subpixel electrodes 191a and 191b distort the electric field to make the horizontal components thereof substantially perpendicular to the edges of the minute branches 199a and 199b or the minute slits 91a and 91b, and the inclination direction of the liquid crystal molecules 31 is determined according to the direction of the horizontal components. In an exemplary embodiment, where the liquid crystal molecules firstly tend to tilt in the direction substantially perpendicular to the edges of the minute branches 199a and 199b or the minute slits 91a and 91b, the directions of the horizontal components of the electric field caused by the neighboring minute branches 199a and 199b or minute slits 91a and 91b are opposite to each other, and the widths between the minute branches 199a and 199b or the minute slits 91a and 91b are narrow such that the liquid crystal molecules that tend to arrange in opposite directions are tilted in the direction substantially parallel to the length direction of the minute branches 199a and 199b or minute slits 91a and 91b.

In an exemplary embodiment of the invention, the first and second subpixel electrodes 191a and 191b include four subregions where the length directions of the minute branches 199a and 199b or the minute slits 91a and 91b are different from each other such that the inclined directions of the liquid crystal molecules of the liquid crystal layer 3 has four different directions such that the viewing angle of the liquid crystal display is widened by varying the inclined directions of the liquid crystal molecules.

The first subpixel electrode 191a and the opposing electrode 270 form the first liquid crystal capacitor Clca along with the liquid crystal layer 3 interposed therebetween, and the second subpixel electrode 191b and the opposing electrode 270 form the second liquid crystal capacitor Clcb along with the liquid crystal layer 3 interposed therebetween, thereby maintaining the voltage after the first and second thin film transistors Qa and Qb are turned off.

The first and second subpixel electrodes 191a and 191b overlap the storage electrode lines 125, thereby forming the first and second storage capacitors Csta and Cstb.

The operation and a method for improving the visibility of the liquid crystal display shown in FIGS. 9 and 10 is substantially the same as those described referring to FIG. 8.

Next, referring to FIG. 11 to FIG. 13, an exemplary embodiment of the display device according to the invention will be described. The same constituent elements as the previous exemplary embodiment are indicated by the same reference numerals, and the same description is omitted.

Figure 11:
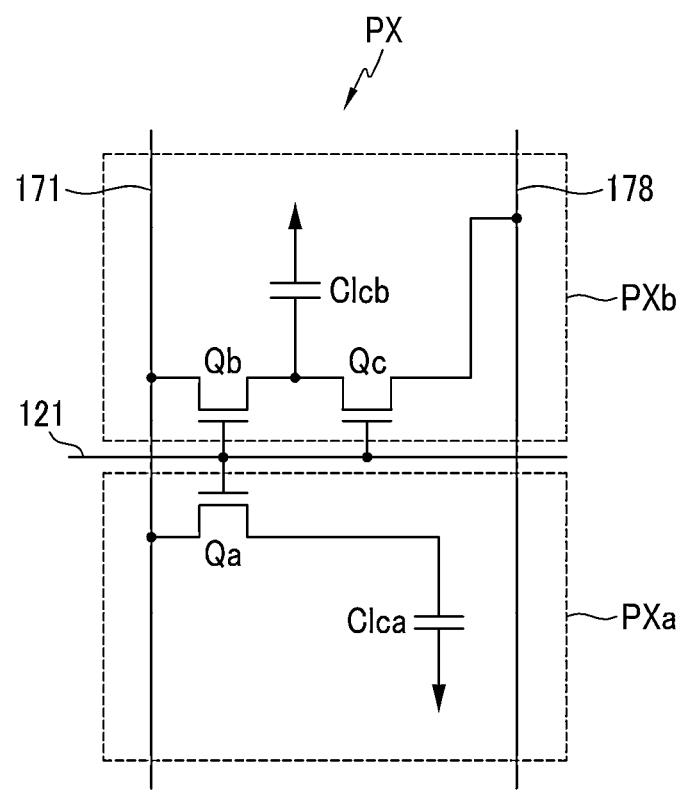
FIG. 11 is an equivalent circuit diagram of a pixel of an exemplary embodiment of a display device according to the invention.
Figure 12A:
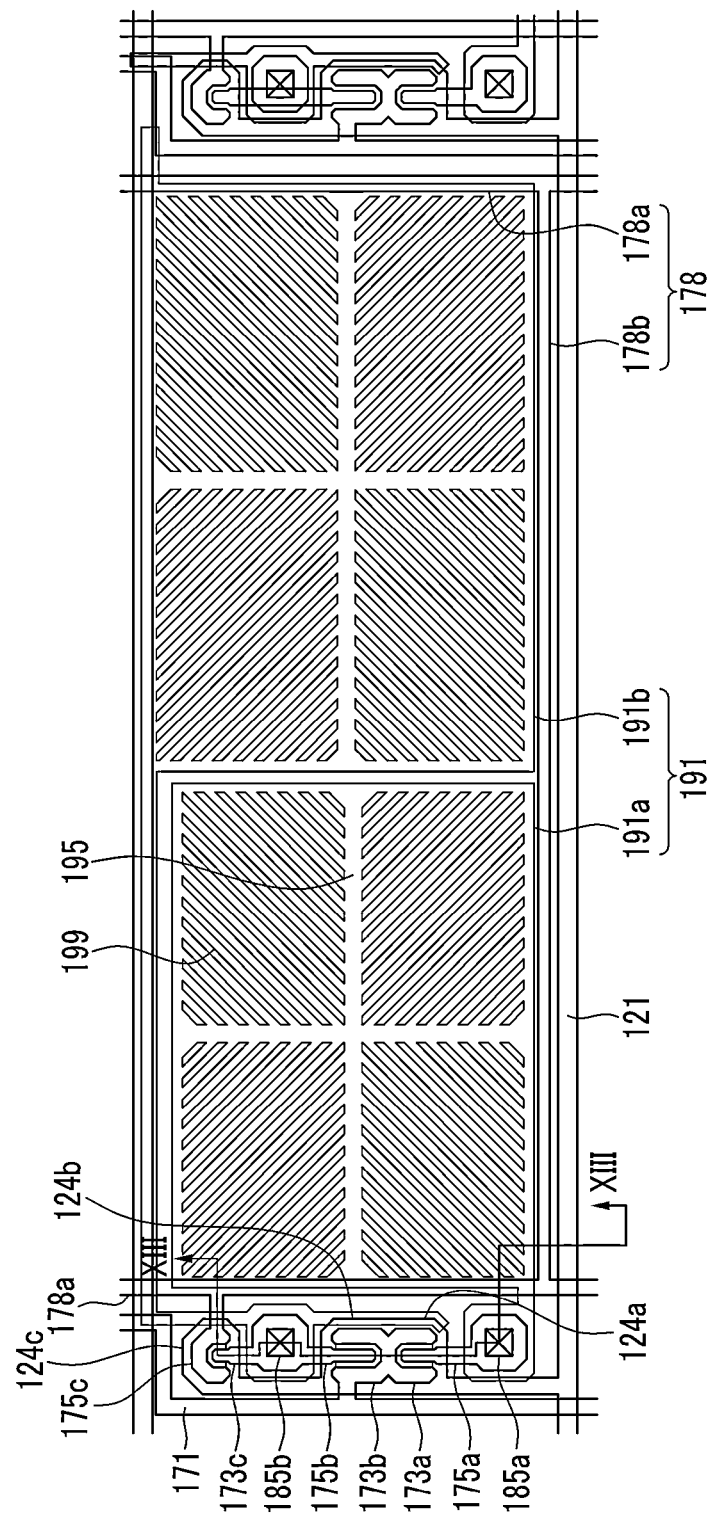
FIG. 12A and FIG. 12B are top plan views of a pixel of an exemplary embodiment of a display device according to the invention.
Figure 12B:
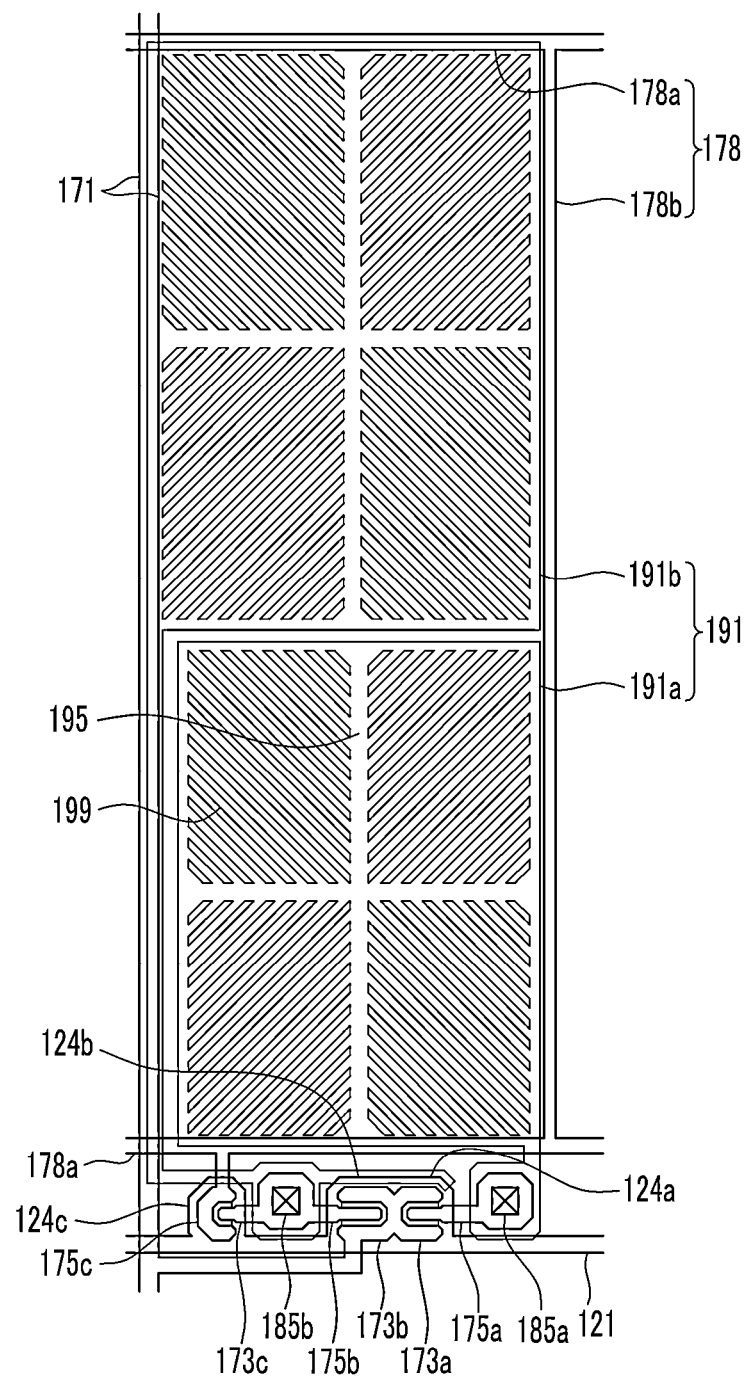
Figure 13:
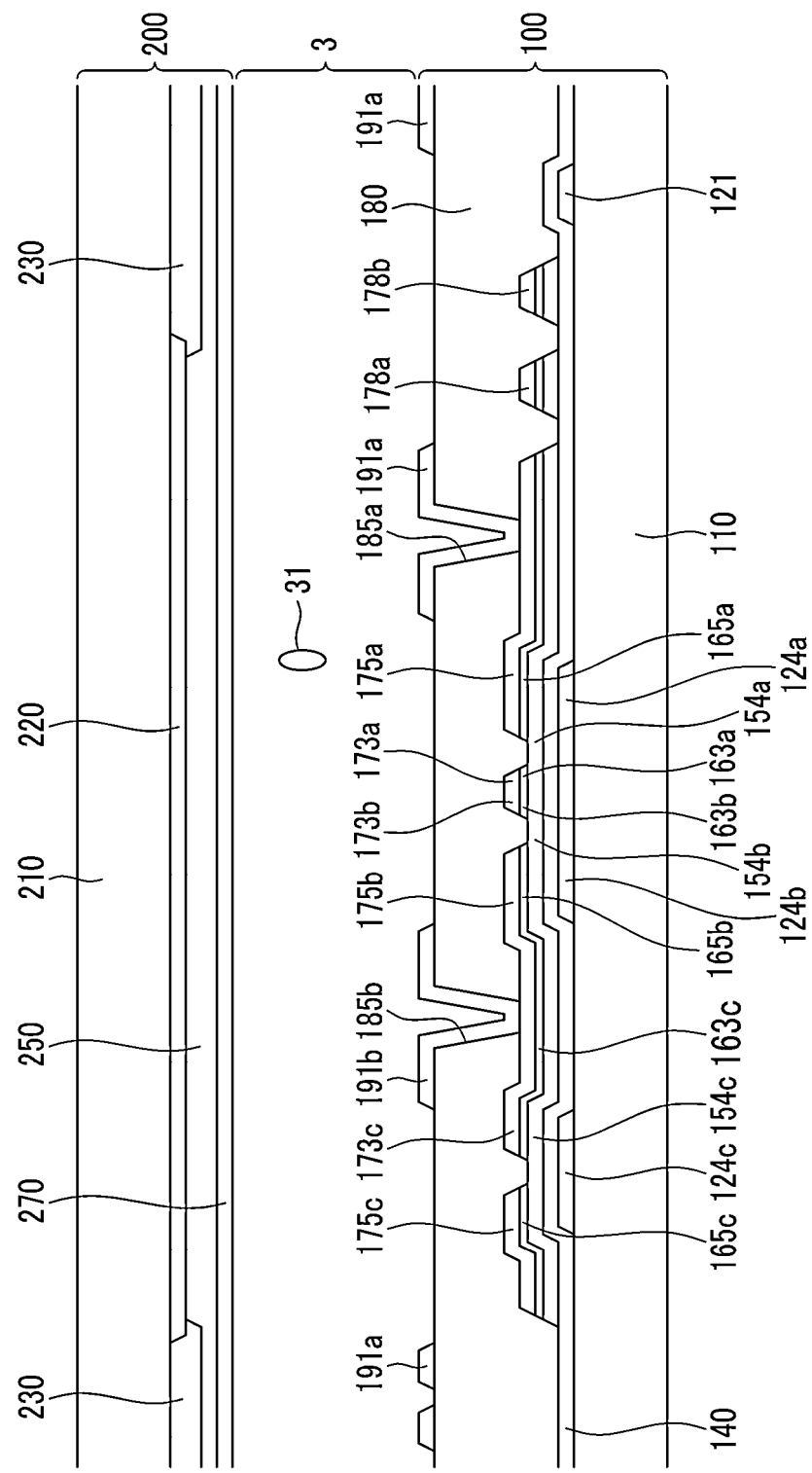
FIG. 13 is a cross-sectional view taken along line XIII-XIII of the display device of FIG. 12A.

FIG. 11 is an equivalent circuit diagram of a pixel of an exemplary embodiment of a display device according to the invention, FIG. 12A and FIG. 12B are top plan views of a pixel of an exemplary embodiment of a display device according to the invention, and FIG. 13 is a cross-sectional view taken along line XIII-XIII of the display device of FIG. 12A.

Firstly, referring to FIG. 11, in an exemplary embodiment, a display device is a liquid crystal display, and includes signal lines including a gate line 121 for transmitting the gate signal, a data line 171 for transmitting the data signal, a reference voltage line 178 for transmitting a reference voltage, and a pixel PX connected to the signal lines.

A pixel PX of the display device includes the first and the second subpixels PXa and PXb. The first subpixel PXa includes the first switching element Qa and the first liquid crystal capacitor Clca, and the second subpixel PXb includes the second and third switching elements Qb and Qc and the second liquid crystal capacitor Clcb.

The first and second thin film transistors Qa and Qb are connected to the gate line 121 and the data line 171, respectively, and the third thin film transistor Qc is connected to the output terminal of the second switching element Qb and the reference voltage line 178.

The first switching element Qa and the second switching element Qb, which may be a three-terminal elements such as thin film transistors, include the control terminal connected to the gate line 121, the input terminal connected to the data line 171, the output terminal of the first switching element Qa connected to the first liquid crystal capacitor Clca, and the output terminal of the second switching element Qb connected to the input terminal of the second liquid crystal capacitor Clcb and the third switching element Qc.

The third switching element Qc, which may be a three-terminal element such as the thin film transistor, includes the control terminal connected to the gate line 121, the input terminal connected to the second liquid crystal capacitor Clcb, and the output terminal connected to the reference voltage line 178.

The operation of the pixel PX shown in FIG. 11 will now be described. Firstly, when the gate line 121 is applied with the gate-on voltage, the first switching element Qa, the second switching element Qb and the third switching element Qc connected to the gate line 121 are turned on. Accordingly, the data voltage applied to data line 171 is applied to the first liquid crystal capacitor Clca and the second liquid crystal capacitor Clcb through the turned-on first switching element Qa and the turned-on second switching element Qb such that the first liquid crystal capacitor Clca and the second liquid crystal capacitor Clcb are charged by the difference between the data voltage Vd and the common voltage. When the data voltage Vd is applied to the first liquid crystal capacitor Clca and the second liquid crystal capacitor Clcb, the first liquid crystal capacitor Clcb and the second liquid crystal capacitor Clcb are applied with a same voltage, e.g., the data voltage Vd, through the first and second switching elements Qa and Qb, however the charging voltage of the second liquid crystal capacitor Clcb is divided by the third switching element Qc. Accordingly, the charging voltage of the second liquid crystal capacitor Clcb is smaller than the charging voltage of the first liquid crystal capacitor Clca such that the luminance of the two subpixels PXa and PXb may be different from each other. Accordingly, by properly controlling the voltage charged in the first liquid crystal capacitor Clca and the voltage charged in the second liquid crystal capacitor Clcb, an image viewed from the side may be controlled to be substantially close to an image viewed from the front, thereby substantially improving side visibility.

Next, the structure of an exemplary embodiment of the liquid crystal display shown in FIG. 11 will be described in greater detail with reference to FIG. 12A and FIG. 13.

Referring to FIG. 12A and FIG. 13, an exemplary embodiment of the liquid crystal display may include two panels, e.g., the lower panel 100 and the upper panel 200, facing each other, the liquid crystal layer 3 interposed between the two display panels 100 and 200, and a pair of polarizers (not shown) disposed on, e.g., attached to, the outer surfaces of the two display panels 100 and 200.

Firstly, the lower panel 100 will be described. In the lower panel 100, the gate line 121 is disposed on the insulation substrate 110 thereof. The gate line 121 includes the first gate electrode 124a, the second gate electrode 124b and the third gate electrode 124c.

The gate insulating layer 140 is disposed on the gate line 121, and the first semiconductor 154a, the second semiconductor 154b and the third semiconductor 154c are disposed on the gate insulating layer 140.

A plurality of ohmic contacts 163a, 165a, 163b, 165b, 163c and 165c may be disposed on the first semiconductor 154a, the second semiconductor 154b and the third semiconductor 154c.

Data conductors including a plurality of data lines 171 including the first source electrode 173a, the second source electrode 173b, the first drain electrode 175a, the second drain electrode 175b, the third source electrode 173c, the third drain electrode 175c and the reference voltage line 178 are disposed on the ohmic contacts 163a, 165a, 163b, 165b, 163c and 165c and the gate insulating layer 140.

The reference voltage line 178 may include two stems 178a substantially parallel to the data line 171, and a connection 178b that connects the two stems 178a to each other. In such an embodiment, a delay of the signal flowing to the reference voltage line 178 may be effectively prevented by connecting the two stems 178a of the reference voltage line 178 through the connection 178b. In an exemplary embodiment, the shape of the reference voltage line 178 is not limited thereto, and may be variously changed.

The first gate electrode 124a, the first source electrode 173a and the first drain electrode 175a form the first thin film transistor Qa along with the first semiconductor 154a, the second gate electrode 124b, the second source electrode 173b and the second drain electrode 175b form the second thin film transistor Qb along with the second semiconductor 154b, and the third gate electrode 124c, the third source electrode 173c and the third drain electrode 175c form the third thin film transistor Qc along with the third semiconductor 154c.

A passivation layer 180 is disposed on the data conductors 171, 173c, 175a, 175b, 175c and 177 and the exposed semiconductors 154a, 154b, and 154c. A plurality of contact holes 185a and 185b exposing the first drain electrode 175a and the second drain electrode 175b is$_{[JK1]}$ formed in the passivation layer 180.

A pixel electrode 191 including the first subpixel electrode 191a and the second subpixel electrode 191b is formed on the passivation layer 180.

The pixel electrode 191 may include a first edge substantially parallel to the gate line 121 and a second edge substantially parallel to the data line 171. In an exemplary embodiment, the first edge substantially parallel to the gate line 121 may be longer than the second edge substantially parallel to the data line 171. In such an embodiment, the number of the data lines 171 positioned in the display panel 300 may be reduced such that the number of the driving circuit chips included in the data driver 500 is reduced.

The first subpixel electrode 191a and the second subpixel electrode 191b may be adjacent in the horizontal direction. Each of the first and second subpixel electrodes 191a and 191b may include a cross stem 195 and a plurality of minute branches 199.

The first subpixel electrode 191a and the second subpixel electrode 191b are physically and electrically connected to the first drain electrode 175a and the second drain electrode 175b through the first and second contact holes 185a and 185b, respectively, thereby receiving the data voltage from the first drain electrode 175a and the second drain electrode 175b. When receiving the data voltage from the first drain electrode 175a and the second drain electrode 175b, a portion of the data voltage applied to the second drain electrode 175b is divided by the third source electrode 173c such that the voltage applied to the second subpixel electrode 191b may be less than the voltage applied to the first subpixel electrode 191a.

The area of the second subpixel electrode 191b may be equal to or greater than the area of the first subpixel electrode 191a.

In an exemplary embodiment, the voltage applied to the reference voltage line 178 may be greater than the voltage applied to the common voltage, and an absolute value of the difference therebetween may be in a range of about 1 volt (V) to about 4 volts (V).

Next, the upper panel 200 will be described. In the upper panel 200, a light blocking member 220 and a color filter 230 are disposed on the insulation substrate 210 thereof. In an alternative exemplary embodiment, at least one of the light blocking member 220 and the color filter 230 may be positioned in the lower panel 100.

An overcoat 250 is disposed on the color filter 230 and the light blocking member 220. In an alternative exemplary embodiment, the overcoat 250 may be omitted.

An opposing electrode 270 is disposed on the overcoat 250.

Alignment layers may be disposed on both surfaces of the display panels 100 and 200, and may be vertical alignment layers.

The liquid crystal layer 3 including the liquid crystal molecules 31 and the image display method of the pixel PX are substantially the same the exemplary embodiment of the display panel shown in FIGS. 9 and 10, and any repetitive detailed description thereof will be omitted.

Referring to FIG. 12B, an alternative exemplary embodiment of the display device the invention is substantially the same as the exemplary embodiment shown in FIG. 12A, except that the gate line 121 extends in the horizontal direction and the data line 171 extends in the vertical direction, thereby intersecting the gate line 121. The same or like elements shown in FIG. 12A have been labeled with the same reference characters as used above to describe the exemplary embodiments of the display device shown in FIG. 12B, and any repetitive detailed description thereof will be omitted.

In an exemplary embodiment, as shown in FIG. 12B, among the edges of the pixel electrode 191, the edge substantially parallel to the gate line 121 may be shorter than the edge substantially parallel to the data line 171. The first subpixel electrode 191a and the second subpixel electrode 191b may be neighboring in the vertical direction.

Next, referring to FIG. 14, an alternative exemplary embodiment of a display device according to the invention will be described.

Figure 14:
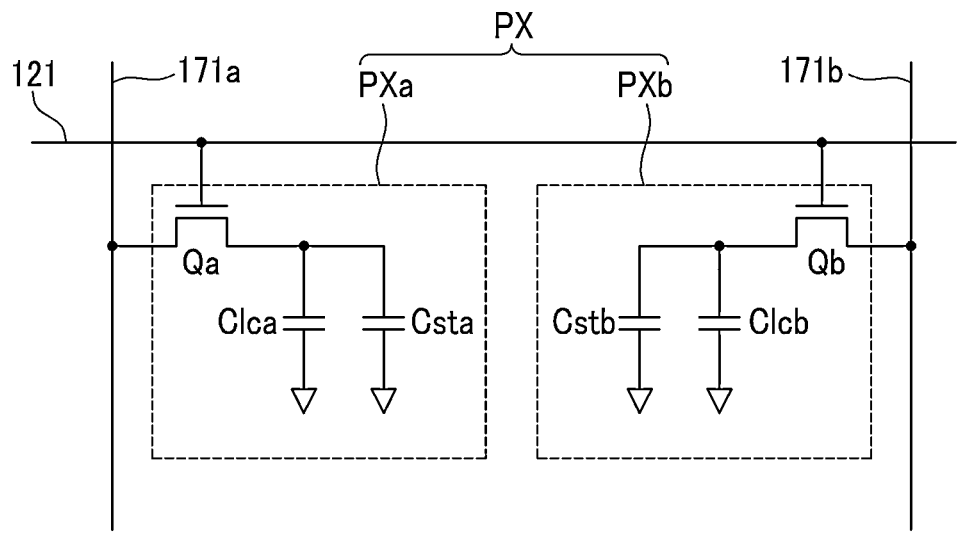
FIG. 14 to FIG. 16 are equivalent circuit diagrams of one pixel of a display device according to the invention.

Referring to FIG. 14, an exemplary embodiment of the display device according to the invention includes the signal lines including first and second data lines 171a and 171b and the gate line 121, and a pixel PX connected to the first and second data lines 171a and 171b.

The pixel PX includes the first and second subpixels PXa and PXb. The first subpixel PXa includes the first switching element Qa, the first liquid crystal capacitor Clca and the first storage capacitor Csta, and the second subpixel PXb includes the second switching element Qb, the second liquid crystal capacitor Clcb and the second storage capacitor Cstb.

The first switching element Qa includes the control terminal connected to the gate line 121 and the input terminal connected to the first data line 171a. The output terminal of the first switching element Qa is connected to the first liquid crystal capacitor Clca and the first storage capacitor Csta.

The second switching element Qb includes the control terminal connected to the gate line 121 and the input terminal connected to the second data line 171b. The output terminal of the second switching element Qb is connected to the second liquid crystal capacitor Clcb and the second storage capacitor Cstb.

The first liquid crystal capacitor Clca and the second liquid crystal capacitor Clcb may be applied with different data voltages Vd corresponding to a same input image signal IDAT through the first and second switching elements Qa and Qb connected to the different data lines 171a and 171b.

Figure 15:
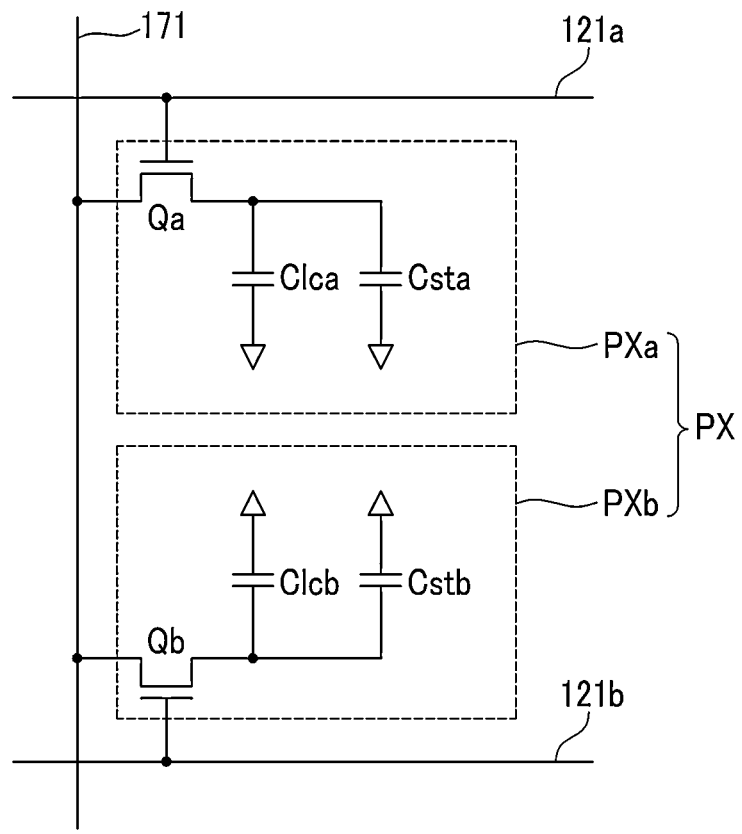

Next, referring to FIG. 15, another alternative exemplary embodiment of the display device includes the signal lines including the data line 171 and the first and second gate lines 121a and 121b, and the pixel PX connected to the signal lines. The pixel PX includes the first and second subpixels PXa and PXb.

The first switching element Qa included in the first subpixel PXa includes the input terminal connected to the data line 171 and the control terminal connected to the first gate line 121a. The output terminal of the first switching element Qa is connected to the first liquid crystal capacitor Clca and the first storage capacitor Csta.

The second switching element Qb includes the control terminal connected to the second gate line 121b and the input terminal connected to the data line 171. The output terminal of the second switching element Qb is connected to the second liquid crystal capacitor Clcb and the second storage capacitor Cstb.

The first liquid crystal capacitor Clca and the second liquid crystal capacitor Clcb may be applied with different data voltages Vd corresponding to a same input image signal IDAT transmitted by the data line 171 through the first and second switching elements Qa and Qb connected to the different gate lines 121a and 121b at different times.

Figure 16:
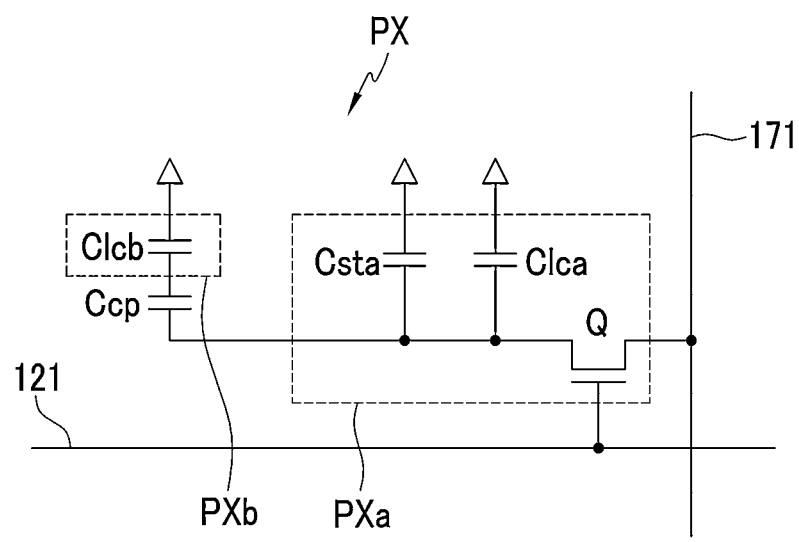

Next, referring to FIG. 16, another alternative exemplary embodiment of the display device includes the signal lines including the data line 171 and the gate line 121, and the pixel PX connected to the signal lines. The pixel PX may include the first and the second subpixels PXa and PXb and a coupling capacitor Ccp connected between two subpixels PXa and PXb.

The first subpixel PXa has a switching element Q that is connected to the gate line 121 and the data line 171, and a first liquid crystal capacitor Clca and a storage capacitor Csta that are connected to the switching element Q. The second subpixel PXb has a second liquid crystal capacitor Clcb that is connected to the coupling capacitor Ccp.

The switching element Q may be a three-terminal element such as a thin film transistor and disposed in the lower panel 100, and the switching element Q has a control terminal connected to the gate line 121, an input terminal connected to the data line 171, and an output terminal connected to the liquid crystal capacitor Clca, the storage capacitor Csta and the coupling capacitor Ccp. When the switching element Q receives the gate signal supplied through the gate line 121, the switching element Q may apply a data voltage supplied through the data line 171 to the first liquid crystal capacitor Clca and the coupling capacitor Ccp, and the coupling capacitor Ccp may change an amplitude of the data voltage and may apply a voltage to the second liquid crystal capacitor Clcb. The charged voltage of the first liquid crystal capacitor Clca and the charged voltage of the second liquid crystal capacitor Clcb may have a relation as follows.

$$Vb = Va \times [Ccp/(Ccp+Clcb)]$$

Here, Va denotes the charged voltage to the second liquid crystal capacitor Clcb, Vb denotes the changed voltage of the second liquid crystal capacitor Clcb, Ccp denotes a capacitance of the coupling capacitor Ccp, and Clcb denotes the capacitance of the second liquid crystal capacitor Clcb. The charged voltage Vb of the second liquid crystal capacitor Clcb is less than the charged voltage Va of the first liquid crystal capacitor Clca. In an exemplary embodiment, a ratio of the charging voltage Va of the first liquid crystal capacitor Clca and the charging voltage Vb of the second liquid crystal capacitor Clcb is controlled by controlling the capacitance of the coupling capacitor Ccp, thereby substantially improving the lateral visibility.

As described above, the first subpixel PXa and the second subpixel PXb of a pixel PX of an exemplary embodiment of the display device according to the invention may display the images based on the different gamma curves using various methods, or the first subpixel PXa and the second subpixel PXb may display the image of the same luminance.

Next, an exemplary embodiment of a display device and a driving method thereof according to the invention will be described with reference to FIG. 17 to FIG. 22B.

Figure 17:
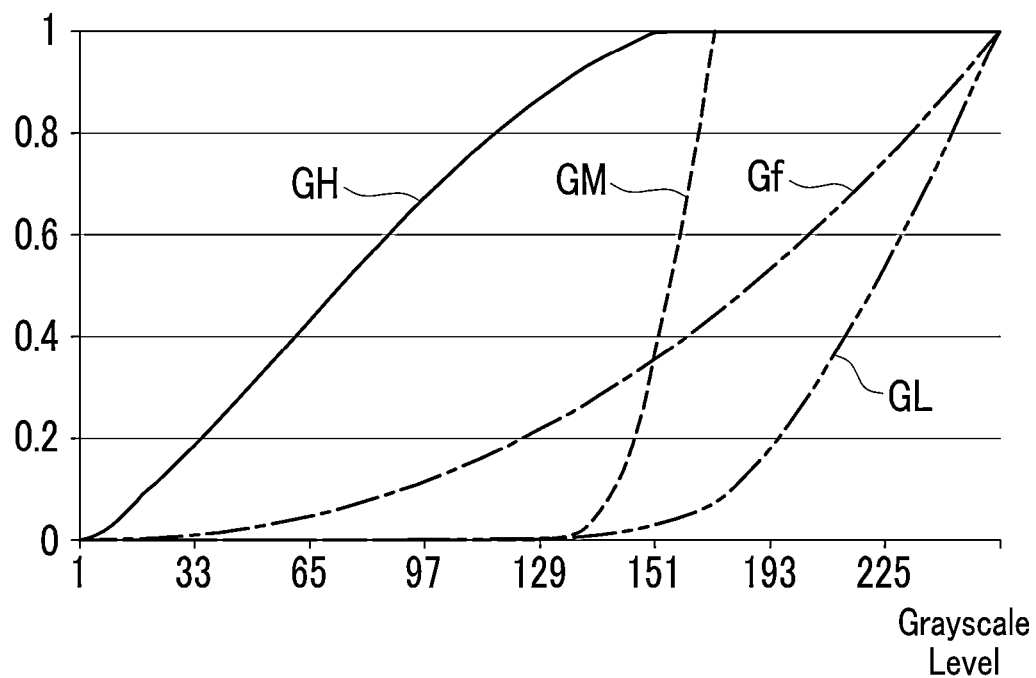
FIG. 17 is a graph of a gamma curve of an exemplary embodiment of a display device according to the invention.

FIG. 17 is a graph of a gamma curve of an exemplary embodiment of a display device according to the invention, and FIG. 18A to FIG. 22B are views of luminance of a pixel during a frame sequence based on a gamma curve applied thereto in exemplary embodiments of a display device according to the invention.

Referring to FIG. 17, in an exemplary embodiment, the gamma data included in the memory 650 or the data driver 500 of the display device may include gamma data for at least three different gamma curves. In such an embodiment, the gamma data may include the gamma data for the first gamma curve GH, the second gamma curve GL and the third gamma curve GM. In such an embodiment, the luminance of the image based on the first gamma curve GH may be equal to or higher than the luminance of the image based on the third gamma curve GM, and the luminance of the image based on third gamma curve GM may be equal to or higher than the luminance of the image based on the second gamma curve GL.

In such an embodiment, a pixel PX may be applied with one data voltage Vd and may include the first subpixel PXa and the second subpixel PXb similarly to the exemplary embodiments shown in FIG. 7 to FIG. 16. The pixel PX or the first and second subpixels PXa may be applied with the data voltage Vd corresponding to an input image signal IDAT based on one of the first gamma curve GH, the second gamma curve GL and the third gamma curve GM during each frame of a frame set, which may include two or more consecutive frames, to display the image. In such an embodiment, the image displayed during one frame set by the pixel PX or the first and second subpixels PXa and PXb may include the image based on the first gamma curve GH and the second gamma curve GL.

The first to third gamma curves GH, GL and GM may be controlled to substantially improve the lateral visibility. In an exemplary embodiment, the first to third gamma curves GH, GL and GM are determined to allow the combination gamma curve of the image displayed during one frame set by the first and second subpixels PXa and PXb to be the front gamma curve Gf, which substantially maximize the image quality of the display device and the combination gamma curve of the side to be substantially close to the front gamma curve Gf. In such an embodiment, the combination gamma curve may not have an inflection point near a position having a maximum value, and the first to third gamma curves GH, GL and GM are selected to be close to the front gamma curve Gf, thereby substantially improving the display quality.

In one exemplary embodiment, for example, the luminance of the first gamma curve GH may be substantially gradually increased from the lowest grayscale level to about the middle grayscale level, and the maximum luminance may be displayed from near about the middle grayscale level to the highest grayscale level. In such an embodiment, the second gamma curve GL may have the lowest luminance from the lowest grayscale level to near about the middle grayscale level, and may reach the maximum luminance at the highest grayscale level by substantially gradually increasing the luminance from near about the middle gray. The third gamma curve GM has the lowest luminance from the lowest grayscale level to near about the middle grayscale level, and then the luminance is suddenly increased from near about the middle grayscale level, thereby having the maximum luminance at near about the middle gray.

According to an exemplary embodiment of the invention, the spatial division driving and the temporal division driving are applied together such that the image based on the different gamma curves for an input image signal IDAT may be displayed during a frame through two subpixels PXa and PXb, and the subpixels PXa and PXb may respectively display the image according to different gamma curves in consecutive frames. Accordingly, the combination gamma curve in the side during the frame set including at least two consecutive frames is substantially close to the front gamma curve Gf for the two subpixels PXa and PXb, thereby substantially improving the lateral visibility.

In an exemplary embodiment, where a pixel PX is not divided into subpixels, the image according to at least three or more different gamma curves for an input image signal IDAT may be displayed in consecutive frames such that the combination gamma curve in the side during one frame set including two or more consecutive frames is substantially close to the front gamma curve Gf by controlling the different gamma curve, thereby substantially improving the lateral visibility.

Next, an exemplary embodiment of a driving method that improves the lateral visibility using the first to third gamma curves GH, GL and GM shown in FIG. 17 and an exemplary embodiment of a driving method using the first and second gamma curves GH and GL shown in FIG. 3 will be described with reference to FIG. 18A to FIG. 22B.

The pixel PX of an exemplary embodiment of the display device according to the invention may be driven on a frame-set-by-frame-set basis, where each frame set includes at least two consecutive frames. In one exemplary embodiment, for example, an image corresponding to a current input image signal, e.g., a first input image signal IDAT1, may be displayed during at least two consecutive frames, e.g., a first frame 1F and a second frame 2F, and the image corresponding to a subsequent input image signal, e.g., a second input image signal IDAT2, may be displayed during next at least two consecutive frames, e.g., a third frame 3F and a fourth frame 4F. In exemplary embodiments shown in FIG. 18A to FIG. 22B, one frame set includes two frames, however not being limited thereto. In an alternative exemplary embodiment, the number of the frames included in one frame set may be greater than two, e.g., three or more.

Figure 18A:
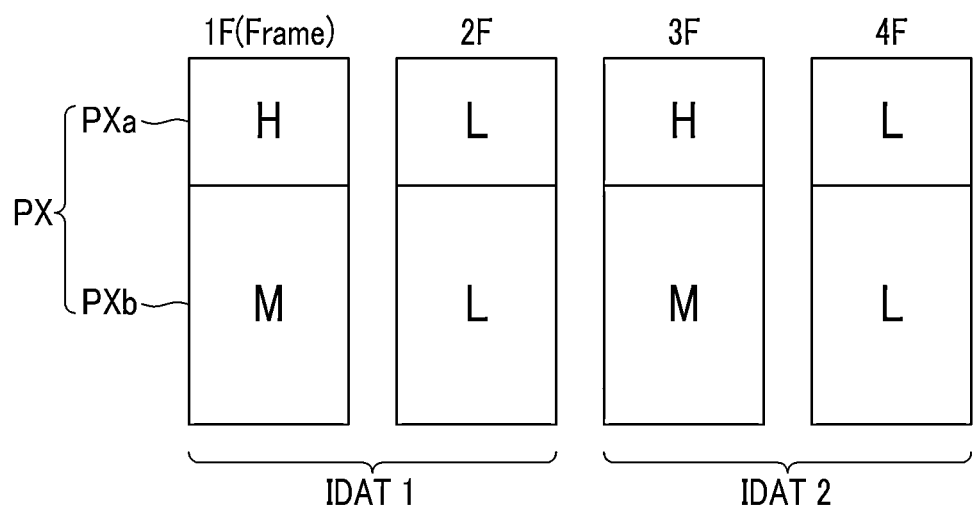
FIG. 18A to FIG. 22B are views of luminance of a pixel during a frame sequence based a gamma curve applied thereto in exemplary embodiments a display device according to the invention.
Figure 18B:
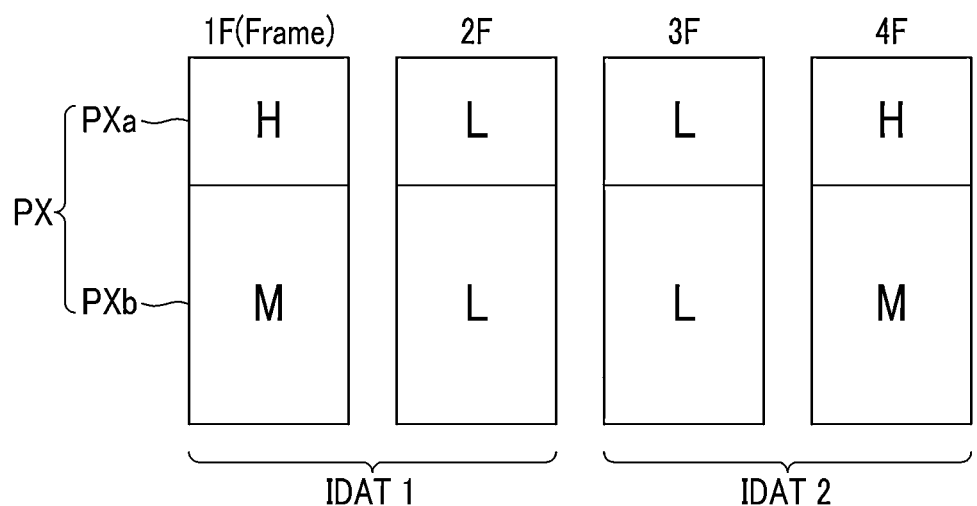

Firstly, referring to FIG. 18A and FIG. 18B, the first subpixel PXa may display the first image H based on the first gamma curve GH and the second subpixel PXb may display the third image M based on the third gamma curve GM in one of two frames of the frame set, and the first subpixel PXa may display the second image L based on the second gamma curve GL and the second subpixel PXb may display the second image L in the other frame of the two frames of the frame set. According to an exemplary embodiment, the spatial division driving and the temporal division driving are applied together such that image corresponding to a same input image signal IDAT may be displayed based on the different gamma curve by two subpixels PXa and PXb during a same frame, and the subpixels PXa and PXb may display the image based on the different gamma curve in the consecutive frames. Accordingly, the combination gamma curve in the side for two subpixels PXa and PXb during the frame set including at least two consecutive frames is substantially close to the front gamma curve Gf, thereby substantially improving the lateral visibility.

In an exemplary embodiment, as shown in FIG. 18B, when the first subpixel PXa displays the first image H and the second subpixel PXb displays the third image M in the first frame 1F of the frame set for the first input image signal IDAT1, and then the first subpixel PXa and the second subpixel PXb display the second image L in the second frame 2F of the frame set for the first input image signal IDAT1, the first subpixel PXa and the second subpixel PXb display the second image L in the first frame of the frame set, e.g., the third frame 3F, for the second input image signal IDAT2, and the first subpixel PXa displays the first image H and the second subpixel PXb displays the third image M in the second frame of the frame set, e.g., the fourth frame 4F, for the second input image signal IDAT2. In such an embodiment, when the sequence of the images displayed by the pixel PX in two adjacent frame sets may be reversely changed, as shown in FIG. 18B, the second image L having the low luminance is displayed in the consecutive frames and the first image H having the high luminance may be displayed in the consecutive frames such that the slow response speed of the liquid crystal molecules is compensated, thereby further improving the lateral visibility, as described above.

Figure 19A:
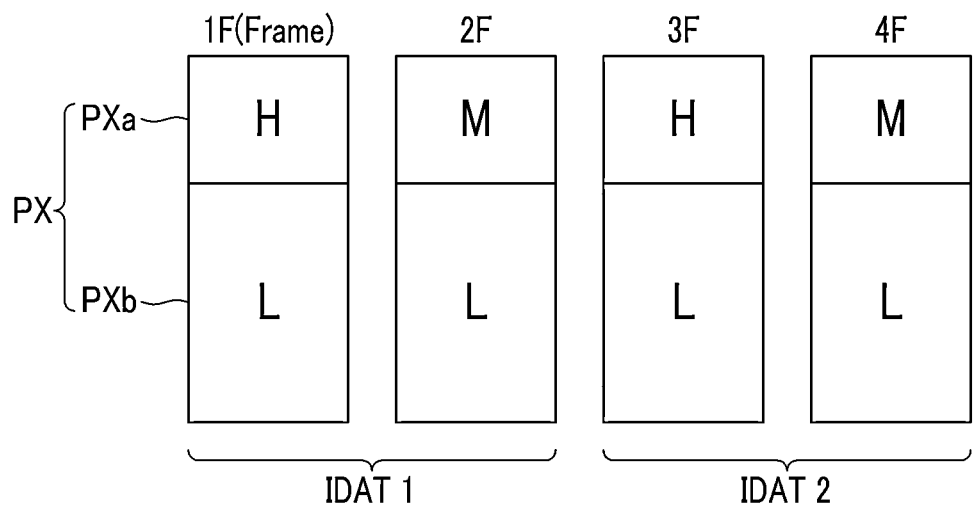
Figure 19B:
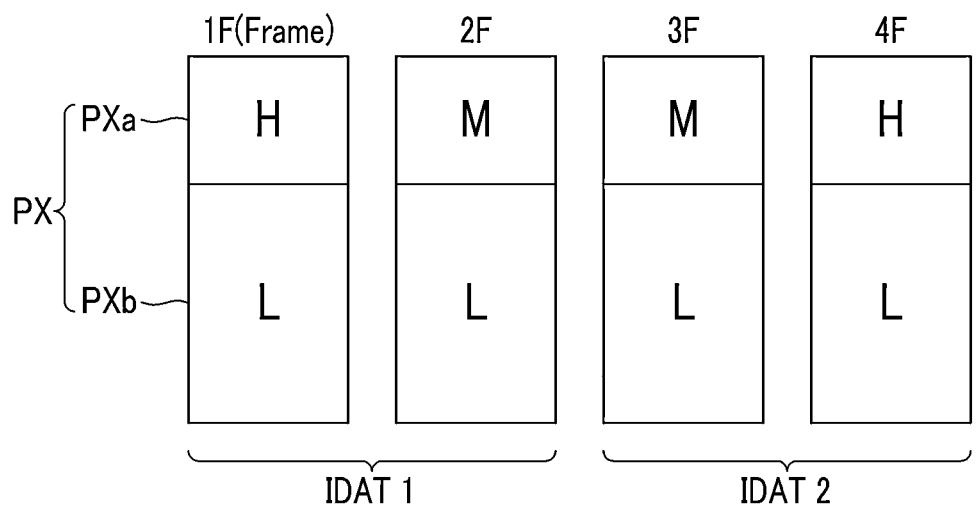

In an alternative exemplary embodiment, referring to FIG. 19A and FIG. 19B, the first subpixel PXa may display the first image H and the second subpixel PXb may display the second image L in one of the two frames included in one frame set, and the first subpixel PXa may display the third image M and the second subpixel PXb may display the second image L in the other frame of the two frames included in the frame set. In such an embodiment, the lateral visibility is substantially improved as in the exemplary embodiment shown in FIG. 18A and FIG. 18B. In an exemplary embodiment, when the sequence of the image displayed by the pixel PX is changed in two adjacent frame sets, as shown in FIG. 19B, then the second image L having the low luminance is displayed in the consecutive frames for the second subpixel PXb and the third image M having the relatively low luminance is displayed in the consecutive frames for the first subpixel PXa, and the first image H having the high luminance is displayed in the consecutive frames for the first subpixel PXa, such that the slow response speed of the liquid crystal molecules is compensated, and the lateral visibility is thereby further improved.

Figure 20A:
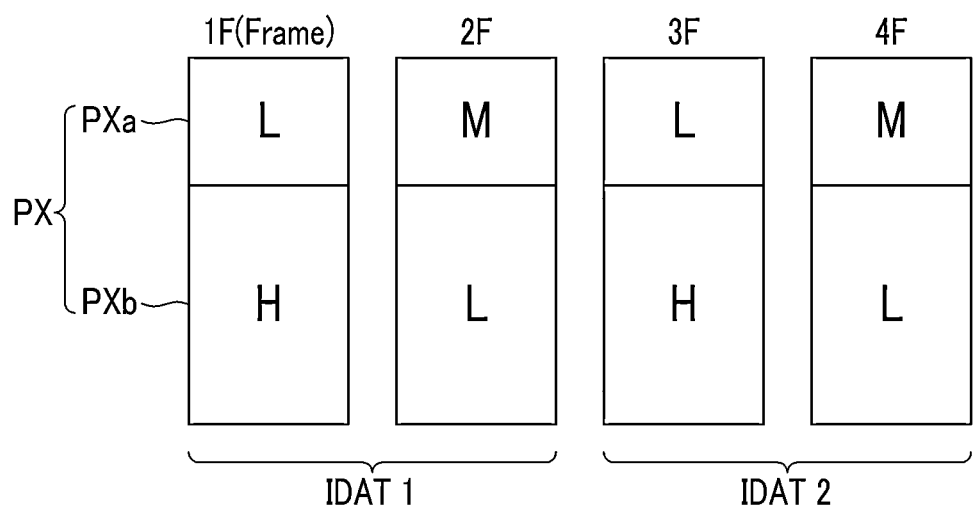
Figure 20B:
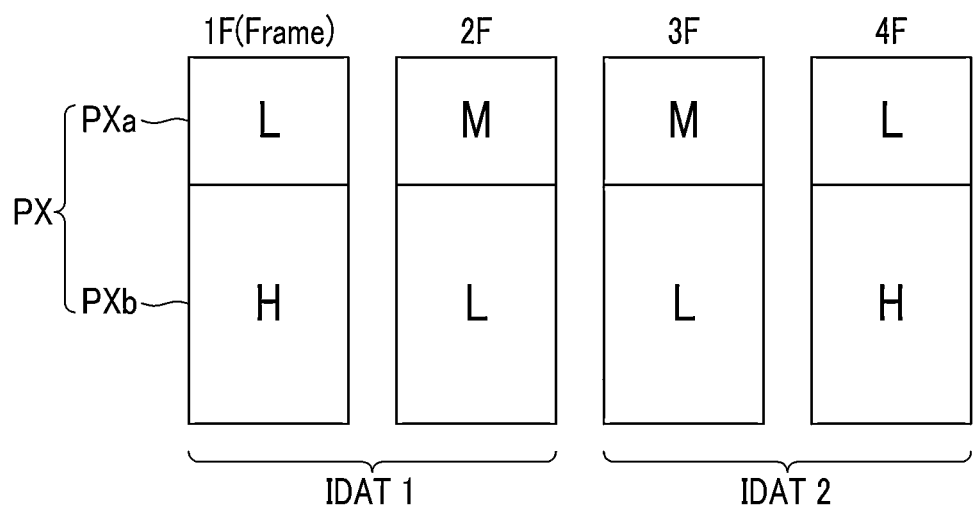

In another alternative exemplary embodiment, referring to FIG. 20A and FIG. 20B, the first subpixel PXa may display the second image L and the second subpixel PXb may display the first image H in one of two frames included in one frame set, and the first subpixel PXa may display the third image M and the second subpixel PXb may display the second image L in the other frame of the two frames included in the frame set. In such an embodiment, the lateral visibility is substantially improved as in the exemplary embodiment shown in FIG. 18A and FIG. 18B. In an exemplary embodiment, as shown FIG. 20B, the sequence of the image displayed by the pixel PX is changed in two adjacent frame sets. In such an embodiment, the second image L having the low luminance for the second subpixel PXb is displayed in consecutive frames and the first image H having the high luminance is displayed in consecutive frames, and the second image L having the low luminance for the first subpixel PXa is displayed in consecutive frames such that the slow response speed of the liquid crystal molecules is compensated and the lateral visibility is thereby further improved.

Figure 21A:
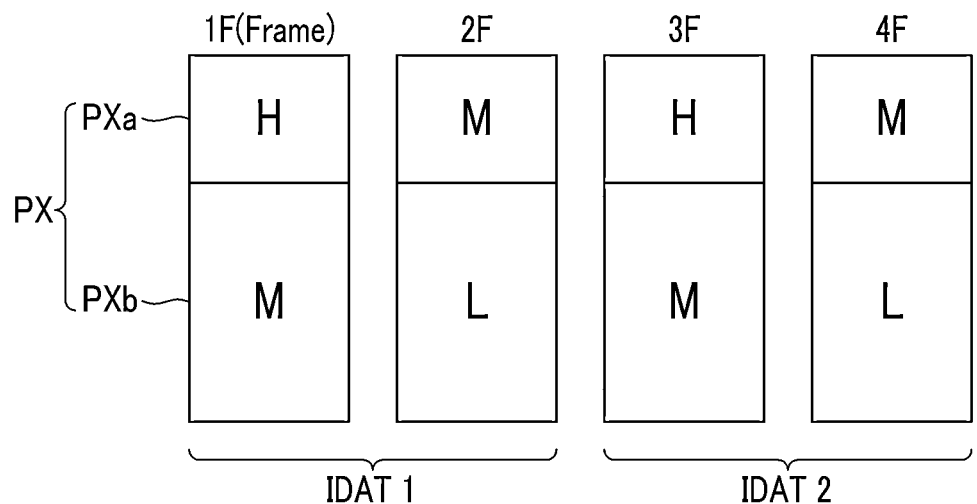
Figure 21B:
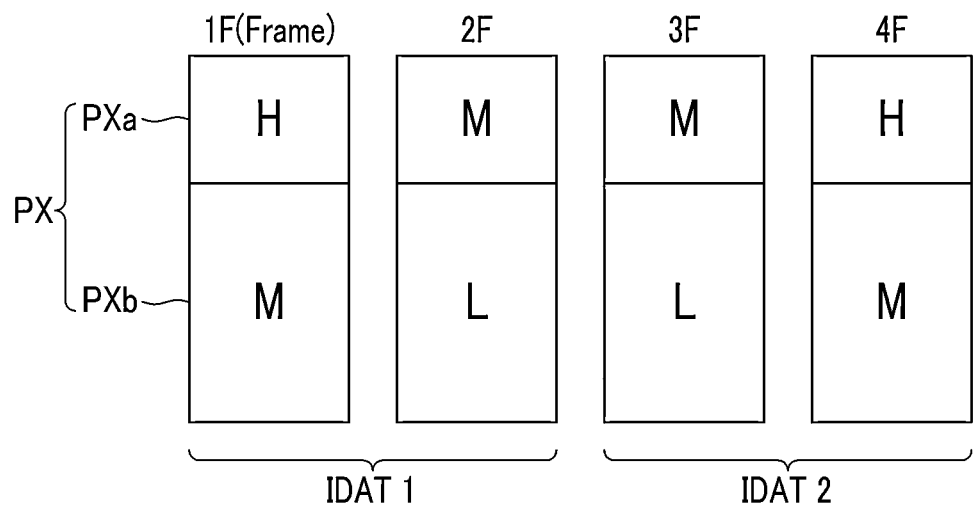
Figure 21C:
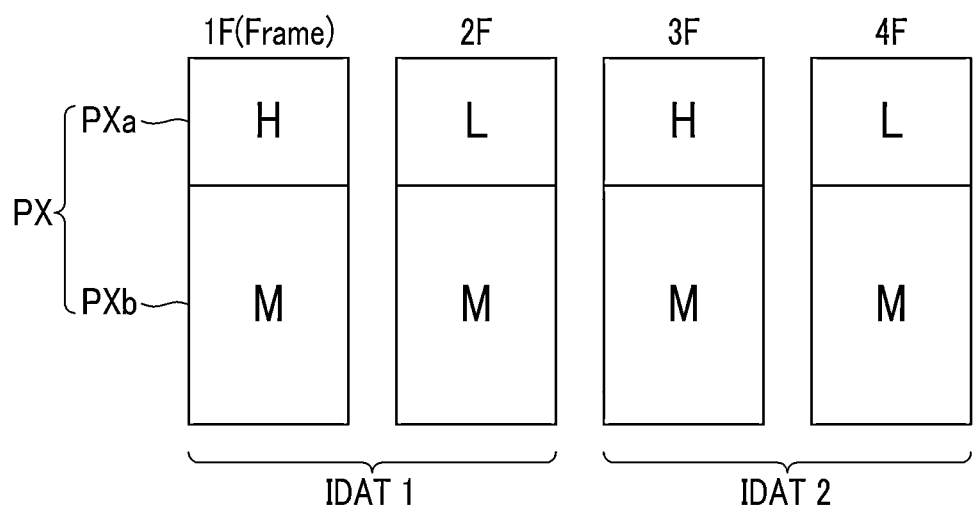
Figure 21D:
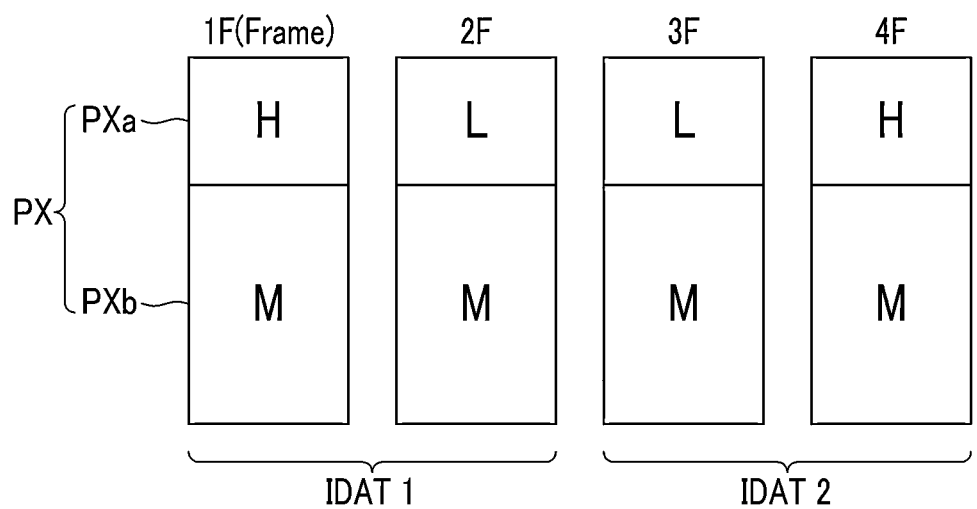

In another alternative exemplary embodiment, referring to FIG. 21A and FIG. 21B, the first subpixel PXa may display the first image H and the second subpixel PXb may display the third image M in one of two frames included in one frame set, and the first subpixel PXa may display the third image M and the second subpixel PXb may display the second image L in the other frame of the two frames included in the frame set. In another alternative exemplary embodiment, as shown in FIG. 21C and FIG. 21D, the first subpixel PXa may display the first image H and the second subpixel PXb may display the third image M in one of two frames of one frame set, and the first subpixel PXa may display the second image L and the second subpixel PXb may display the third image M in the other frame of the two frames included in the frame set. In such embodiments, the lateral visibility is substantially improved as in the exemplary embodiment shown in FIG. 18A and FIG. 18B. In exemplary embodiments, as shown in FIG. 21B and FIG. 21D, the sequence of the image displayed by the pixel PX is changed in two adjacent frame sets. In such embodiments, the second image L having the low luminance for the second subpixel PXb is displayed in consecutive frames, the third image M having the relatively low luminance for the first subpixel PXa is displayed in consecutive frames, and the first image H having the high luminance is displayed in consecutive frames such that the slow response speed of the liquid crystal molecules is compensated, and the lateral visibility is thereby further improved.

Figure 22A:
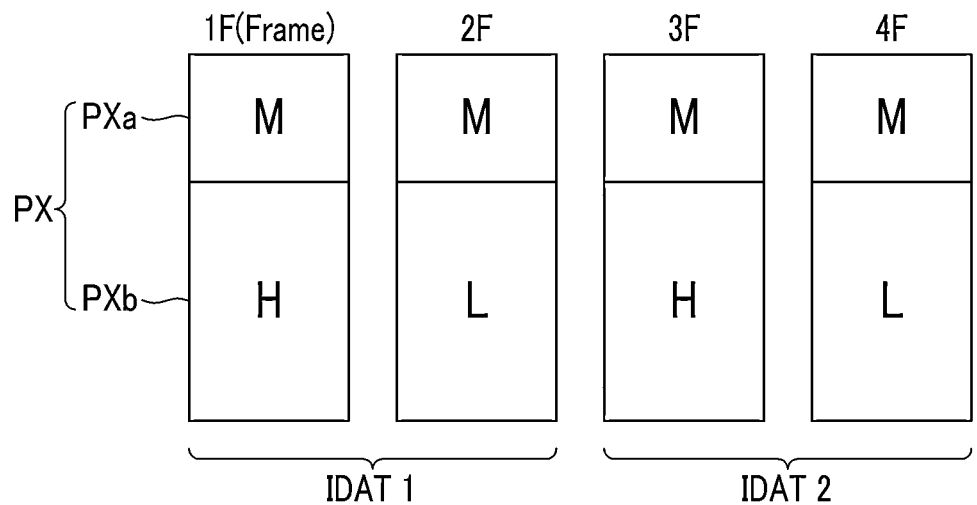
Figure 22B:
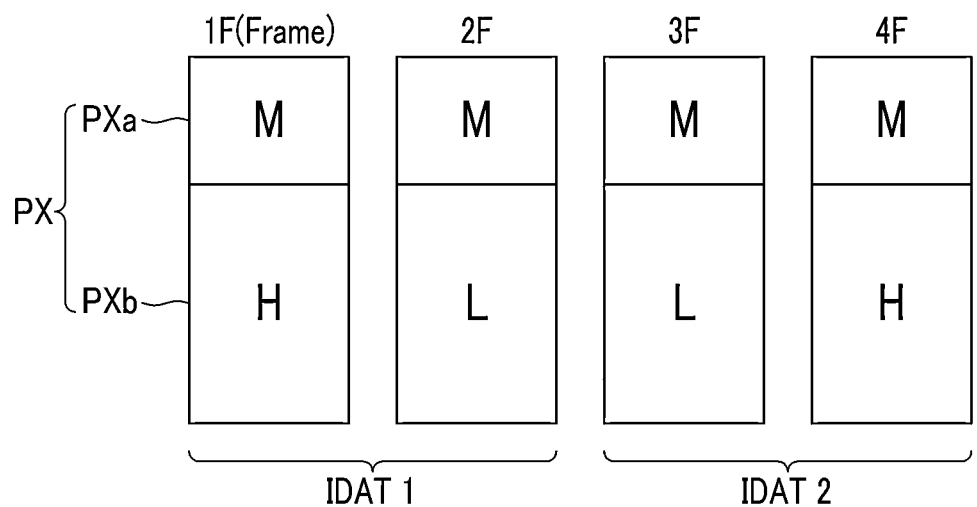

In an exemplary embodiment, referring to FIG. 22A and FIG. 22B, the first subpixel PXa may display the third image M and the second subpixel PXb may display the first image H in one of two frames included in one frame set, and the first subpixel PXa may display the third image M and the second subpixel PXb may display the second image L in the other frame in the frame set. In such an embodiment, the lateral visibility is substantially improved as in the exemplary embodiment shown in FIG. 18A and FIG. 18B. In an exemplary embodiment, as shown FIG. 22B, the sequence of the image displayed by the pixel PX is changed in two adjacent frame sets. In such an embodiment, the second image L having the low luminance for the second subpixel PXb is displayed in consecutive frames and the first image H having the high luminance is displayed in consecutive frames such that the slow response speed of the liquid crystal molecules is compensated, and the lateral visibility is thereby further improved.

In one or more exemplary embodiments, the gamma curve for the image displayed in one frame set for two subpixels PXa and PXb may be variously selected among the described first to third gamma curves GH, GL and GM. In an alternative exemplary embodiment, one frame set may include at least three consecutive frames, and in such an embodiment, the image based on the first to third gamma curves GH, GL and GM may be displayed variously in a frame sequence.

In an exemplary embodiment, where using the first and second gamma curves GH and GL, as shown in FIG. 3 in the spatial division driving, the third image M shown in FIG. 18A to FIG. 22B may be changed into the second image L based on the second gamma curve GL shown in FIG. 3 to be driven.

An exemplary embodiment of the display device and the driving method thereof will be described with regard to FIG. 23 to FIG. 30B.

Figure 23:
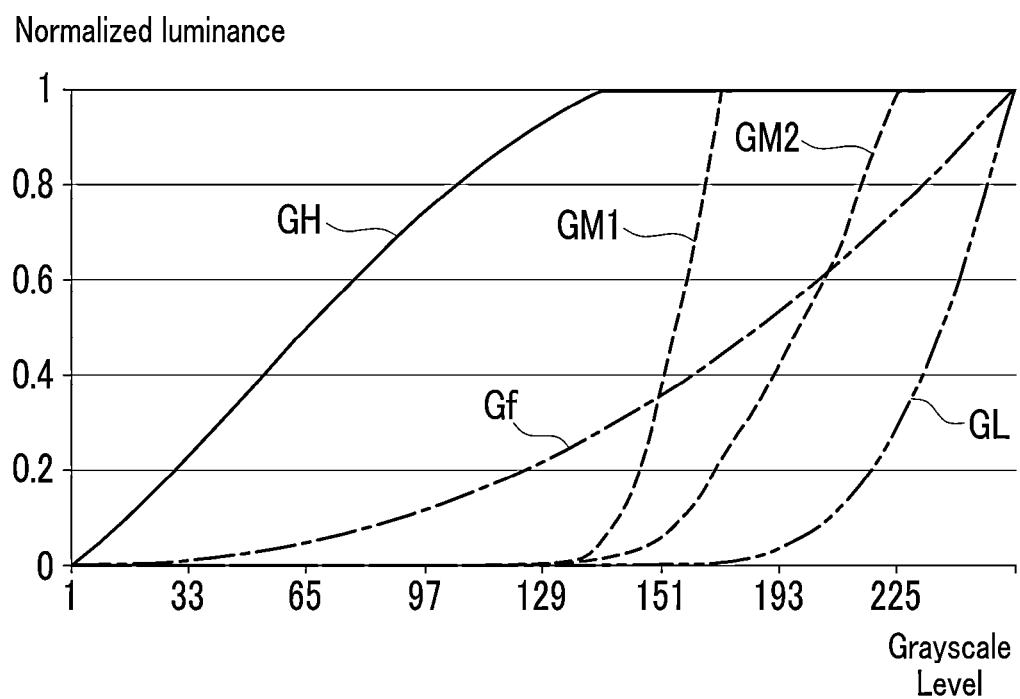
FIG. 23 is a graph of a gamma curve of an exemplary embodiment of a display device according to the invention.

FIG. 23 is a graph of a gamma curve of an exemplary embodiment of a display device according to the invention, and FIG. 24A to FIG. 30B are views of luminance of a pixel during a frame sequence based on a gamma curve applied thereto in an exemplary embodiment of a display device according to the invention.

Referring to FIG. 23, the gamma data included in the memory 650 or the data driver 500 of an exemplary embodiment of the display device according to the invention may include the gamma data for four different gamma curves. In such an embodiment, the gamma data may include gamma data for a first gamma curve GH, a second gamma curve GL, a third gamma curve GM1 and a fourth gamma curve GM2. In an alternative exemplary embodiment, the gamma data may include the gamma data for more than four gamma curves. In an exemplary embodiment, the luminance of the image based on the first gamma curve GH may be equal to or higher than the luminance of the image based on the third gamma curve GM1, the luminance of the image based on the third gamma curve GM1 may be equal to or higher than the luminance of the image based on the fourth gamma curve GM2, and the luminance of the image based on the fourth gamma curve GM2 may be equal to or higher than the luminance of the image based on the second gamma curve GL.

In an exemplary embodiment, a pixel PX may include the first subpixel PXa and the second subpixel PXb as in the exemplary embodiments shown in FIG. 7 to FIG. 16. Each of the first and second subpixels PXa and PXb may display an image by receiving the data voltage Vd based on one of the first to fourth gamma curves GH, GL, GM1 and GM2 during two or more consecutive frames for a same input image signal IDAT, that is, each frame of one frame set. In such an embodiment, the image displayed during the frame set by the first and second subpixels PXa and PXb includes the image based on the first gamma curve GH and the second gamma curve GL.

The first to fourth gamma curves GH, GL, GM1 and GM2 may be controlled to improve the lateral visibility. In such an embodiment, the combination gamma curve of the image displayed during one frame set by the first and second subpixels PXa and PXb is substantially the same as the front gamma curve Gf, which is a reference gamma curve determined to substantially maximize the display quality of the display device and the combination gamma curve of the side is substantially close to the front gamma curve Gf. In such an embodiment, the combination gamma curve may not have an inflection point near a position having a maximum value, and the first to fourth gamma curves GH, GL, GM1 and GM2 are selected to be substantially close to the front gamma curve Gf, thereby increasing the display quality. In an exemplary embodiment, four gamma curves GH, GL, GM1 and GM2 are used such that the combination gamma curve in the side may be efficiently substantially close to the front gamma curve Gf.

In one exemplary embodiment, for example, the luminance of the first gamma curve GH may be substantially gradually increased from the lowest grayscale level to near about the middle grayscale level and have the highest luminance from near about the middle grayscale level. In such an embodiment, the second gamma curve GL may have the lowest luminance from the lowest grayscale level to near about a grayscale level, which is 1/3 of the entire grayscale levels (hereinafter, N/3 grayscale level), and may reach the highest luminance at the highest grayscale level by gradually increasing the luminance from near about the N/3 grayscale level. The third gamma curve GM1 has the lowest luminance from the lowest grayscale level to near about the middle grayscale level, and then the luminance is suddenly increased from near about the middle grayscale level, thereby having the highest luminance from near about the middle grayscale level to the highest grayscale level. The third gamma curve GM1 has the lowest luminance from the lowest grayscale level to near about the middle grayscale level, and then the luminance is increased to the highest luminance from near about the middle grayscale level, while the increasing slope may be less than the increasing slope of the third gamma curve GM1.

Next, an exemplary embodiment of the driving method that improves the lateral visibility using the first to fourth gamma curves GH, GL, GM1 and GM2 will be described in greater detail with reference to FIG. 24A to FIG. 30B.

The pixel PX of an exemplary embodiment of the display device according to the invention may be driven on a frame-set-by-frame-set basis, where each frame set includes at least two consecutive frames. In one exemplary embodiment, for example, as shown in FIG. 24A to FIG. 26B, the image for a current input image signal, e.g., a first input image signal IDAT1, may be displayed in two consecutive frames, e.g., the first and second frames 1F and 2F, and the image for the next input image signal, e.g., the second input image signal IDAT2, may be displayed in the next two consecutive frames, e.g., the third and fourth frames 3F and 4F.

In an alternative exemplary embodiment, as show in FIG. 27A to FIG. 30B, the image for the first input image signal IDAT1 may be displayed in three consecutive frames, e.g., the first to third frames 1F, 2F and 3F, and the image for the second input image signal IDAT2 may be displayed in the next three consecutive frames, e.g., the fourth to sixth frames 4F, 5F and 6F. However, the number of the frames included in one frame set is not limited thereto. In another alternative exemplary embodiment, a frame set may include more than three frames, the number of the gamma curves may be increased as the number of the frames to control the combination gamma curve in the side to be substantially close to the front gamma curve Gf is increased.

Figure 24A:
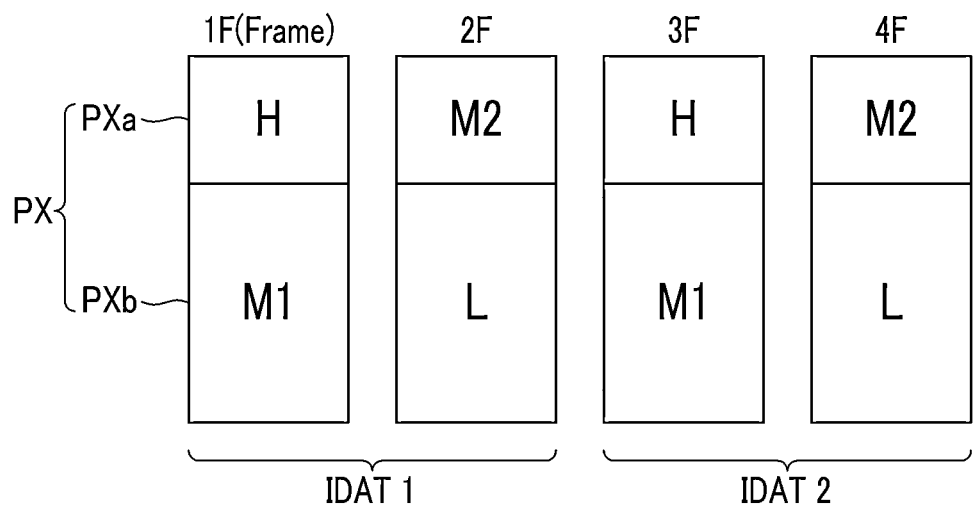
Figure 24B:
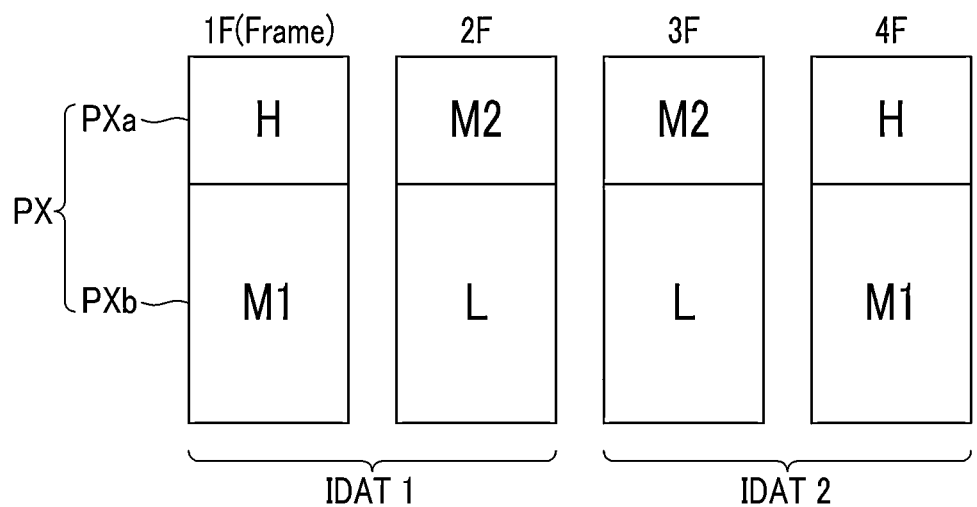
Figure 24C:
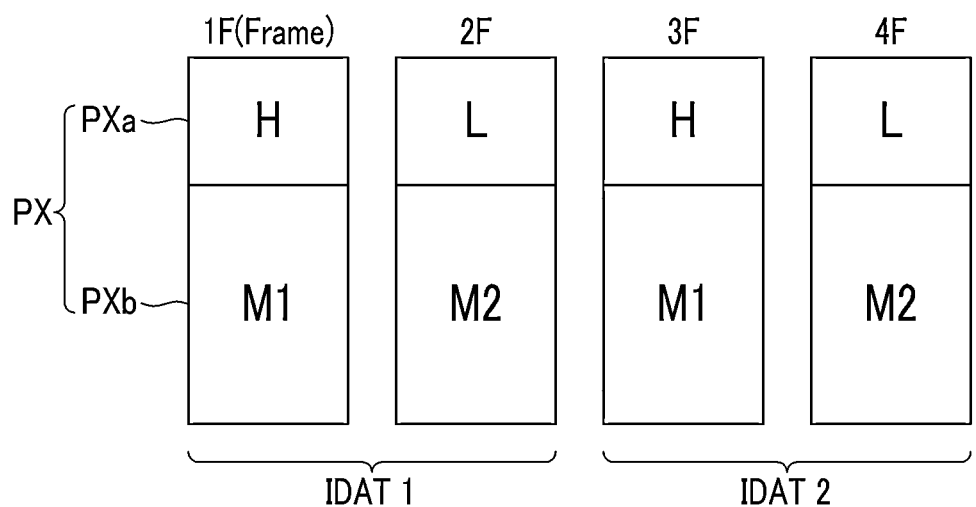
Figure 24D:
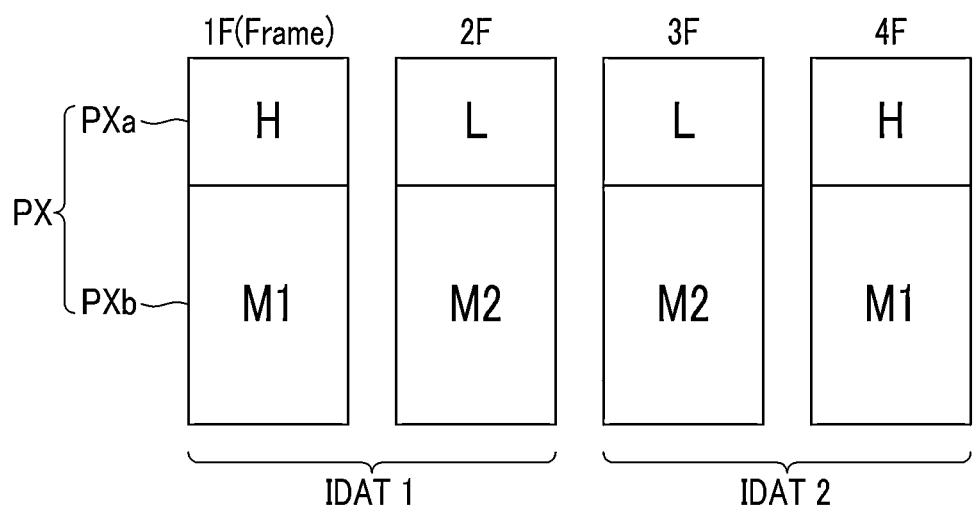

Firstly, referring to FIG. 24A and FIG. 24B, the first subpixel PXa may display the first image H based on the first gamma curve GH and the second subpixel PXb may display the third image M1 based on the third gamma curve GM1 in one of two frames included in a frame set, and in the remaining frame, the first subpixel PXa may display the fourth image M2 based on the fourth gamma curve GM2 and the second subpixel PXb may display the second image L based on the second gamma curve GL in the other of the two frames included in the frame set. In an alternative exemplary embodiment, as shown in FIG. 24C and FIG. 24D, the first subpixel PXa may display the first image H based on the first gamma curve GH and the second subpixel PXb may display the third image M1 based on the third gamma curve GM1 in one of two frames included in a frame set, while the first subpixel PXa may display the second image L based on the second gamma curve GL and the second subpixel PXb may display the fourth image M2 based on the fourth gamma curve GM2 in the other of the two frames included in the frame set. In an exemplary embodiment, as shown in FIG. 24B and FIG. 24D, the sequence of the images displayed by the pixel PX in two adjacent frame sets may be reversely changed, and the second image L having the low luminance is displayed in consecutive frames, the fourth image M2 having the relatively medium luminance is displayed in consecutive frames, and the first image H having the high luminance is displayed in consecutive frames such that the slow response speed of the liquid crystal molecules is compensated, and the lateral visibility is thereby further improved.

Figure 25A:
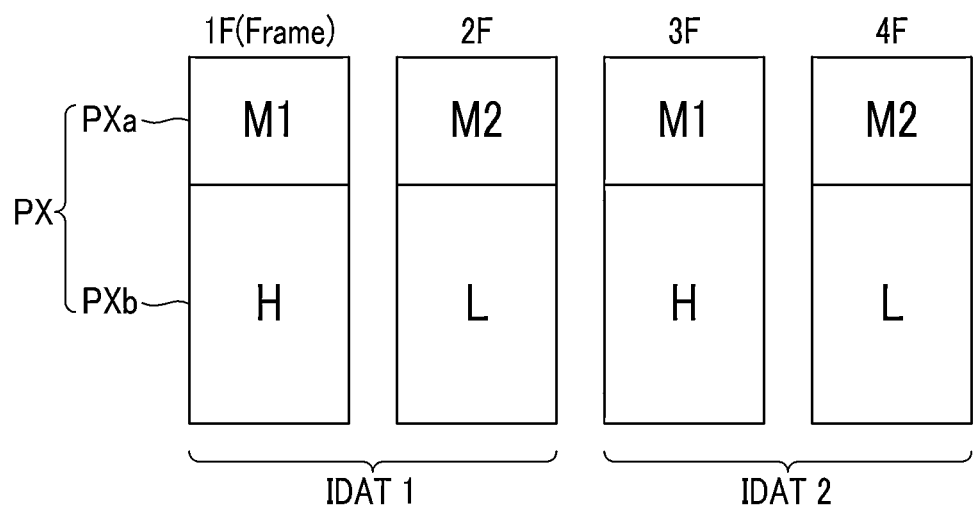
Figure 25B:
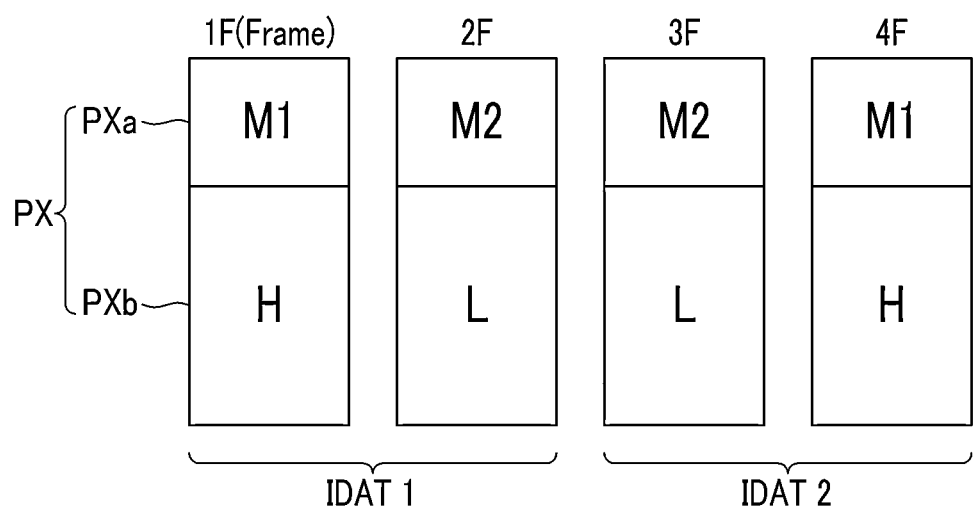

In another alternative exemplary embodiment, as shown in FIG. 25A and FIG. 25B, the first subpixel PXa may display the third image M1 and the second subpixel PXb may display the first image H in one of two frames included in one frame set, and the first subpixel PXa may display the fourth image M2 and the second subpixel PXb may display the second image L in the other of the two frames included in the frame set. In an exemplary embodiment, as shown in FIG. 25B, the sequence of the images displayed by the pixel PX in two adjacent frame sets may be reversely changed, and the second image L having the low luminance is displayed in consecutive frames, the first image H having the high luminance is displayed in consecutive frames, and the fourth image M2 having the relatively low luminance is displayed in consecutive frames, such that the slow response speed of the liquid crystal molecules is compensated, and the lateral visibility is thereby further improved.

Figure 26A:
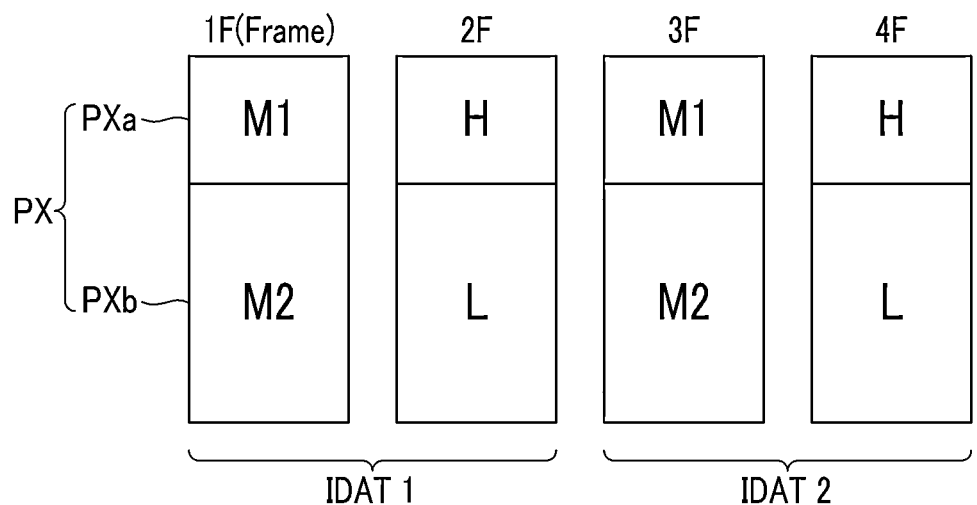
Figure 26B:
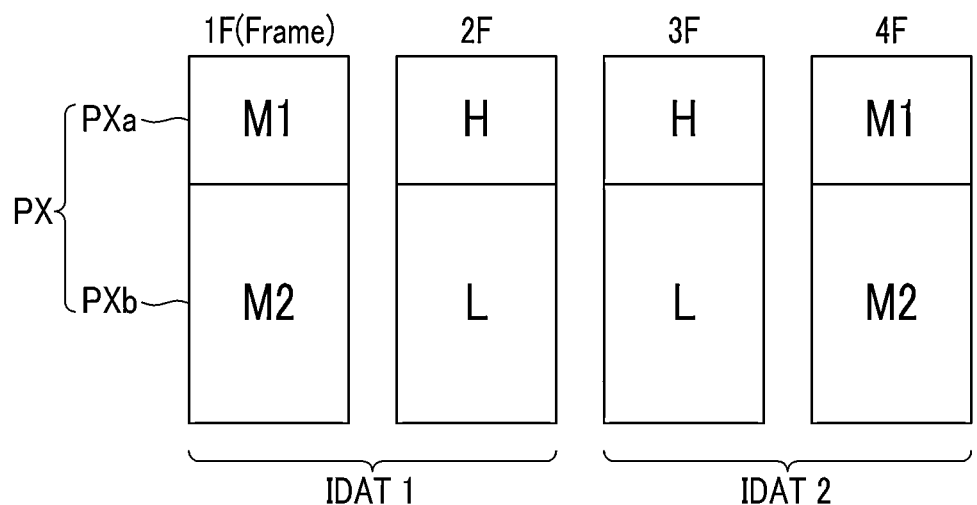

In an exemplary embodiment, referring to FIG. 26A and FIG. 26B, the first subpixel PXa may display the third image M1 and the second subpixel PXb may display the fourth image M2 in one of two frames included in a frame set, and the first subpixel PXa may display the first image H and the second subpixel PXb may display the second image L in the other of the two frames included in the frame set. In an exemplary embodiment, as shown in FIG. 26B, the sequence of the images displayed by the pixel PX in two adjacent frame sets may be reversely changed, and the second image L having the low luminance is displayed in consecutive frames, the third image M1 having the relatively low luminance is displayed in consecutive frames, and the first image H having the high luminance is displayed in consecutive frames such that the slow response speed of the liquid crystal molecules is compensated, and the lateral visibility is thereby further improved.

Figure 27A:
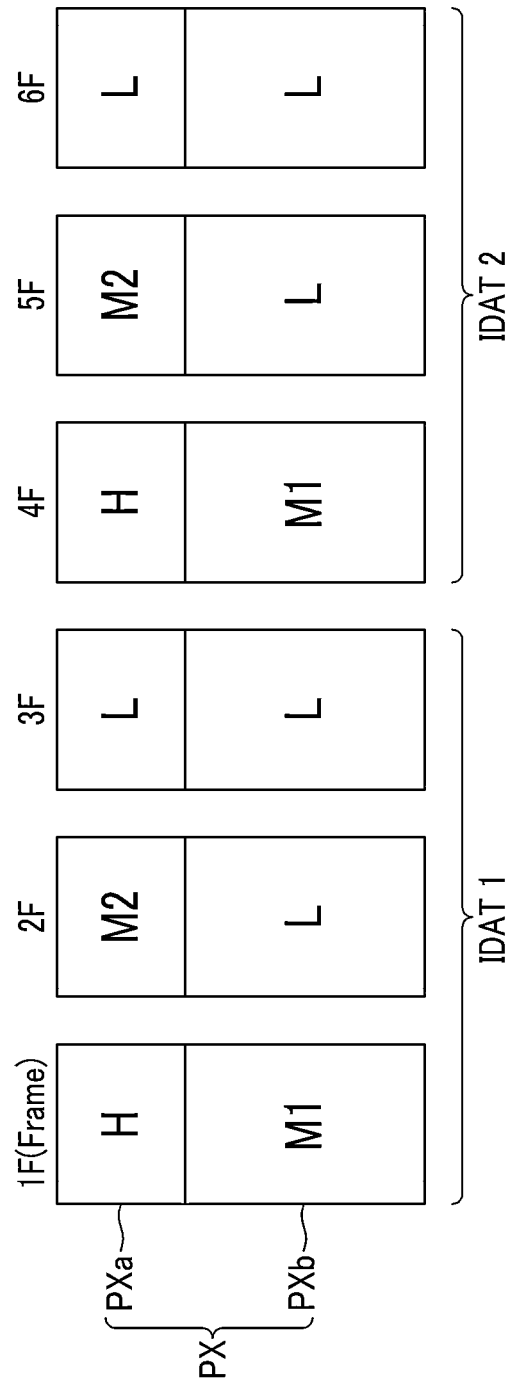

In an alternative exemplary embodiment, referring to FIG. 27A and FIG. 27B, the first subpixel PXa may display the first image H and the second subpixel PXb may display the third image M1 in one of three frames included in a frame set, and the first subpixel PXa may display the fourth image M2 and the second subpixel PXb may display the second image L in another of the three frames included in the frame set, while the first subpixel PXa and the second subpixel PXb may display the second image L in the other of the three frames included in the frame set. In an exemplary embodiment, as shown in FIG. 27B, the sequence of the images displayed by the pixel PX in two adjacent frame sets may be reversely changed, and the second image L having the low luminance is displayed in four consecutive frames, the second image L having the low luminance is displayed in at least two consecutive frames, and the first image H having the high luminance is also displayed in consecutive frames such that the slow response speed of the liquid crystal molecules is compensated, and the lateral visibility is thereby further improved.

In an exemplary embodiment, referring to FIG. 28A and FIG. 28B, the first subpixel PXa may display the first image H and the second subpixel PXb may display the second image L in one of three frames included in a frame set, and the first subpixel PXa may display the third image M1 and the second subpixel PXb may display the second image L in another of the three frames included in the frame set, while the first subpixel PXa may display the fourth image M2 and the second subpixel PXb may display the second image L in the other of the three frames included in the frame set. In an exemplary embodiment, as shown in FIG. 28B, the sequence of the images displayed by the pixel PX in two adjacent frame sets may be reversely changed, and the fourth image M2 having the relatively low luminance is displayed in at least two consecutive frames and the first image H having the high luminance is also displayed in consecutive frames such that the slow response speed of the liquid crystal molecules is compensated, and the lateral visibility is thereby further improved.

Next, referring to FIG. 29A and FIG. 29B, the first subpixel PXa may display the first image H and the second subpixel PXb may display the second image L in one of three frames included in a frame set, and the first subpixel PXa may display the third image M1 and the second subpixel PXb may display the fourth image M2 in another of the three frames included in the frame set, while the first subpixel PXa and the second subpixel PXb may display the second image L in the other of the three frames included in the frame set. In an exemplary embodiment, as shown in FIG. 29B, the sequence of the images displayed by the pixel PX in two adjacent frame sets may be reversely changed, and the second image L having the low luminance for the second subpixel PXb is displayed in two consecutive frames and the second image L having the low luminance is displayed in two consecutive frames, and the first image H having the high luminance is displayed in consecutive frames such that the slow response speed of the liquid crystal molecules is compensated, and the lateral visibility is thereby further improved.

Figure 30B:
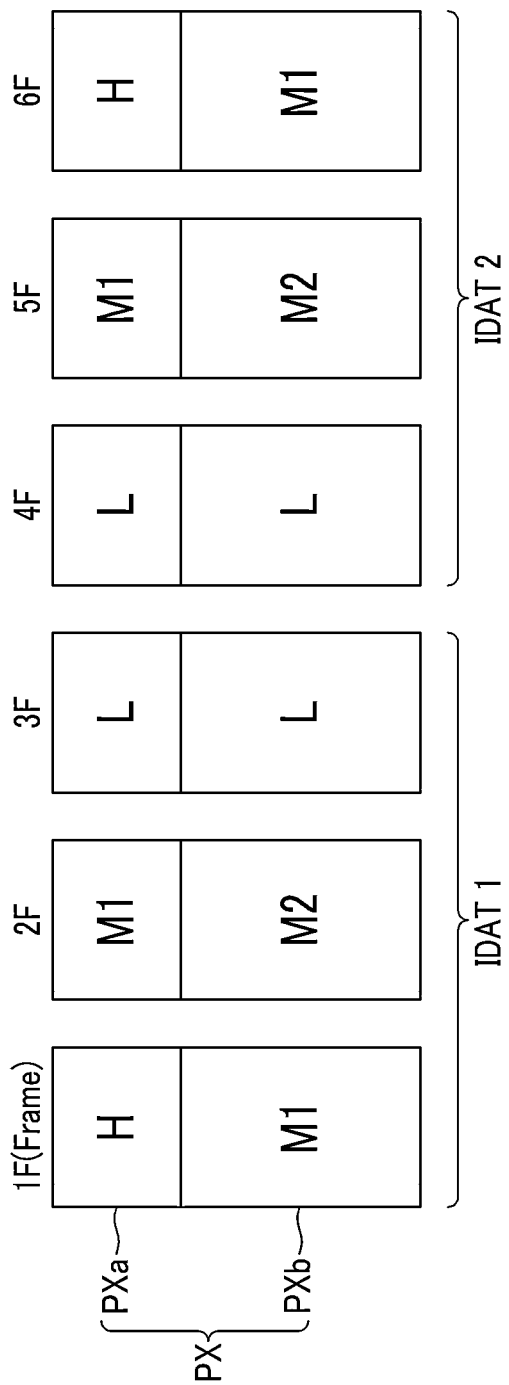

In an alternative exemplary embodiment, referring to FIG. 30A and FIG. 30B, the first subpixel PXa may display the first image H and the second subpixel PXb may display the third image M1 in one of three frames included in a frame set, and the first subpixel PXa may display the third image M1 and the second subpixel PXb may display the fourth image M2 in another of the three frames included in the frame set, while the first subpixel PXa and the second subpixel PXb may display the second image L in the other of the three frames included in the frame set. In an exemplary embodiment, as shown in FIG. 30B, the sequence of the images displayed by the pixel PX in two adjacent frame sets may be reversely changed, and the second image L having the low luminance is displayed in two consecutive frames, the second image L having the low luminance is displayed in two consecutive frames, and the first image H having the high luminance is displayed in consecutive frames such that the slow response speed of the liquid crystal molecules is compensated, and the lateral visibility is thereby further improved.

Also, the gamma curves, based on which the image is displayed in one frame set by two subpixels PXa and PXb, may be variously selected from the first to fourth gamma curves GH, GL, GM1 and GM2, described above.

In an exemplary embodiment, where the pixel PX is not divided into two subpixels PXa and PXb and one pixel PX is applied with a data voltage as shown in FIG. 2, three or more gamma curves may be applied to the temporal division driving, as shown in FIG. 17 and FIG. 24. The driving method of the display device according to an exemplary embodiment of the invention will now be described with reference to FIG. 31A to FIG. 33B.

FIG. 31A to FIG. 33B are views of luminance of a pixel during a frame sequence based on a gamma curve applied thereto in the display device shown in FIG. 2.

Referring to FIG. 31A and FIG. 31B, the pixel PX of the display device may be driven in a manner substantially similarly to the exemplary embodiment shown in FIG. 5A and FIG. 5B except that the image is displayed based on three different gamma curves GH, GL and GM.

In an exemplary embodiment, the frame set further includes a frame for displaying the third image M based on the third gamma curve GM between the two frames for displaying the first image H and the second image L. As described above, by displaying the third image M corresponding to the middle luminance therebetween when displaying the second image L having the low luminance after displaying the first image H having the high luminance, the pretilt effect of previously inclining the liquid crystal molecules may be obtained and a decreasing response speed of the liquid crystal molecules is effectively compensated.

In an exemplary embodiment, referring to FIG. 32A and FIG. 32B, the pixel PX of the display device may be driven similarly to the exemplary embodiment shown in FIG. 6, except that the frame for displaying the third image M based on the third gamma curve GM may be positioned between two frames displaying the first image H and the second image L to compensate decreasing response speed of the liquid crystal molecules. In an exemplary embodiment, as shown in FIG. 32B, the sequence of the image displaying the pixel PX in two adjacent frame sets may be reversely changed, the second image L having the low luminance is displayed in consecutive frames and the first image H having the high luminance is also displayed in consecutive frames such that the slow response speed of the liquid crystal molecules is further compensated.

Next, referring to FIG. 33A and FIG. 33B, the pixel PX of an exemplary embodiment of the display device according to the invention may be driven in a manner substantially similarly to the exemplary embodiment shown in FIG. 6, except that four different gamma curves GH, GL, GM1 and GM2 are used.

In such an embodiment, the frames for displaying the third image M1 and the fourth image M2 based on the third gamma curve GM1 and the fourth gamma curve GM2 may be sequentially positioned between two frames for displaying the first image H and the second image L. As described above, by sequentially displaying the third image M1 and the fourth image M2 corresponding to the middle luminance between$_{[w\lambda|2]}$ the first image H and the second image L when displaying the second image L having the low luminance after displaying the first image H having the high luminance, the decreasing response speed of the liquid crystal molecules is compensated.

Next, referring to FIG. 34 to FIG. 36, an exemplary embodiment of the driving method of the display device according to the invention will be described.

Figure 34:
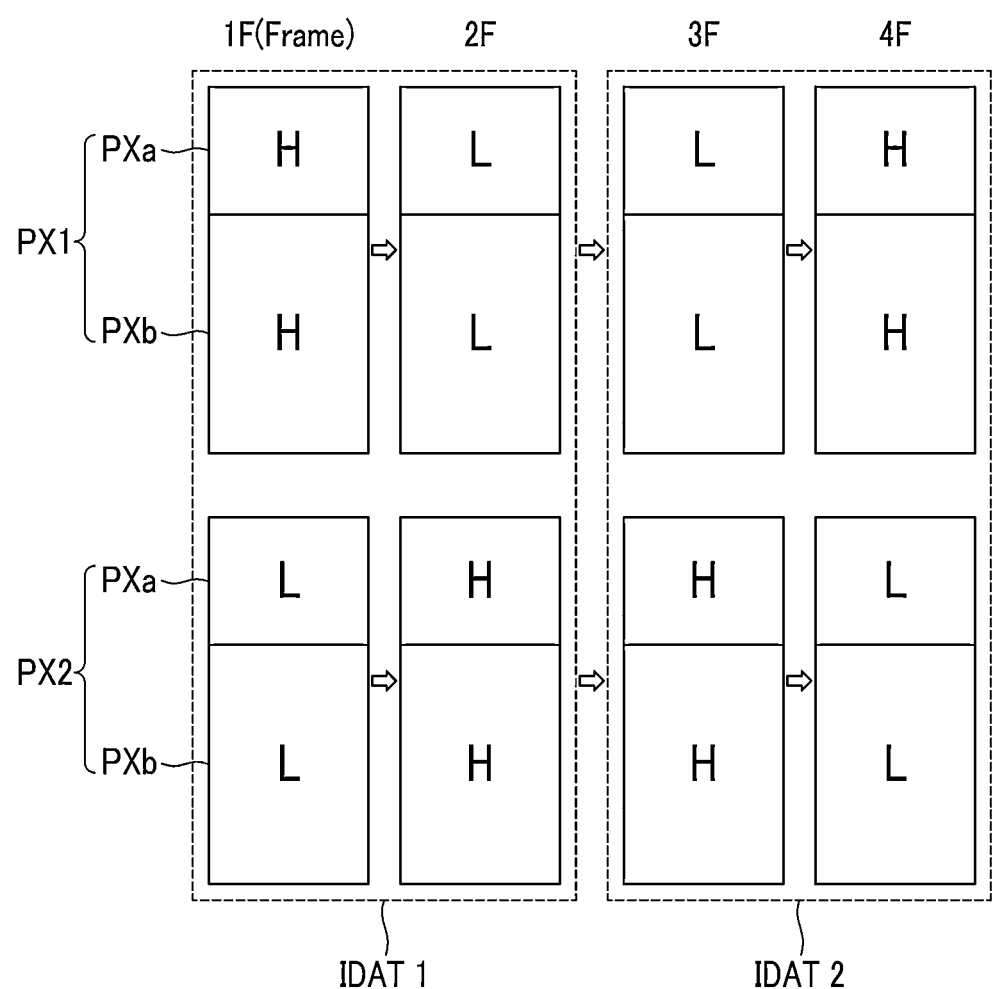
FIG. 34 is a view of luminance of two adjacent pixels of an exemplary embodiment of a display device according to the invention during a frame sequence based on a gamma curve applied thereto.
Figure 35:
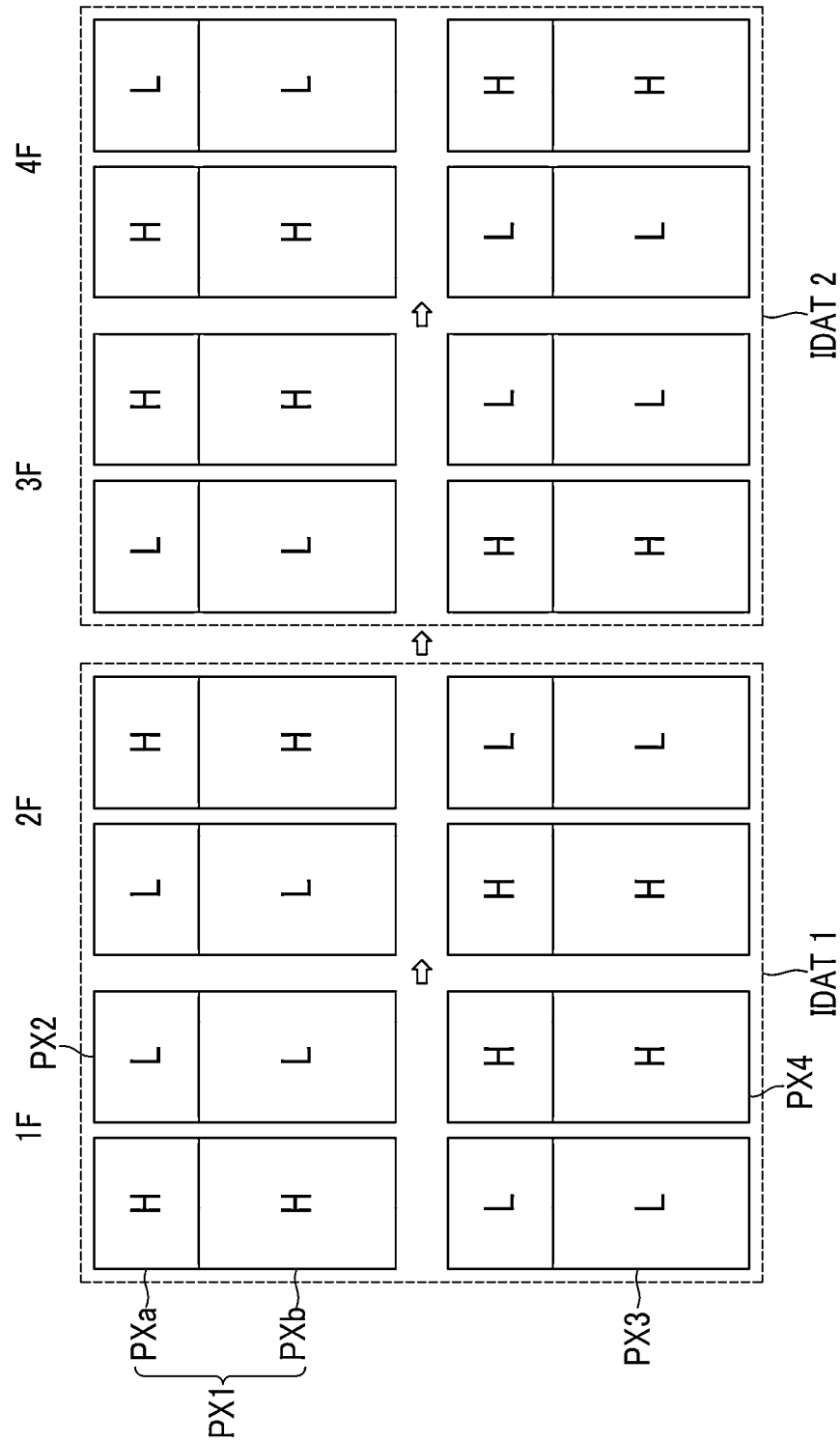
FIG. 35 and FIG. 36 are views of luminance of four adjacent pixels during a frame sequence based a gamma curve applied thereto in exemplary embodiments a display device according to the invention.
Figure 36:
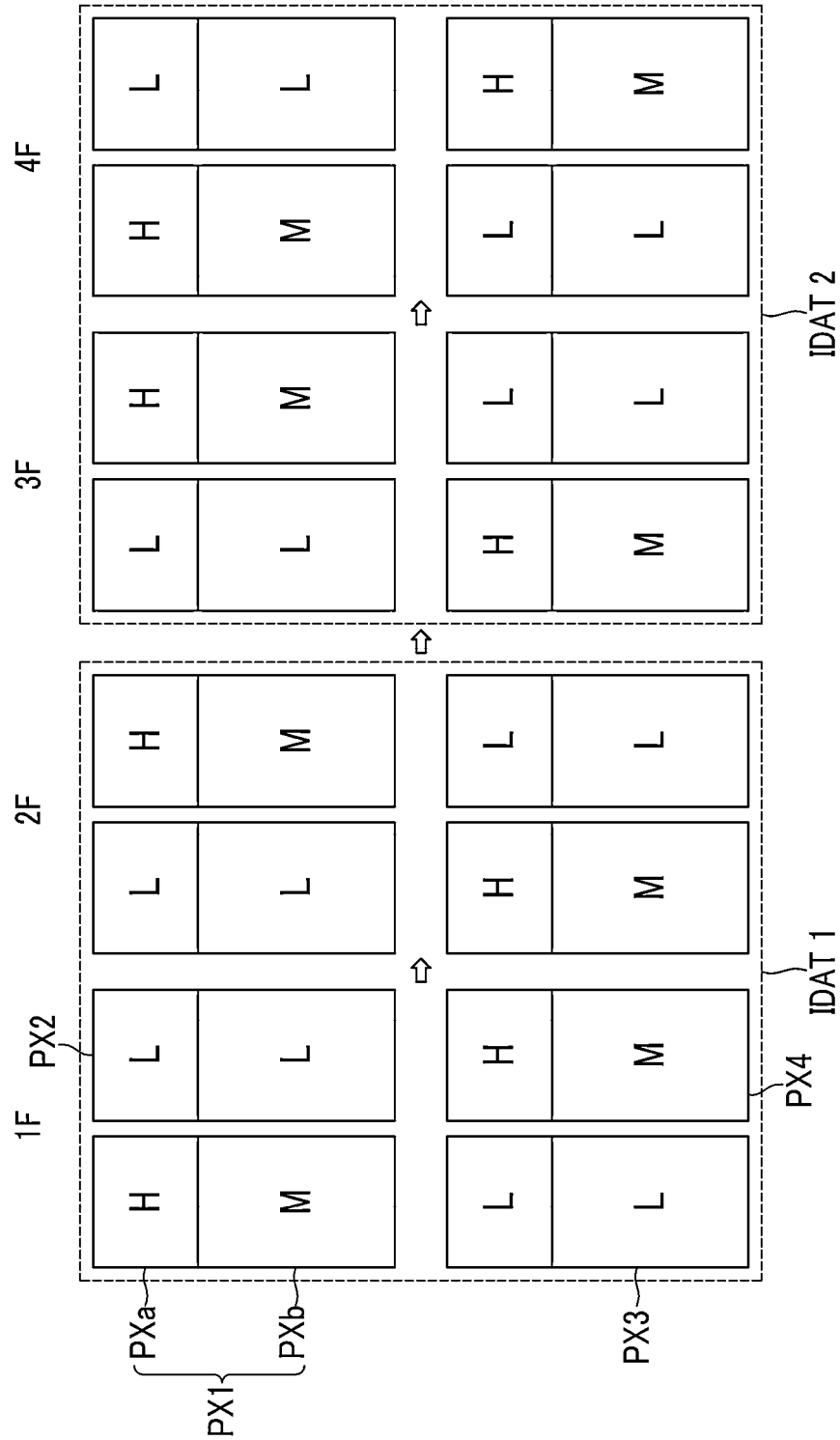

FIG. 34 is a view of luminance of two adjacent pixels during a frame sequence based on a gamma curve applied thereto in an exemplary embodiment of a display device according to the invention, and FIG. 35 and FIG. 36 are views of luminance of four adjacent pixels during a frame sequence based on a gamma curve applied thereto in an exemplary embodiment of a display device according to the invention.

Firstly, referring to FIG. 34, a pixel PX of an exemplary embodiment of the display device according to the invention may include the first and second subpixels PXa and PXb and may not be divided into subpixels. The first pixel PX1 and the second pixel PX2 may be neighboring in the row direction or the column direction in the display panel 300, and the first and second pixels PX1 and PX2 display images corresponding to different input image signals IDAT.

Each of the first and second pixels PX1 and PX2 may display the image corresponding to an input image signals IDAT during a frame set including two or more consecutive frames. In one exemplary embodiment, for example, each of the first and second pixels PX1 and PX2 may display the image for a current input image signal, e.g., a first input image signal IDAT1, in two consecutive frames 1F and 2F, and may display the image for next input image signal, e.g., a second input image signal IDAT2, in next two consecutive frames 3F and 4F.

Referring to the first pixel PX1, as shown in FIG. 3 or FIG. 17, the first image H based on the first gamma curve GH may be displayed in one of two frames included in a frame set, and the second image L based on the second gamma curve GL may be displayed in the other of the two frames included in the frame set. In such an embodiment, the sequence of displaying the first image H and the second image L may be reversed in two consecutive frame sets or the same in two consecutive frame sets. In an exemplary embodiment, the first pixel PX1 may display the image in a manner substantially similar to those in the exemplary embodiments shown in FIG. 4 to FIG. 6, FIG. 18A to FIG. 22B and FIG. 24A to FIG. 33B.

Next, referring to the second pixel PX2, the gamma curve of the second pixel PX2, e.g., the gamma curve based on which the image is displayed by the second pixel PX2, may be different from the gamma curve of the first pixel PX1. In one exemplary embodiment, for example, as shown in FIG. 34, in the frame in which the first pixel PX1 displays the first image H, the second pixel PX2 may display the second image L, and vice versa. As described above, in such an embodiment, the gamma curves for the image displayed by the neighboring pixels PX1 and PX2 are different, and display deterioration such as flicker is thereby substantially reduced. In such an embodiment, a vertical line or a flicker that may occur in the frame inversion driving or the column inversion driving in which the polarity of the data voltage Vd is changed every frame is also substantially reduced.

Referring to FIG. 35 and FIG. 36, in an exemplary embodiment, a pixel PX may also include the first and second subpixels PXa and PXb, but not being limited thereto. In an alternative exemplary embodiment, the pixel may not be divided into subpixels. In an exemplary embodiment, four pixels, e.g., a first pixel PX1, a second pixel PX2, a third pixel PX3 and a fourth pixel PX4 are neighboring in the row direction or the column direction in the display panel 300, and display different input image signals IDAT. The first to fourth pixels PX1, PX2, PX3 and PX4 may be substantially in a matrix form.

Each of the four pixels PX1, PX2, PX3 and PX4 may display an image in a manner substantially similar to those described with reference to FIG. 4 to FIG. 6, FIG. 18A to FIG. 22B, and FIG. 24A to FIG. 33B. FIG. 36 shows an exemplary embodiment, where each of the four pixels PX1, PX2, PX3 and PX4 display the image as shown in FIG. 18A or FIG. 18B, and FIG. 35 shows an exemplary embodiment, where the first image H is inserted in a frame for the third image M, as shown in FIG. 36.

According to the exemplary embodiment, the sequence of the image displayed by the first pixel PX1 and the second pixel PX2 neighboring in the row direction may be reversed in the neighboring frame sets, and the sequence of the image displayed by the first pixel PX1 and the second pixel PX2 neighboring in the column direction may be reversed in the neighboring frame sets. Accordingly, the image displayed by two pixels neighboring in the diagonal direction in a frame of the neighboring frame sets 1F, 2F, 3F or 4F may be the same as each other.

As described, in an exemplary embodiment, the gamma curves for the image displayed by the neighboring pixels PX1, PX2, PX3 and PX4 are different from each other, and the display deterioration such as the flicker is thereby substantially reduced.

Exemplary embodiments of the display device and the driving method according to the invention will be described with reference to FIG. 37 to FIG. 41.

Figure 37:
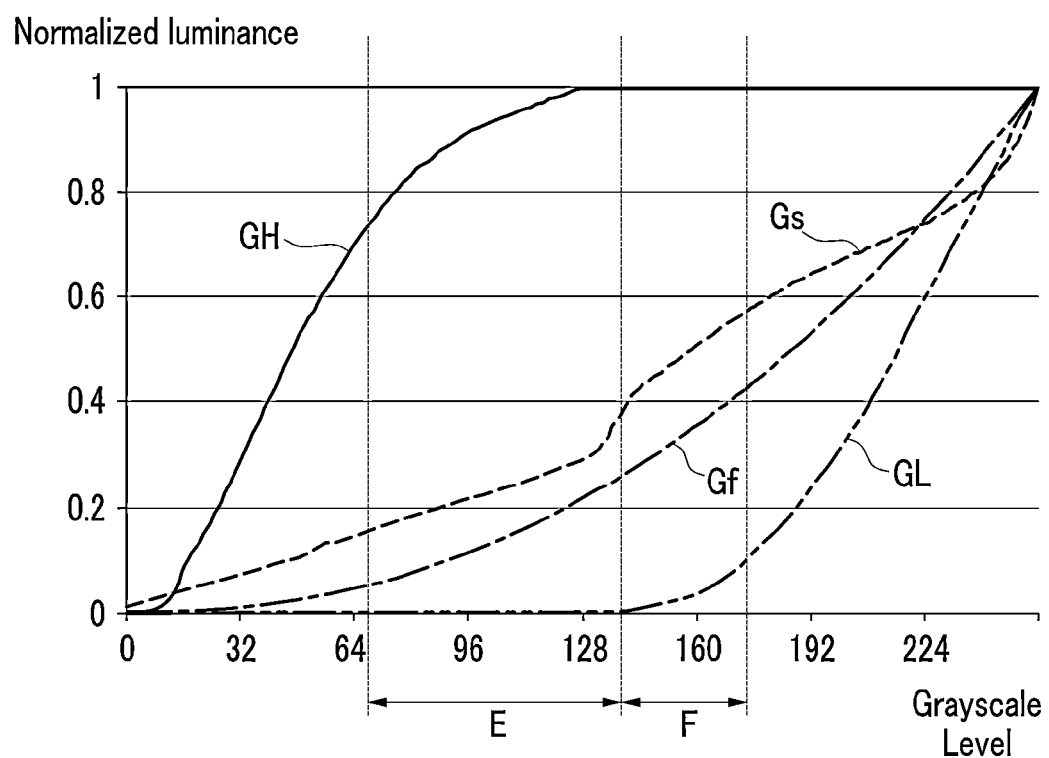
FIG. 37 is a graph of a gamma curve of an exemplary embodiment of a display device according to the invention.
Figure 38:
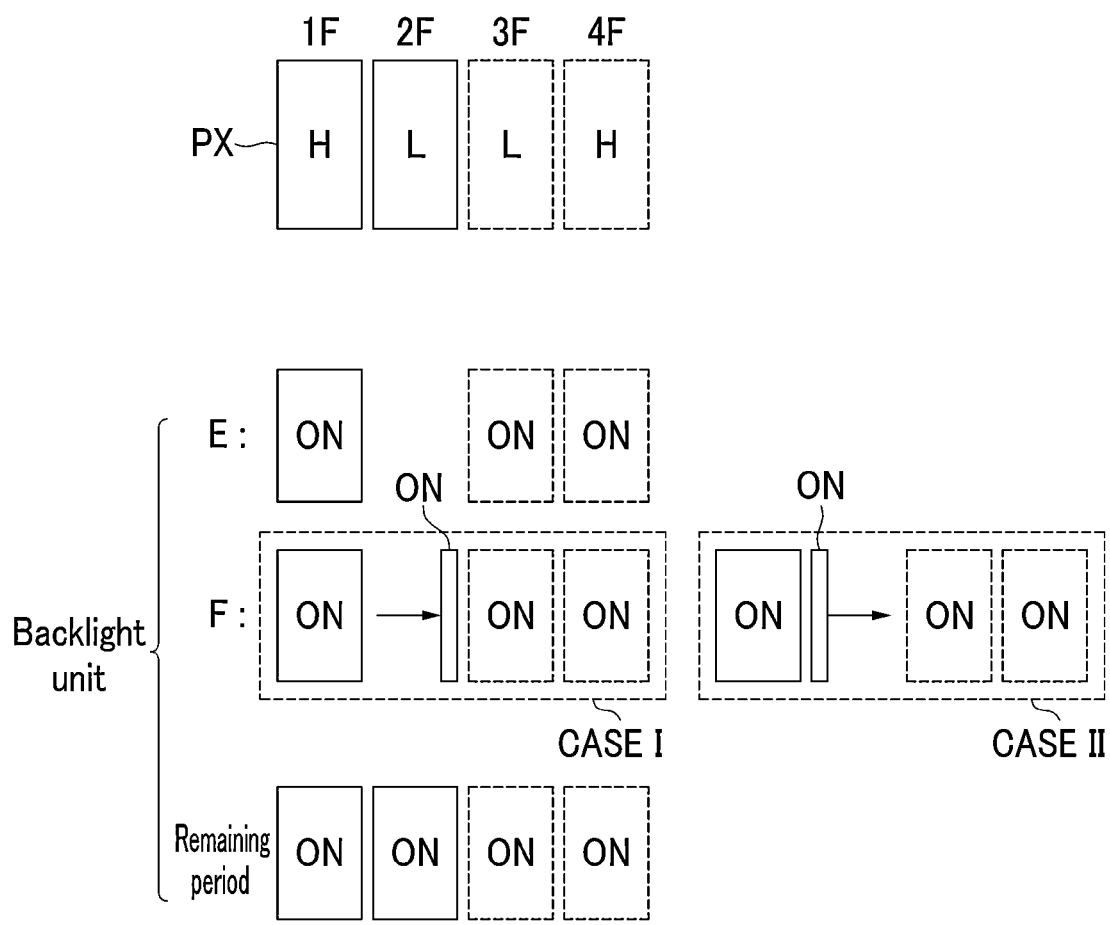
FIG. 38 and FIG. 39 are timing diagrams of an exemplary embodiment of a driving method of a backlight unit of a display device according to of the invention.
Figure 39:
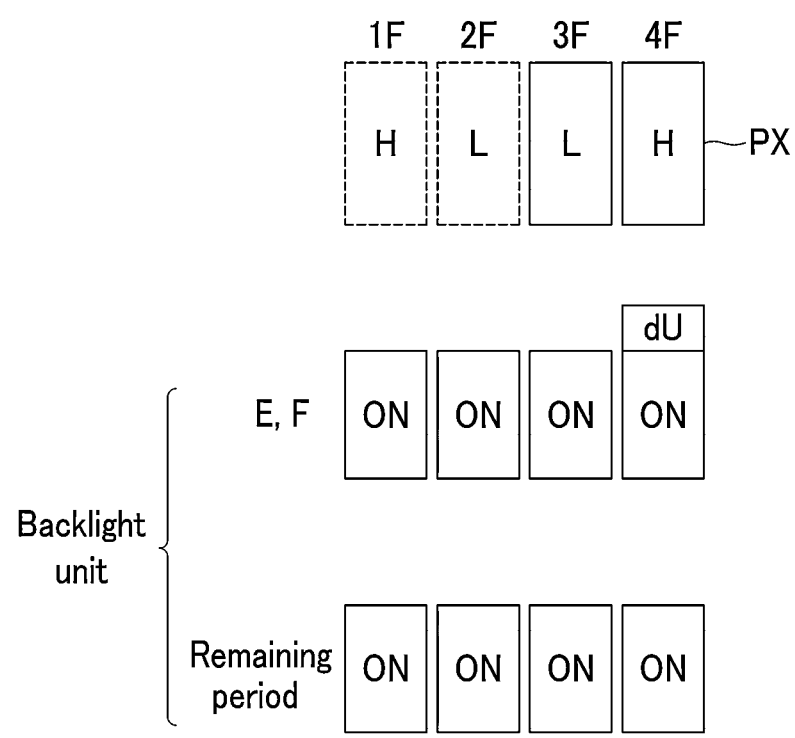
Figure 40:
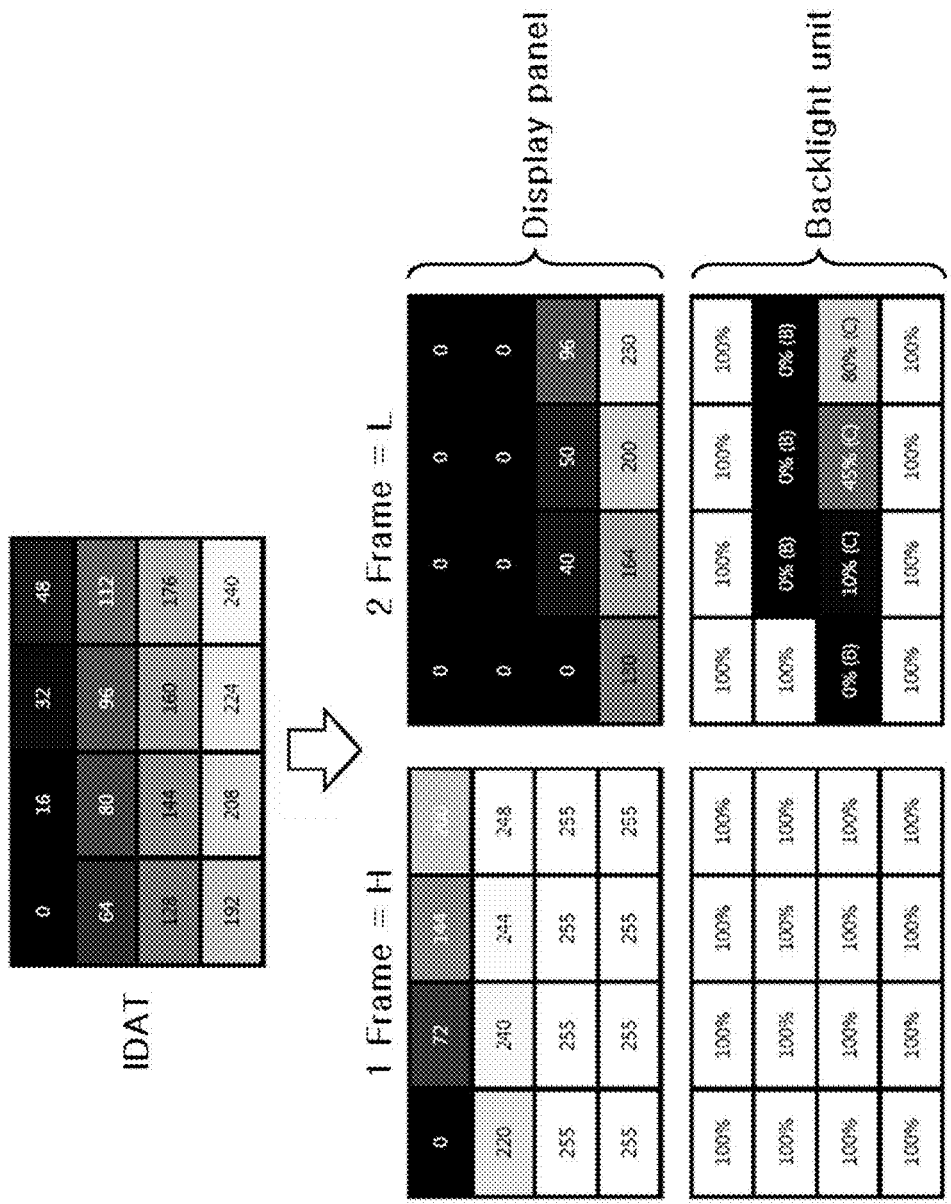
FIG. 40 and FIG. 41 are views of grayscale levels of an image displayed corresponding to an input image signal by an exemplary embodiment of a display device according to an the invention and a luminance of a backlight unit thereof.
Figure 41:
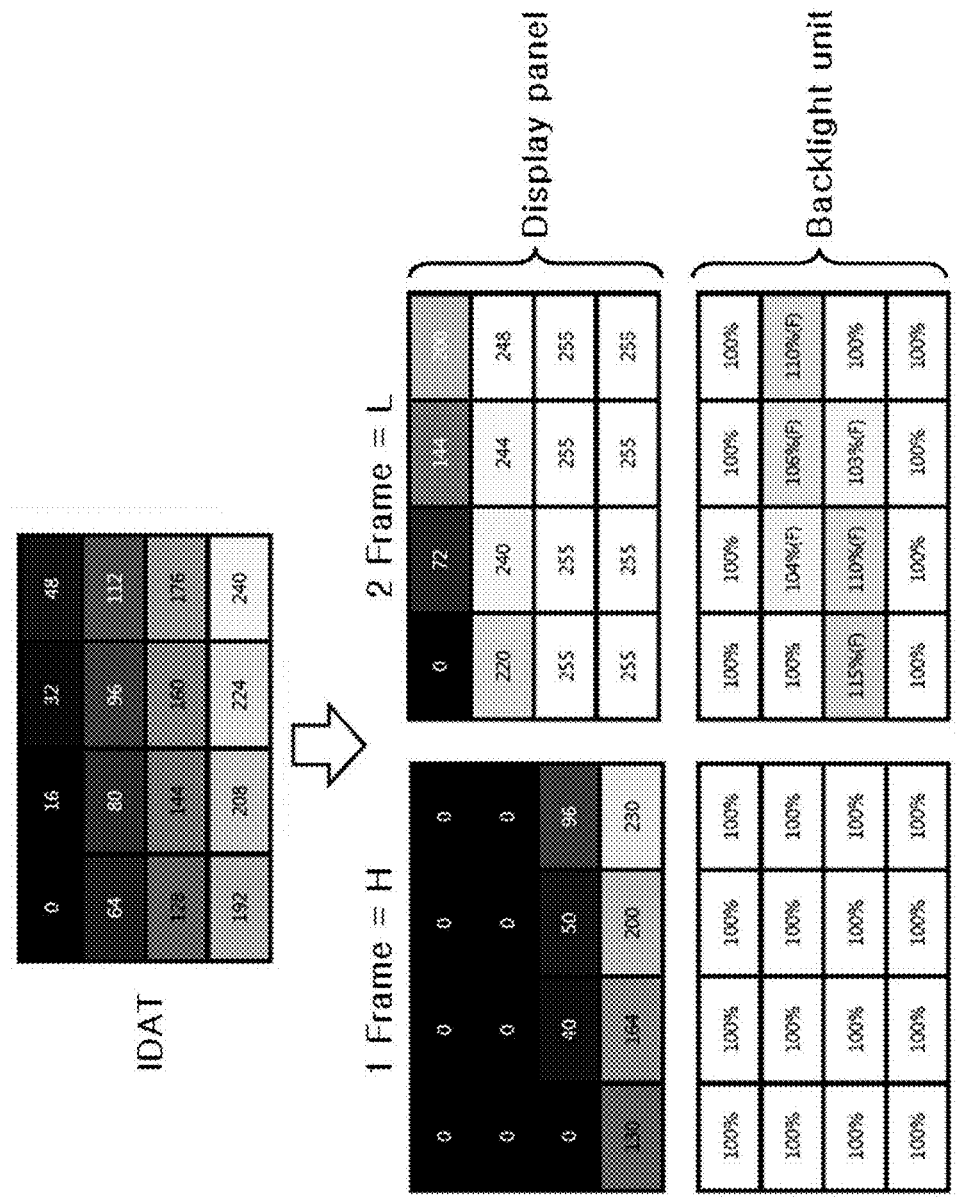

FIG. 37 is a graph of a gamma curve of an exemplary embodiment of a display device according to the invention, FIG. 38 and FIG. 39 are timing diagrams showing an exemplary embodiment of a driving method of a backlight unit of a display device according to the invention, and FIG. 40 and FIG. 41 are views of grayscale levels of an image displayed corresponding to an input image signal by an exemplary embodiment of a display device according to the invention and luminance of a backlight unit thereof.

The display device using the method shown in FIGS. 37 to 41 may be substantially the same as the exemplary embodiments of the display device described above, and the driving method thereof may be substantially the same as the exemplary embodiments described above. Also, the gamma curve applied to the exemplary embodiment of the display device may be substantially the same as the gamma curve shown in FIG. 3, FIG. 17 or FIG. 23. However, in such an embodiment, the display device may controls an operation of the backlight unit 900, e.g., controls timing of turning on and off of the back light unit 900, based on the applied gamma data and input image signal IDAT. In such an embodiment, the signal controller 600 analyzes the gamma data and the input image signal IDAT, generates the backlight control signal CONT4 based on a result of the analysis and outputs the backlight control signal CONT4 to the backlight controller 950.

In an exemplary embodiment, referring to FIG. 37, in the first gamma curve GH having the relatively high luminance and the second gamma curve GL having the relatively low luminance, the first period E and the second period F may be determined as periods in which a difference between the luminance of the first image H based on the first gamma curve GH and the luminance of the second image L based on the second gamma curve GL is more than about 70% of a difference between the highest luminance and the lowest luminance (referred to as an entire luminance).

In the first and second periods E and F, the response speed of the liquid crystal molecules affects the visibility when the high luminance is changed into the low luminance. That is, in the first and second periods E and F, when the decreasing response speed of the liquid crystal molecules is slow, the low grayscale level is not effectively displayed such that the visibility may be deteriorated.

In an exemplary embodiment of the invention, as shown in FIG. 37 and FIG. 38, when the pixel PX does not display the highest luminance, but displays the first image H of the high luminance in the first frame 1F, and then displays the second image L of the lowest luminance in the second frame 2F (the first period E in FIG. 37), the backlight unit 900 is turned off such that a black image may be effectively expressed during the second frame 2F. In such an embodiment, the luminance of the first image H of the high luminance may be greater than about 70% of the highest luminance.

In such an embodiment, in FIG. 37 and FIG. 38, when the pixel PX displays the first image H of the highest luminance in the first frame 1F and then displays the second image L of the low luminance in the second frame 2F, a value of which is not zero (0) (the second period F in FIG. 37), the backlight unit 900 is not turned off. In such an embodiment, the backlight unit 900 may be turned on during a portion of time in the second frame 2F. In such an embodiment, the luminance of the second image L of the low luminance may be less than about 30% of the highest luminance. According to an exemplary embodiment, a PWM duty ratio of the turn-on time of the backlight unit 900 may be controlled in the second frame 2F, and the PWM duty ratio R of the backlight unit 900 may be determined by Equation 1 as follows.

$$R=1-a/b \quad \text{[Equation 1]}$$

In Equation 1, 'b' denotes the high luminance to be displayed by the highest driving current flowing to the backlight unit 900, and 'a' denotes a difference between a target luminance of the input image signal IDAT and an actual luminance when the backlight unit 900 is in the turn-on state. In an exemplary embodiment, the difference between a target luminance of the input image signal IDAT and an actual luminance when the backlight unit 900 is in a turn-on state may be previously measured and stored in a memory, which may be additionally provided. In Equation 1, it is assumed that the luminance of the backlight unit 900 is linearly increased according to the PWM duty ratio R.

The point when the backlight unit 900 is turned on according to the PWM duty ratio R in the second period F may be at a final portion of the second frame 2F as shown in a first case CASE I of FIG. 38, and may be at a first position of the second frame 2F as shown in a second case CAST II of FIG. 38. In the first case CASE I, the slow decreasing response speed of the liquid crystal molecules is firstly compensated such that the low grayscale level may be effectively expressed, thereby substantially improving the visibility.

In the second frame 2F, the backlight unit 900 may be turned on during the remaining period except for the first and second periods E and F of FIG. 37 and the other frames except for the second frame 2F.

Referring to FIG. 37 and FIG. 39, when the pixel PX of the display device displays the second image L of the low luminance in the third frame 3F based on the gamma curve of the first and second periods E and F shown in FIG. 37, and then displays the first image H of the high luminance in the fourth frame 4F, an additional driving current may be further provided to the backlight unit 900 during the fourth frame 4F in addition to a basic driving current such that the backlight unit 900 may output light with luminance greater than a basic luminance of 100%, which is the highest luminance, by a boosting luminance dU. Accordingly, in the fourth frame 4F, the luminance of the light provided to the pixel PX from the backlight unit 900 may be higher than the light provided to the pixel PX from the backlight unit 900 in the third frame 3F.

A magnitude of a boosting driving current as the driving current when outputting the light with luminance greater than the highest luminance by a boosting luminance dU is determined by Equation 2 as follows.

$$Id\_U=(1+c/d)*Id \quad \text{[Equation 2]}$$

In Equation 2, Id_U denotes the boosting driving current, Id denotes the driving current when the backlight unit 900 outputs the basic luminance of 100%, 'd' denotes the basic luminance of 100%, and 'c' denotes the difference between the target luminance of the input image signal IDAT and the actual luminance when the backlight unit 900 outputs the basic luminance. The value c may be previously measured and stored in an additional memory.

The backlight unit 900 may emit the basic luminance during the remaining period except for the first and second periods E and F of FIG. 37 in the fourth frame 4F and the remaining frames except for the fourth frame 4F.

FIG. 40 and FIG. 41 show an operation of an exemplary embodiment of the display panel 300 and the backlight unit 900 thereof shown in FIG. 38 and FIG. 39.

In an exemplary embodiment, the backlight unit 900 is divided into a plurality of light emitting blocks, and may be driven by a local dimming driving method for controlling an amount of light from each light emitting block.

Referring to FIG. 40, when the input image signal IDAT is sequentially input in a range from a grayscale level value of zero (0) to a grayscale level value of 240 for each pixel PX of the display panel 300, each pixel PX of the display panel 300 receives the data voltage Vd corresponding to the first image H based on the first gamma curve GH in the first frame 1F, and the backlight unit 900 provides the light of the basic luminance of 100% to the display panel 300.

In the second frame 2F, each pixel PX of the display panel 300 receives the data voltage Vd corresponding to the second image L based on the second gamma curve GL, and the pixel PX corresponding to the low grayscale level receives the data voltage Vd corresponding to the grayscale level value of zero (0), which is the value of the lowest grayscale level. In the second frame 2F, the backlight unit 900 is turned off for the pixel PX corresponding to the first period E of FIG. 37, that is, the pixel PX applied with the data voltage Vd corresponding to the grayscale level value of zero (0) in the second frame 2F, such that the light of zero (0) % luminance may be provided to the display panel 300. Also, for the pixel PX corresponding to the second period F of FIG. 37, the backlight unit 900 is turned on during the predetermined PWM duty ratio R to be emitted for a short time, thereby providing light of a luminance less than 100% to the display panel 300.

Referring to FIG. 41, when the input image signal IDAT is sequentially input from the grayscale level value of zero (0) to the grayscale level value of 240 for each pixel PX of the display panel 300, each pixel PX of the display panel 300 receives the data voltage Vd corresponding to the second image L based on the second gamma curve GL in the first frame 1F, and the backlight unit 900 provide the light of the basic luminance of 100% to the display panel 300.

In the second frame 2F, each pixel PX of the display panel 300 receives the data voltage Vd corresponding to the first image H based on the first gamma curve GH, and the pixel PX corresponding to the high gray receives the data voltage Vd corresponding to the grayscale level value of 255 which is the value of the highest grayscale level. In such an embodiment, the backlight unit 900 is provided with the boosting driving current Id_U for the pixel PX corresponding to the first and second periods E and F of FIG. 37 such that the light having luminance, to which the boosting luminance dU is added to the basic luminance, may be provided to the display panel 300.

Next, with reference to FIG. 42 to FIG. 45, an exemplary embodiment of the display device and the driving method thereof according to the invention will be described. The same constituent elements as in the above-described exemplary embodiments are indicated by the same reference numerals, and any repetitive detailed description thereof will hereinafter be omitted.

Figure 42:
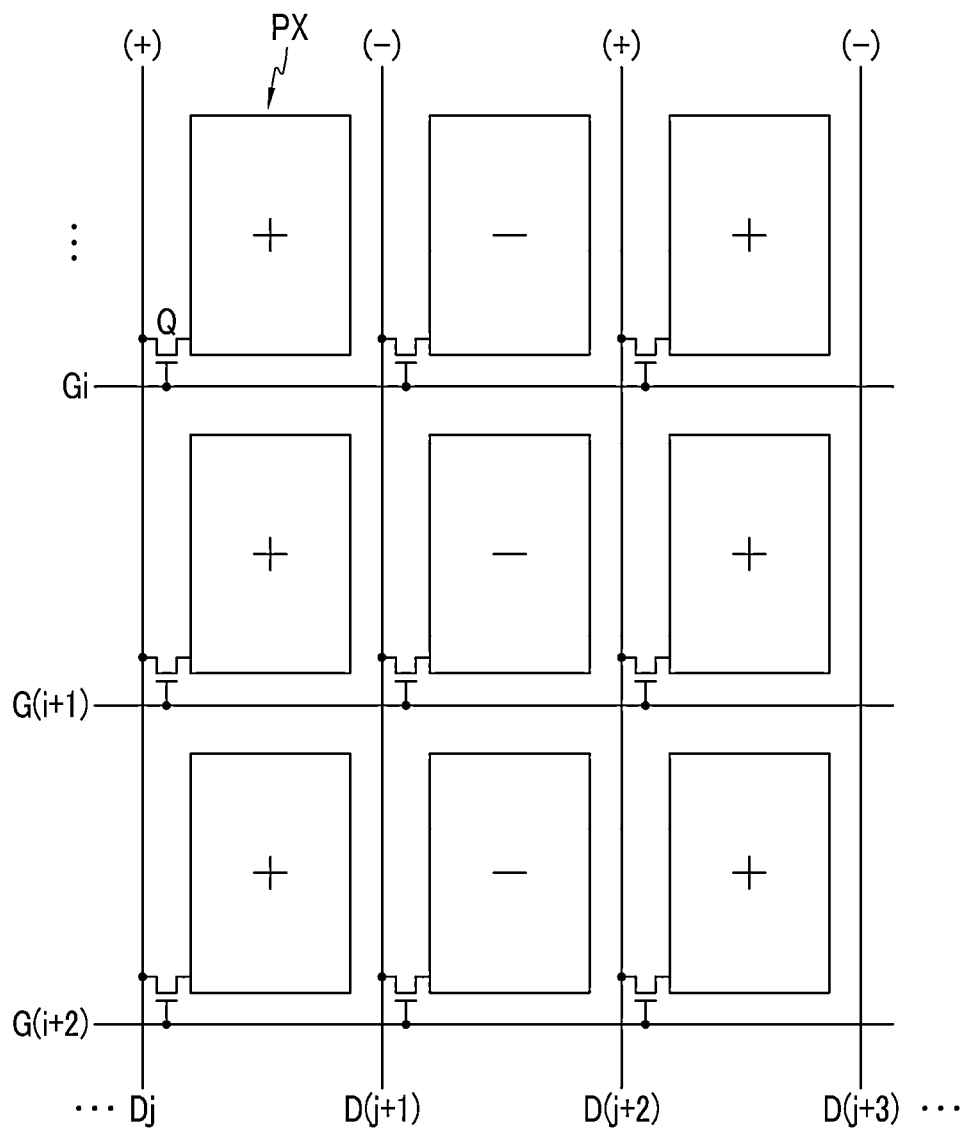
FIG. 42 and FIG. 43 are circuit diagrams of a plurality of pixels of an exemplary embodiment of a display device according to the invention.
Figure 43:
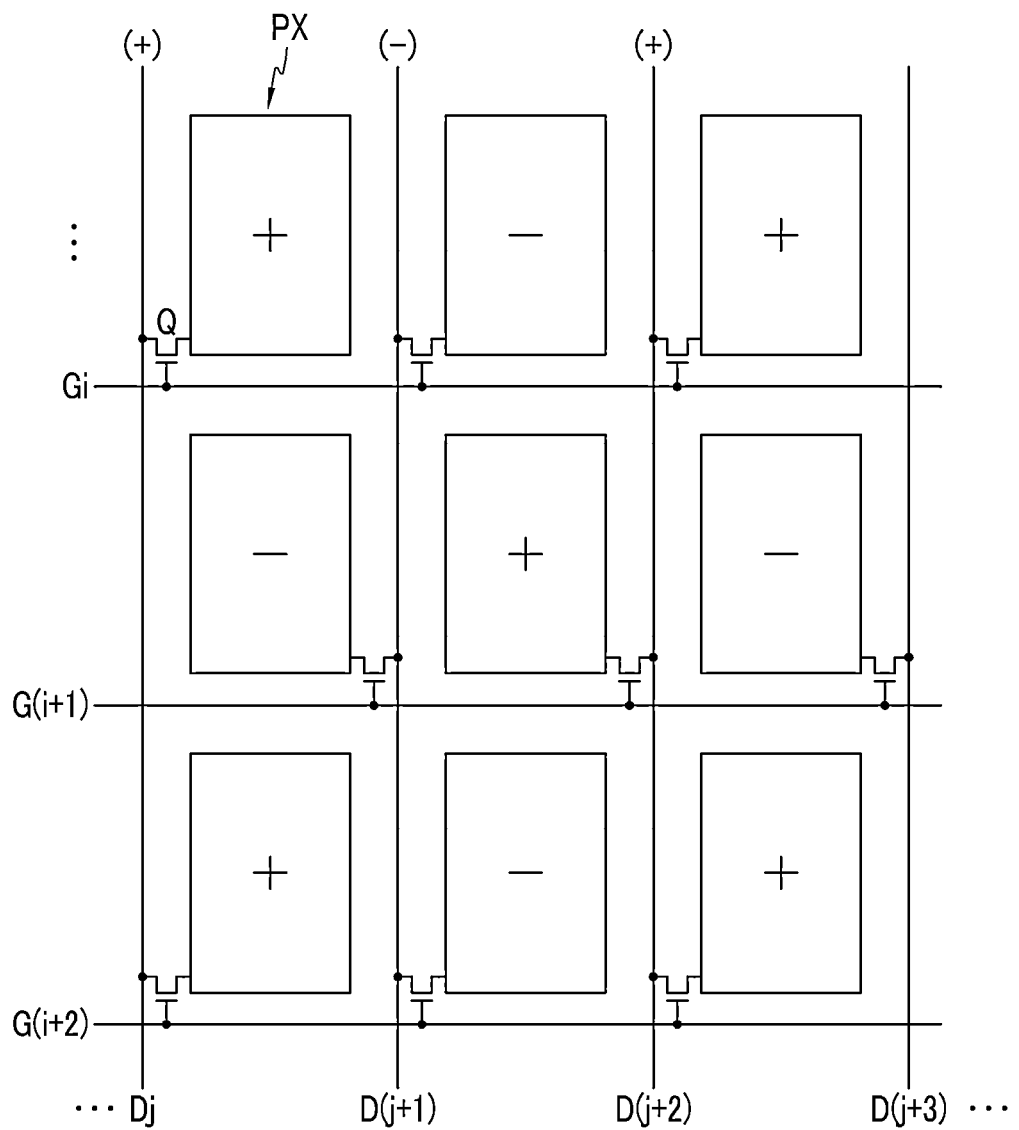

FIG. 42 and FIG. 43 are circuit diagrams showing a plurality of pixels of an exemplary embodiment of a display device according to the invention.

Referring to FIG. 42, in an exemplary embodiment, pixels PX positioned in a pixel column may be connected to a same data line, e.g. one of a j-th data line Dj, a (j+1)-th data line D(j+1), a (j+2)-th data line D(j+2) and a (j+3)-th data line D(j+3), through the switching element Q thereof. In an alternative exemplary embodiment, referring to FIG. 43, pixels PX positioned in a pixel column may be connected to two different data lines, e.g., two of the j-th data line Dj, the (j+1)-th data line D(j+1), the (j+2)-th data line D(j+2) and the (j+3)-th data line D(j+3), through the switching element Q thereof. According to an exemplary embodiment of the invention, the pixels PX positioned in a pixel row may be connected to a same gate line, e.g., one of an i-th gate line Gi, an (i+1)-th gate line G(i+1) and an (i+2)-th gate line G(i+2).

The data control signal CONT2 transmitted from the signal controller 600 to the data driver 500 may further include an inversion signal for inverting the polarity (referred to as a data voltage polarity) of the data voltage Vd with respect to the common voltage.

A pixel PX of an exemplary embodiment of the invention receives the data voltage Vd based on the different gamma curves during a frame set including a plurality of frames to display the image. When the gamma data includes two or more two gamma curves as shown in FIG. 3, FIG. 17 and FIG. 23, the image displayed during the frame set does not display the lowest grayscale level and the highest grayscale level, but may display the image based on the first gamma curve GH having the highest luminance for the middle grayscale level and based on the second gamma curve GL having the lowest luminance for the middle grayscale level.

In an exemplary embodiment, the polarities of the data voltages Vd applied to the data lines D1-Dm of a pixel row are different from each other. In such an embodiment, the polarities of the data voltages Vd of the adjacent data lines Dj, D(j+1), D(j+2) and D(j+3) may be different from each other. In such an embodiment, as shown in FIG. 42, the polarity of the data voltage Vd applied the pixels PX positioned in a same pixel column is the same as each other, and the polarity of the data voltage Vd applied to the pixels PX positioned in as pixel row may alternately have positive (+) and negative (−) values. In an alternative exemplary embodiment, as shown in FIG. 43, the polarity of the data voltage Vd applied to the pixels PX positioned in a same pixel column may be alternately have the positive (+) and negative (−) values in the column direction.

Next, exemplary embodiments of the driving method of the display device will be described with reference to FIG. 44 to FIG. 60.

Figure 44:
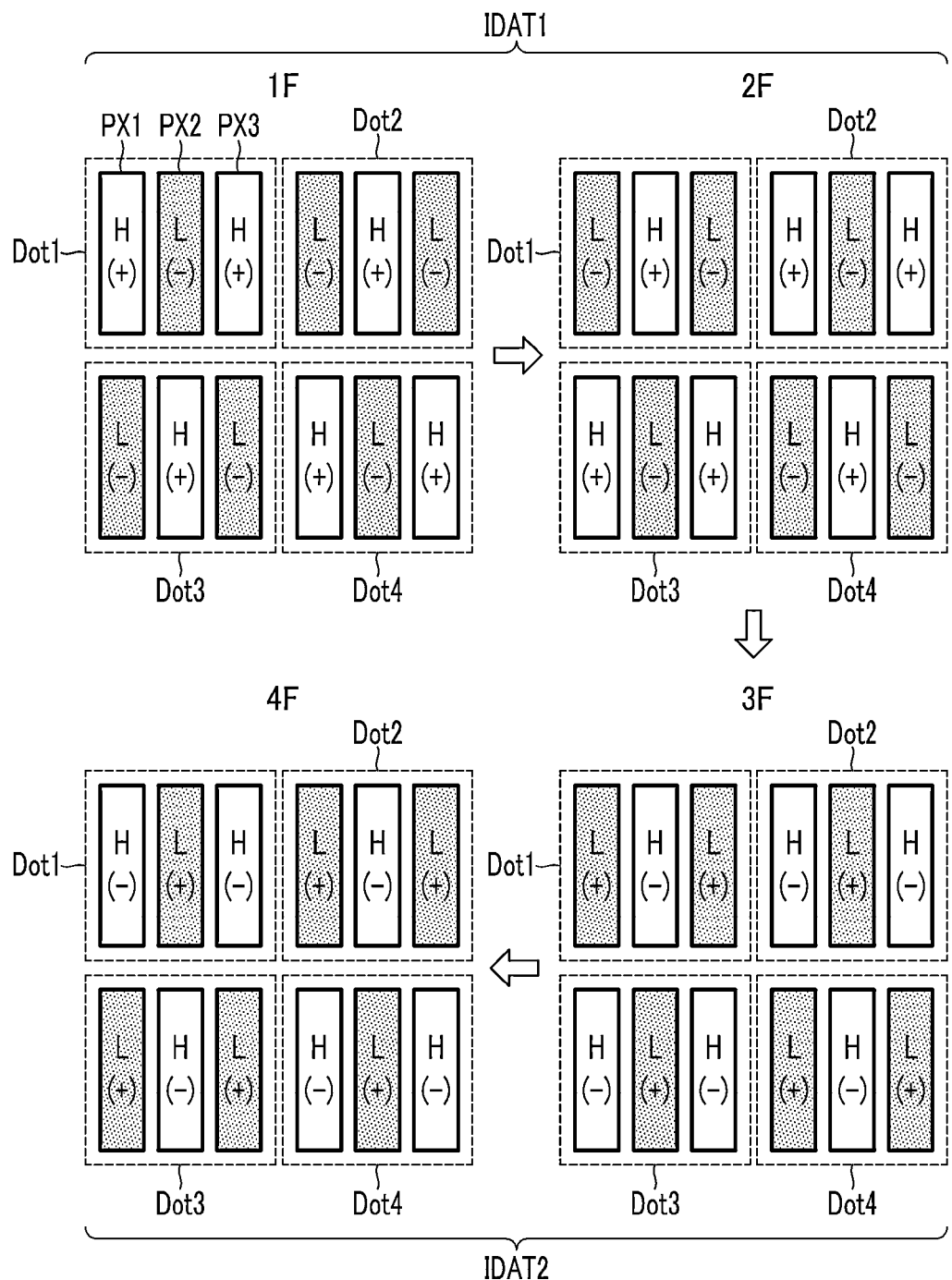
FIG. 44 is a view of luminance of a plurality of pixels and a polarity of a data voltage during a frame sequence in an exemplary embodiment of a display device according to the invention.
Figure 45:
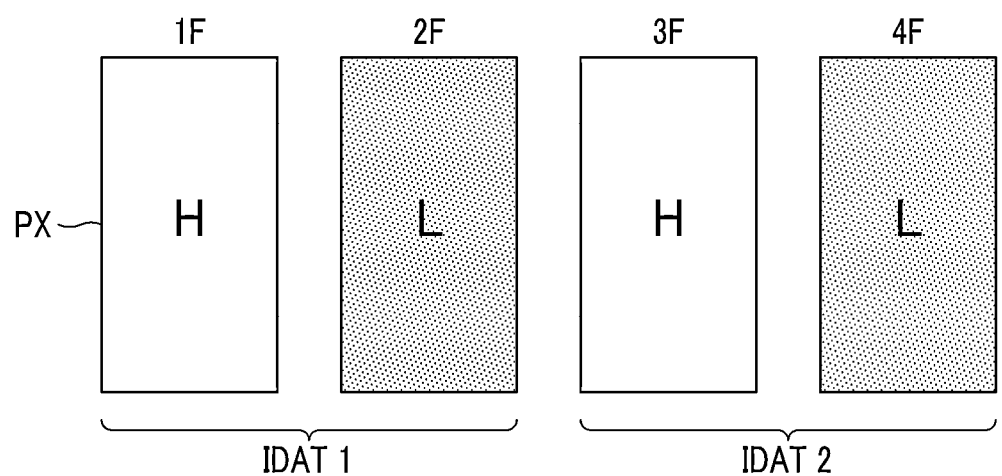
FIG. 45 is a view of luminance of a pixel during a frame sequence in an exemplary embodiment of a display device according to the invention.

FIG. 44 is a view of luminance of a plurality of pixels and a polarity of a data voltage during a frame sequence in an exemplary embodiment of a display device according to the invention, FIG. 45 is a view of luminance of a pixel for a frame sequence in an exemplary embodiment of a display device according to the invention, and FIG. 46 to FIG. 60 are views of luminance of a plurality of pixels and a polarity of a data voltage during a frame sequence in exemplary embodiments of a display device according to the invention.

In an exemplary embodiment, the display device improves the lateral visibility thereof using the above-described first and second gamma curves GH and GL. However, it is not limited thereto. In an alternative exemplary embodiment, three or more different gamma curves may be used.

Firstly, referring to FIG. 44, in an exemplary embodiment, the display device includes a plurality of dots, e.g., first to fourth dots Dot1, Dot2, Dot3 and Dot4, arranged substantially in a matrix form, and each of the dots Dot1, Dot2, Dot3 and Dot4 includes a plurality of pixels, e.g., first to third pixels PX1, PX2 and PX3, which respectively displays different primary colors such as red, green, and blue. The first pixel PX1, the second pixel PX2 and the third pixel PX3 included in one dot of the dots Dot1, Dot2, Dot3 and Dot4 may display three different primary colors such as red, green and blue, for example. The pixels PX1, PX2 and PX3 included in each dot of the dots Dot1, Dot2, Dot3 and Dot4 may be disposed in the row direction or the column direction, and may display the image corresponding to the different input image signal IDAT.

Each dot of the dots Dot1, Dot2, Dot3 and Dot4 may be driven on a frame-set-by-frame set basis, where each frame set includes two or more consecutive frames. In an exemplary embodiment, as shown in FIG. 44, two frames define one frame set. The image of the different luminances based on the different gamma curves is displayed during the first frame set including two consecutive frames, e.g., first and second frames 1F and 2F, for the first input image signal IDAT1, and the image of the different luminances based on the different gamma curves is displayed during the second frame set including two consecutive frames, e.g., third and fourth frames 3F and 4F, where the second frame set is subsequent to, e.g., immediately next to, the first frame set for the second input image signal IDAT2, which is subsequent to, e.g., immediately next to, the first input image signal IDAT1.

Referring to one of the pixels PX1, PX2 and PX3, the image based on the first gamma curve GH (referred to as the first image H) may be displayed in one of two frames of a frame set, and the image based on the second gamma curve GL (referred to as the second image L) may be displayed in the other frame of the two frames of the frame set. According to an exemplary embodiment using a temporal division driving, the image based on the gamma curve is displayed in the different consecutive frames such that the combination gamma curve in the side is substantially close to the front gamma curve Gf, thereby substantially improving the lateral visibility. Also, a pixel PX is not divided subpixels such that the transmittance is substantially improved.

Referring to FIG. 45, when each of the pixels PX1, PX2 and PX3 of a dot displays the first image H in the first frame 1F, which is the first frame of the frame set for the first input image signal IDAT1, and displays the second image L in the second frame 2F which is the second frame of the frame set for the first input image signal IDAT1, each pixel PX1, PX2 and PX3 displays the first image H in the third frame 3F, which is the first frame of the frame set for the next second input image signal IDAT2 and displays the second image L in the fourth frame 4F, which is the second frame of the frame set for the next second input image signal IDAT2. During the following two frame sets, the image may be displayed in a method substantially the same as the method for displaying the first to fourth frames 1F to 4F, described above.

In an exemplary embodiment, each of the pixels PX1, PX2 and PX3 of the display device may display the image using the temporal division driving, as shown in FIG. 4 to FIG. 6.

In an exemplary embodiment, as shown in FIG. 44, each of the pixels PX1, PX2 and PX3 displays the image based on the same sequence as shown in FIG. 4.

According to an exemplary embodiment of the invention, the gamma curves of the images for the neighboring pixels PX1, PX2 and PX3 in each of the frames 1F, 2F, 3F and 4F are different from each other. In such an embodiment, during one frame of the frames 1F, 2F, 3F and 4F, the image based on the first gamma curve GH and the image based on the second gamma curve GL may be simultaneously displayed.

Accordingly, in an exemplary embodiment of the invention, the display deterioration such as the flicker generated due to the luminance difference based on the different gamma curves may be effectively prevented.

According to another exemplary embodiment of the invention, in each of the frames 1F, 2F, 3F and 4F, the gamma curve for the image displayed by the pixels PX1, PX2 and PX3 may be changed every two or more pixels PX1, PX2 and PX3.

Figure 46:
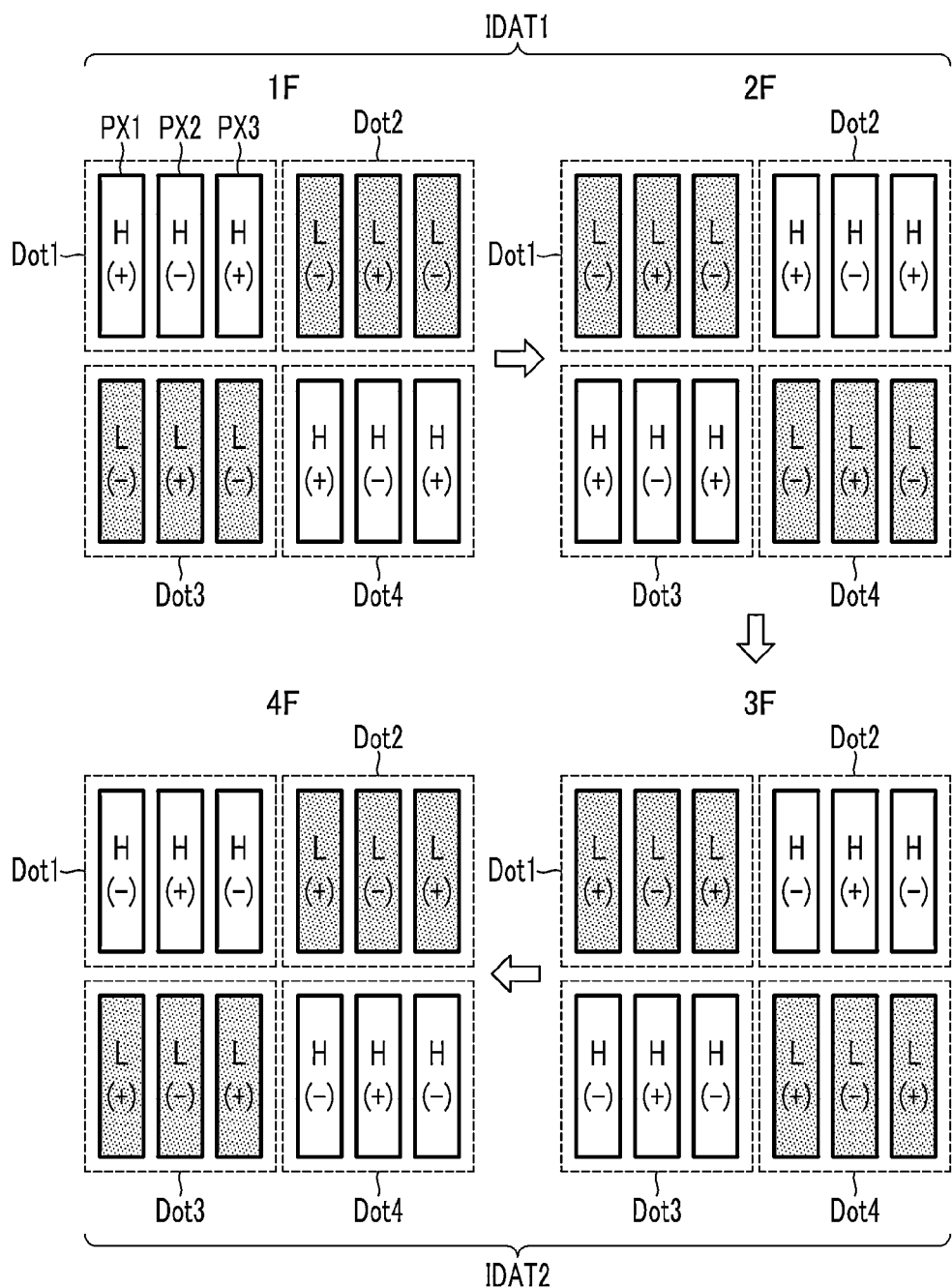
FIG. 46 to FIG. 60 are views of luminance of a plurality of pixels and a polarity of a data voltage during a frame sequence in exemplary embodiments of a display device according to the invention.

Referring to FIG. 46, an alternative exemplary embodiment will be described. The driving method shown in FIG. 46 is substantially the same as the exemplary embodiment shown in FIG. 44, except that the neighboring three pixels PX1, PX2 and PX3 in a dot display the image based on the same gamma curve and three pixels PX1, PX2 and PX3 in an adjacent dot may display an image based on a different gamma curve. In such an embodiment, one dot of the dots Dot1, Dot2, Dot3 and Dot4 displays the image based on the first gamma curve GH and an adjacent dot of the dots Dot1, Dot2, Dot3 and Dot4 may display the image based on the second gamma curve GL. In an alternative exemplary embodiment, different gamma curves may be applied every two pixels.

Referring to FIG. 44 and FIG. 46 to FIG. 50, an exemplary embodiment of the display device according to the invention may be driven using the polarity inversion driving method as shown in the exemplary embodiment shown in FIG. 43. Accordingly, the polarities of the data voltage Vd applied to the pixels PX1, PX2 and PX3 adjacent in the row direction and the column direction (hereafter referred to as a polarity of the pixels PX1, PX2 and PX3) may be opposite to each other.

In an exemplary embodiment, the polarity of the data voltage Vd applied to the pixels PX1, PX2 and PX3 may be inverted every frame. Accordingly, in an exemplary embodiment, as shown in FIG. 44, when the polarity of a pixel of the pixels PX1, PX2 and PX3 displaying the first image H in the first frame set 1F and 2F is positive, the polarity of a pixel of the pixels PX1, PX2 and PX3 displaying the first image H in the second frame set 3F and 4F may be negative. In such an embodiment, when the polarity of a pixel of the pixels PX1, PX2 and PX3 displaying the second image L in the first frame set 1F and 2F is negative, the polarity of the pixel of the pixels PX1, PX2 and PX3 displaying the second image L in the second frame set 3F and 4F may be positive.

Figure 47:
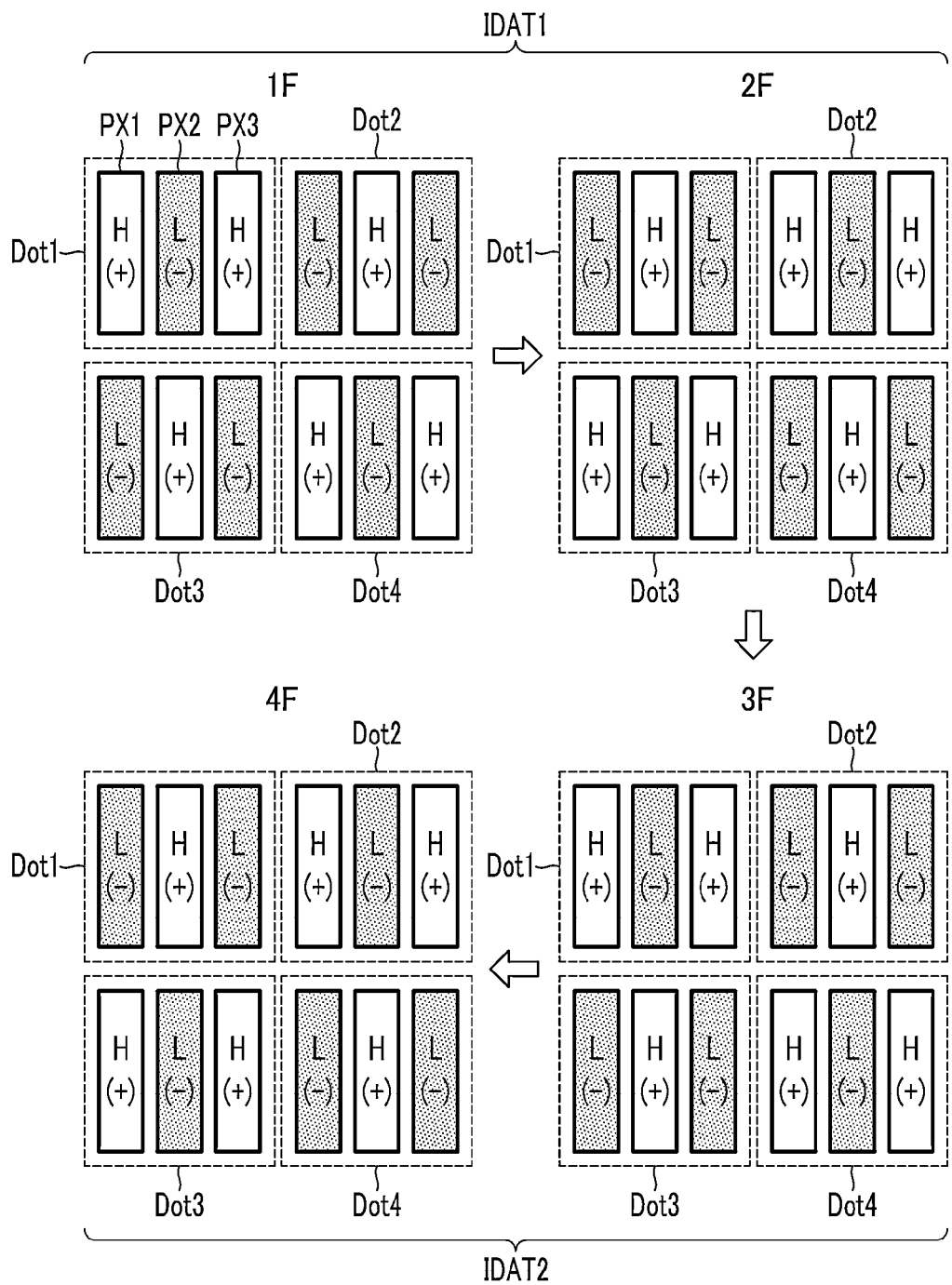

An exemplary embodiment shown in FIG. 47 is substantially the same as the exemplary embodiment shown in FIG. 44, except that the pixels PX1, PX2 and PX3 may display images based on the image display sequence substantially the same as the image display sequence of the exemplary embodiment shown in FIG. 45. In such an embodiment, the pixels PX1, PX2 and PX3 may alternately display the first image H and the second image L in each frame.

Figure 48:
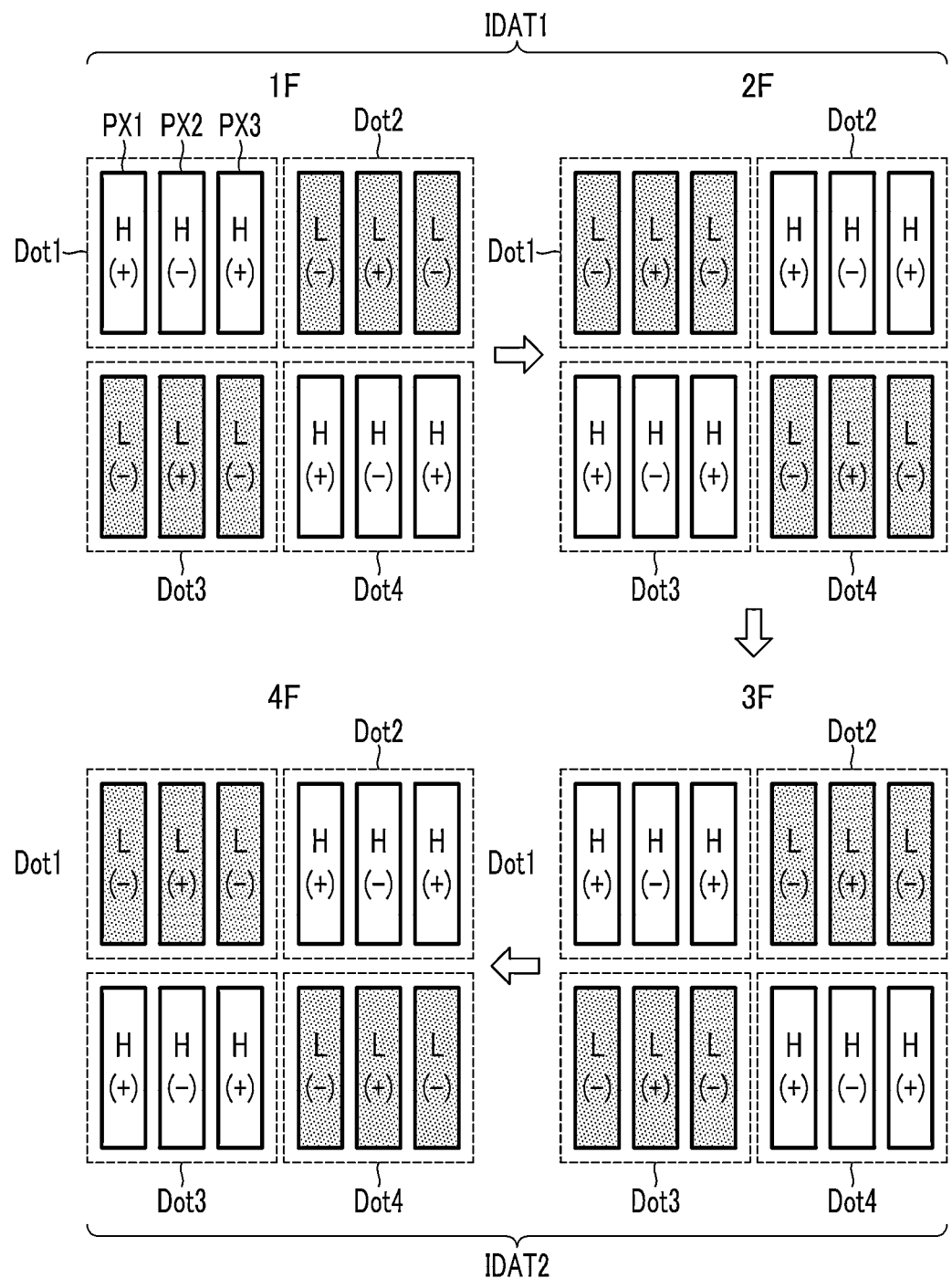

An exemplary embodiment shown in FIG. 48 is substantially the same as the exemplary embodiment shown in FIG. 46, except that the pixels PX1, PX2 and PX3 may display images based on the image display sequence substantially the same as that of the exemplary embodiment shown in FIG. 45. In such an embodiment, the pixels PX1, PX2 and PX3 may alternately display the first image H and the second image L in each frame.

Figure 49:
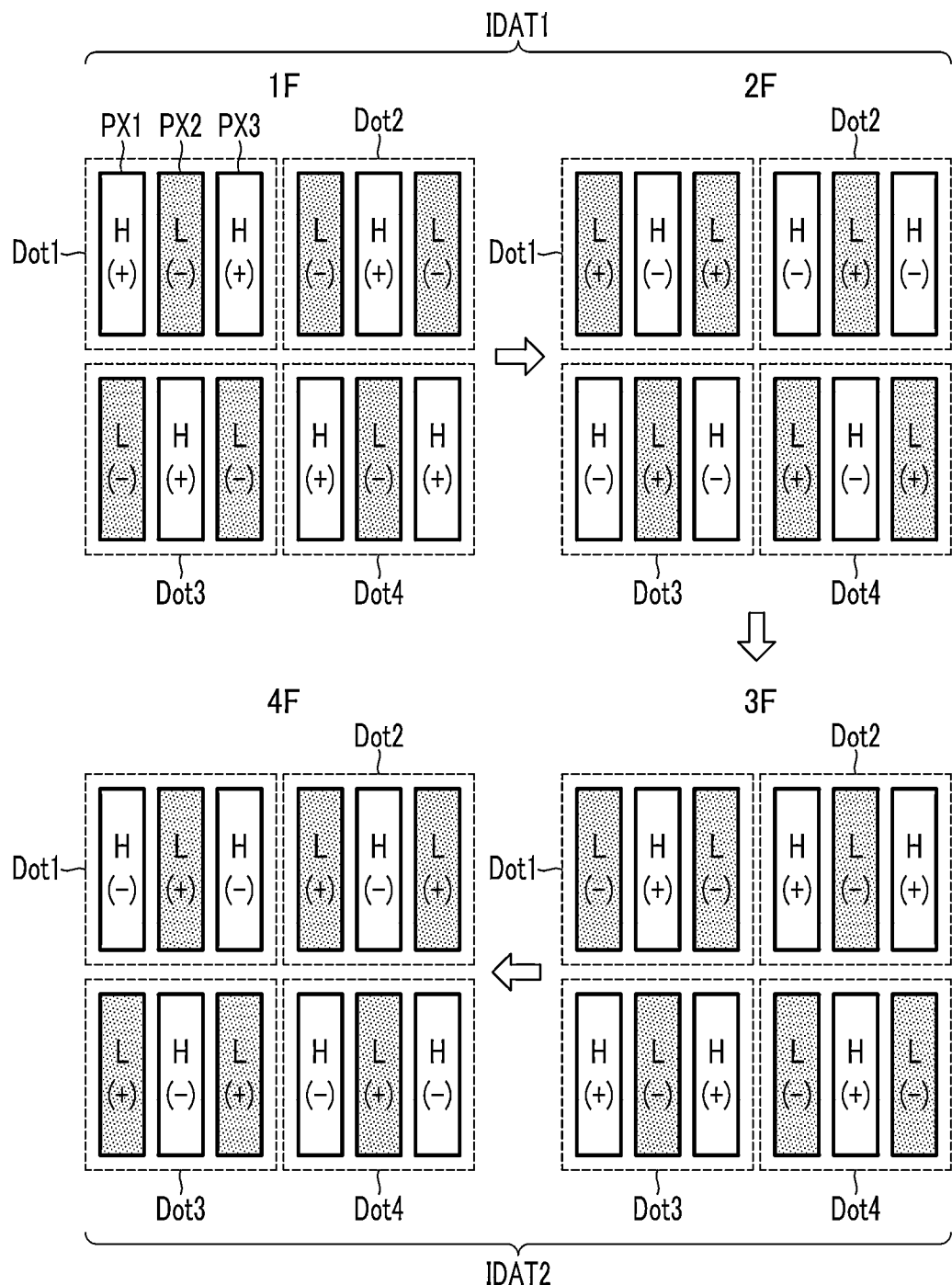

Referring to FIG. 49, the exemplary embodiment shown therein is substantially the same as the exemplary embodiment shown in FIG. 44, except that the polarity of the data voltage Vd applied to each of the pixels PX1, PX2 and PX3 may be inverted every two frames. Accordingly, in such an embodiment, as shown in FIG. 49 the polarity of the pixels PX1, PX2 and PX3 displaying the first image H is changed every frame, and the polarity of the pixels PX1, PX2 and PX3 displaying the second image L is changed every frame. Accordingly, the polarity of the first image H or the second image L based on each gamma curve is changed every frame such that the flicker caused by the luminance change that may be generated by the polarity change of the image based on each gamma curve is substantially minimized and an afterimage is effectively prevented.

Figure 50:
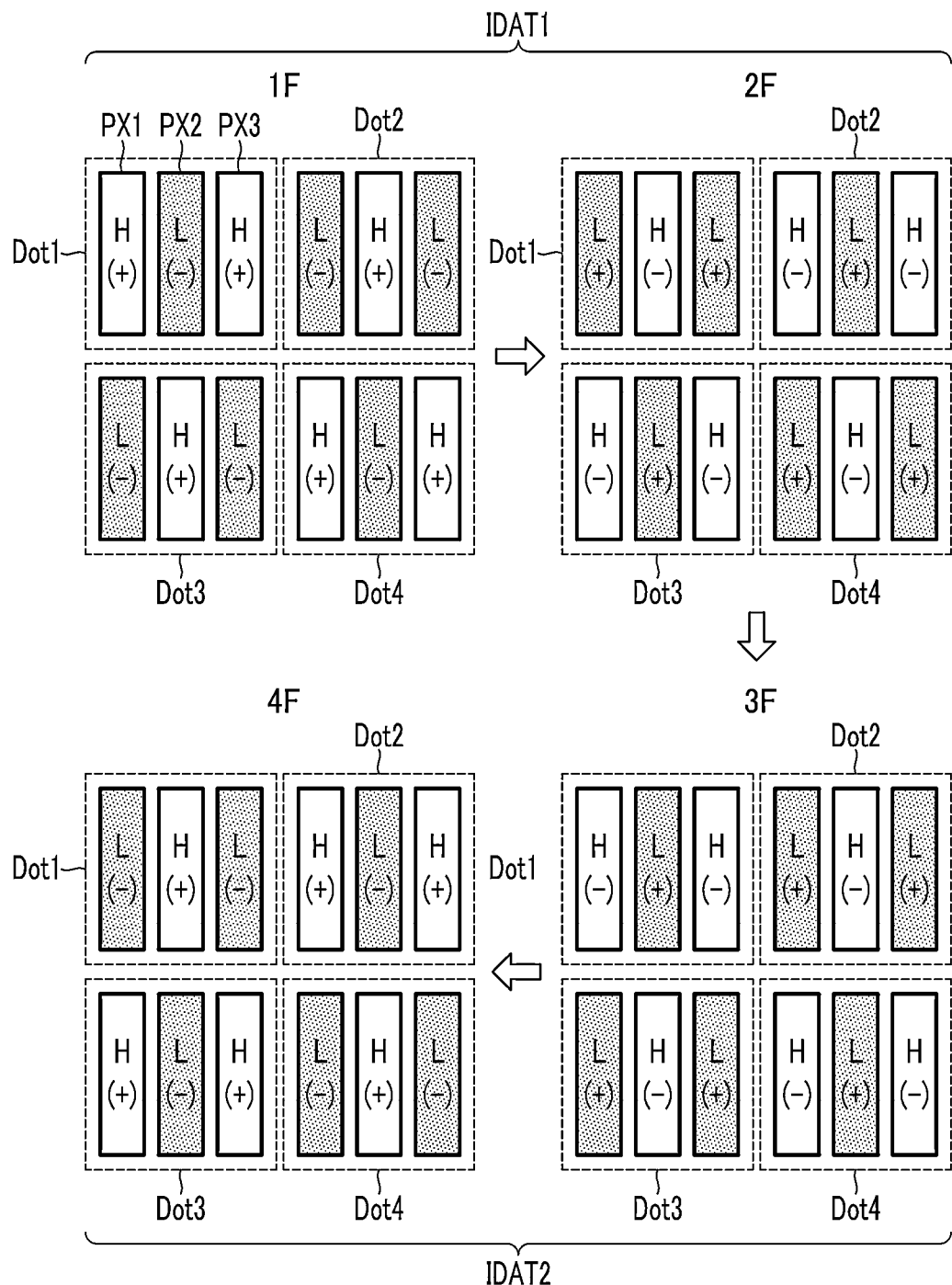

Referring to FIG. 50, the exemplary embodiment shown therein is substantially the same as the exemplary embodiment shown in FIG. 49, except that the pixels PX1, PX2 and PX3 may display the image based on the image display sequence as that in the exemplary embodiment shown in FIG. 45. In an alternative exemplary embodiment, the polarity of the data voltage Vd applied to each of the pixels PX1, PX2 and PX3 may be inverted every frame or every four frames. In an exemplary embodiment, where the polarity of the data voltage Vd applied to each of the pixels PX1, PX2 and PX3 is inverted every four frames, the polarity of the first image H or the second image L based on each gamma curve may be changed every frame such that the flicker caused by the luminance change that may be generated by the polarity change of the image based on each gamma curve is substantially minimized.

Figure 51:
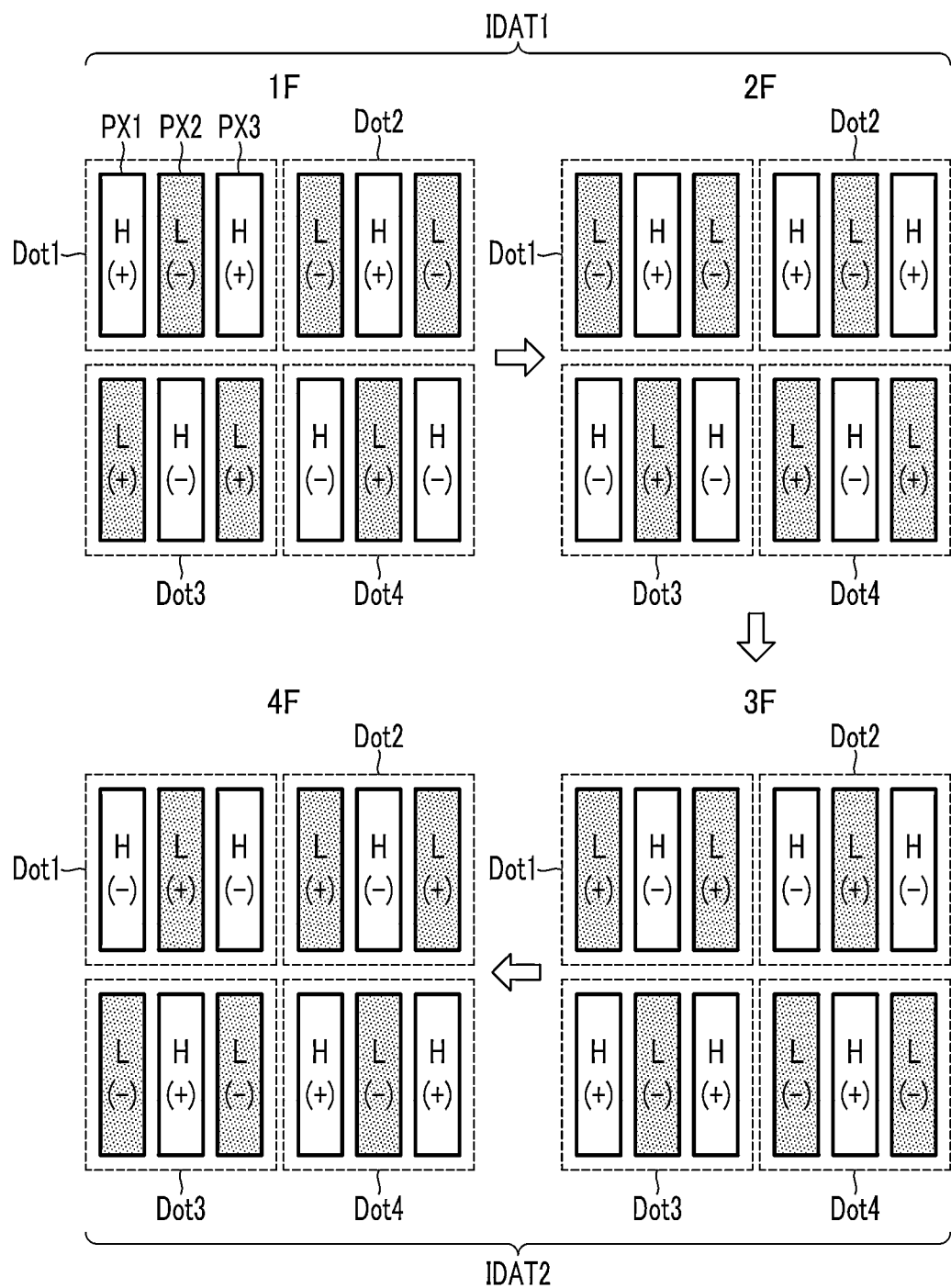
Figure 52:
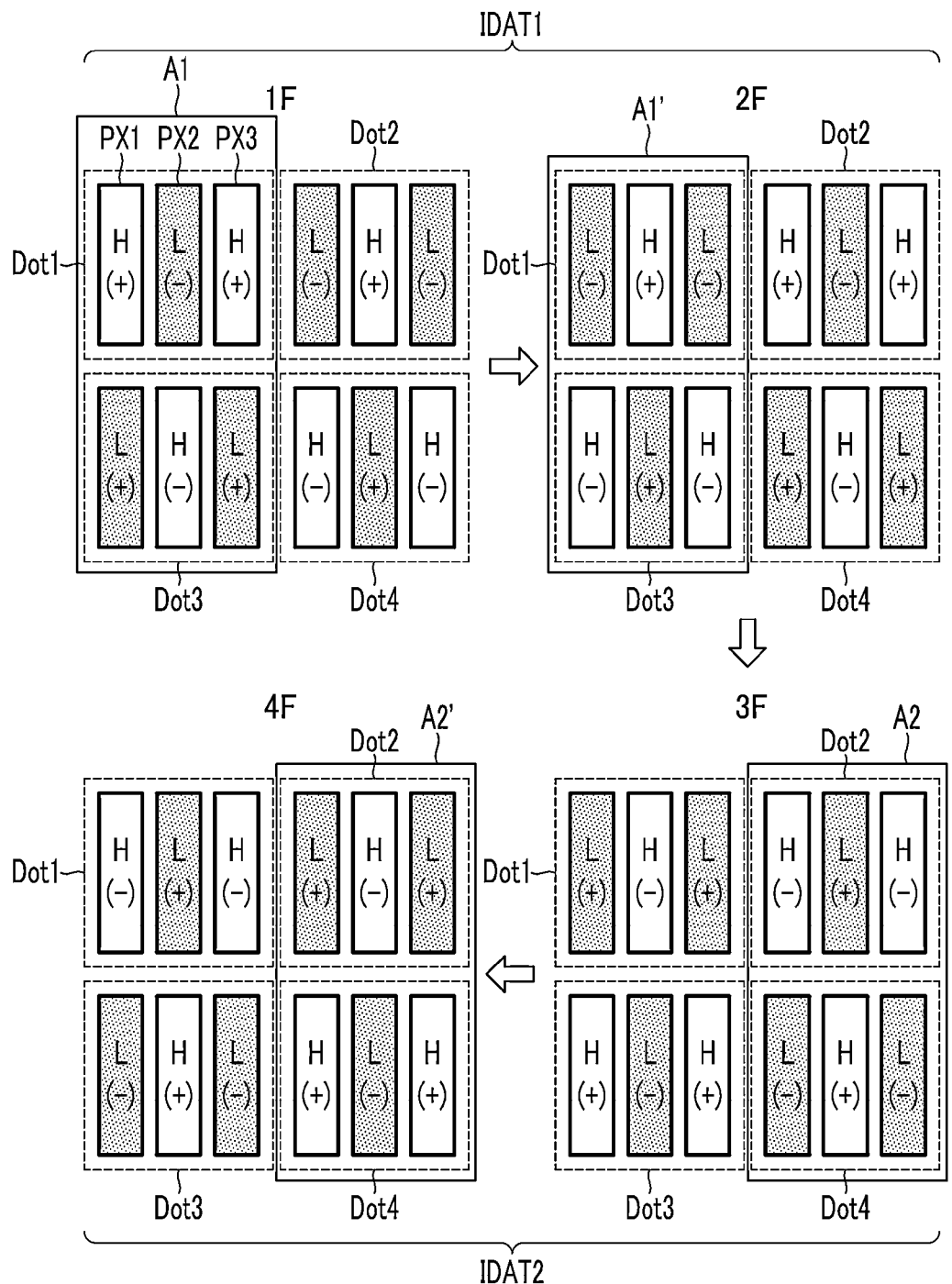

Referring to FIG. 51 and FIG. 52, the exemplary embodiment shown therein is substantially the same as the exemplary embodiment shown in FIG. 44, except for the polarity arrangement of the adjacent pixels PX1, PX2 and PX3 in a dot. In such an embodiment, the display device may be driven using the polarity inversion driving method as shown in the exemplary embodiment shown in FIG. 42. Accordingly, the polarities of the pixels PX1, PX2 and PX3 neighboring in the row direction are opposite to each other in a frame, however the polarities of the pixels PX1, PX2 and PX3 neighboring in the column direction may be the same as each other in the frame. According to an exemplary embodiment, as shown in FIG. 51 and FIG. 52, the number of the pixels having the positive value and displaying the first image H is substantially the same as the number of the pixels having the negative value and displaying the first image H, and the number of the pixels having the positive value and displaying the second image L is also substantially the same as the number of the pixels having the negative value and displaying the second image L in each of the frames 1F, 2F, 3F and 4F. In such an embodiment, the positive pixels and the negative pixels among the pixels displaying the first image H are adjacent in the column direction, and the positive pixels and the negative pixels among the pixels displaying the second image L are adjacent in the column direction, such that a polarity offset effect occurs.

Accordingly, in an exemplary embodiment, as shown in FIG. 51 and FIG. 52, when the luminance of the pixel having the positive value and displaying the first image H is positive, the luminance of the pixel having the negative value and displaying the first image H, the luminance of the pixel having the positive value and displaying the second image L is positive, and the luminance of the pixel having the negative value and displaying the second image L are different from each other, the luminance difference among the pixels PX1, PX2 and PX3 displaying the first image H in each of the frames 1F, 2F, 3F and 4F may be offset and the luminance difference among the pixels PX1, PX2 and PX3 displaying the second image L may be offset in each of the frames 1F, 2F, 3F and 4F. Accordingly, the luminance of all pixels PX in each frame is substantially constantly maintained, and the flicker generated due to the luminance difference based on the different gamma curve is thereby effectively prevented.

Referring to FIG. 52, when a pattern displayed on a screen is moving according to the time, the pattern may be displayed by different dots of the dots Dot1, Dot2, Dot3 and Dot4 in each frame set. In an exemplary embodiment, as shown in FIG. 52, the moving pattern moves by one dot every frame set.

In an exemplary embodiment, the moving pattern is displayed by the first dot Dot1 and the third dot Dot3 in the first frame set 1F and 2F and moves by one dot to the left in the second frame set 3F and 4F such that the moving pattern is displayed by the second dot Dot2 and the fourth dot Dot4. In one exemplary embodiment, for example, the moving pattern may be displayed as a first pattern image A1 in the first frame 1F, as a second pattern image A1' in the second frame 2F, as a third pattern image A2 in the third frame 3F, and as a fourth pattern image A2' in the fourth frame 4F. In such an embodiment, the first and second pattern images A1 and A1' correspond to the same first input image signal IDAT1 and are displayed based on different gamma curves, and the third and fourth pattern images A2 and A2' correspond to the same second input image signal IDAT2 and are displayed based on the different gamma curves.

Accordingly, the polarity of the first image H of the pixels PX1, PX2 and PX3 displaying the first pattern image A1 in the first frame 1F and the polarity of the first image H of the pixels PX1, PX2 and PX3 displaying the third pattern image A2 in the third frame 3F are offset from each other, and the polarity of the second image L of the pixels PX1, PX2 and PX3 displaying the first pattern image A1 in the first frame 1F and the polarity of the second image L of the pixels PX1, PX2 and PX3 displaying the third pattern image A2 in the third frame 3F are offset from each other. In such an embodiment, the polarity of the first image H of the pixels PX1, PX2 and PX3 displaying the second pattern image A1' in the second frame 2F and the polarity of the first image H of the pixels PX1, PX2 and PX3 displaying the fourth pattern image A2' in the fourth frame 4F are offset from each other, and the polarity of the second image L of the pixels PX1, PX2 and PX3 displaying the second pattern image A1' in the second frame 2F and the polarity of the second image L of the pixels PX1, PX2 and PX3 displaying the fourth pattern image A2' in the fourth frame 4F are offset from each other. Accordingly, the polarities of the pixels PX1, PX2 and PX3 displaying the pattern moving by one dot for the frame set are offset from each other such that the vertical line of the moving pattern is effectively prevented from being recognized. In an alternative exemplary embodiment, the moving pattern may move by two dots of the dots Dot1, Dot2, Dot3 and Dot4 every frame set, and the display deterioration such as the vertical line recognition by the polarity offset effect is effectively prevented from being recognized.

Figure 53:
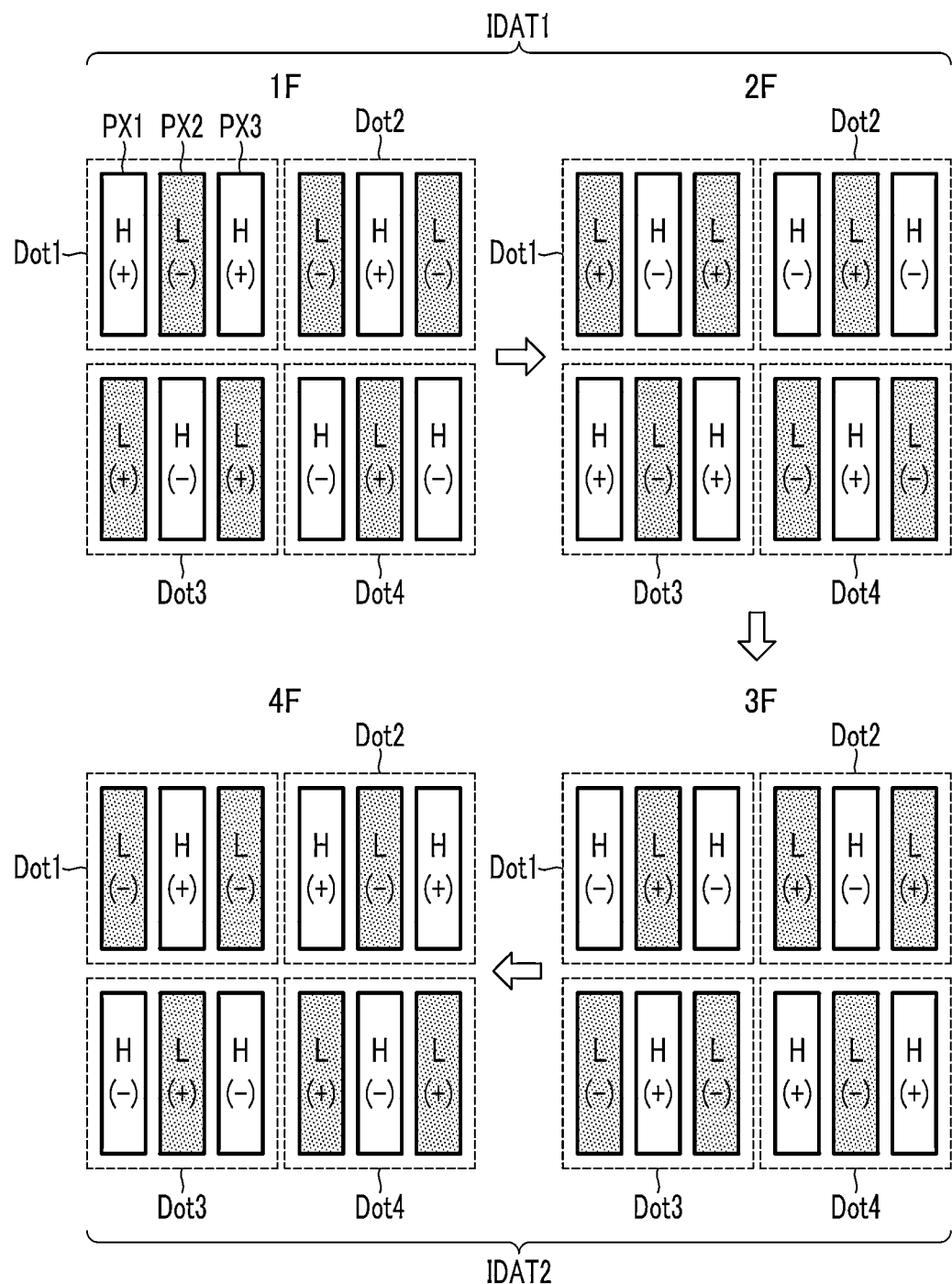

Referring to FIG. 53, the exemplary embodiment therein is substantially the same as the exemplary embodiment shown in FIG. 50, except for the polarity arrangement of the neighboring pixels PX1, PX2 and PX3. In such an embodiment, the display device may be driven using the polarity inversion driving method as in the exemplary embodiment shown in FIG. 42. Accordingly, the polarities of the pixels PX1, PX2 and PX3 neighboring in the row direction are opposite to each other in a frame, while the polarities of the pixels PX1, PX2 and PX3 neighboring in the column direction are the same as each other in the frame. According to an exemplary embodiment, as shown in FIG. 53, the number of the pixels having the positive value and displaying the first image H is substantially the same as the number of the pixels having the negative value and displaying the first image H, and the number of the pixels having the positive value and displaying the second image L is substantially the same as the number of the pixels having the negative value and displaying the second image L. In such an embodiment, the positive pixel and the negative pixel among the pixels displaying the first image H are adjacent in the column direction, and the positive pixel and the negative pixel among the pixels displaying the second image L are adjacent in the column direction, thereby obtaining a polarity offset effect.

As a result, according to the exemplary embodiment shown in FIG. 51 and FIG. 52, when the luminance of the pixel having the positive value and displaying the first image H, the luminance of the pixel having the negative value and displaying the first image H, the luminance of the pixel having the positive value and displaying the second image L, and the luminance of the pixel having the negative value and displaying the second image L are different from each other, the luminance difference of the pixels PX1, PX2 and PX3 displaying the first image H in the frames 1F, 2F, 3F and 4F may be offset and the luminance difference of the pixels PX1, PX2 and PX3 displaying the second image L may be offset. Accordingly, the luminance difference between the frames in the entire pixel PX is effectively prevented, and the flicker generated due to the luminance difference based on the different gamma curve is effectively prevented.

Figure 54:
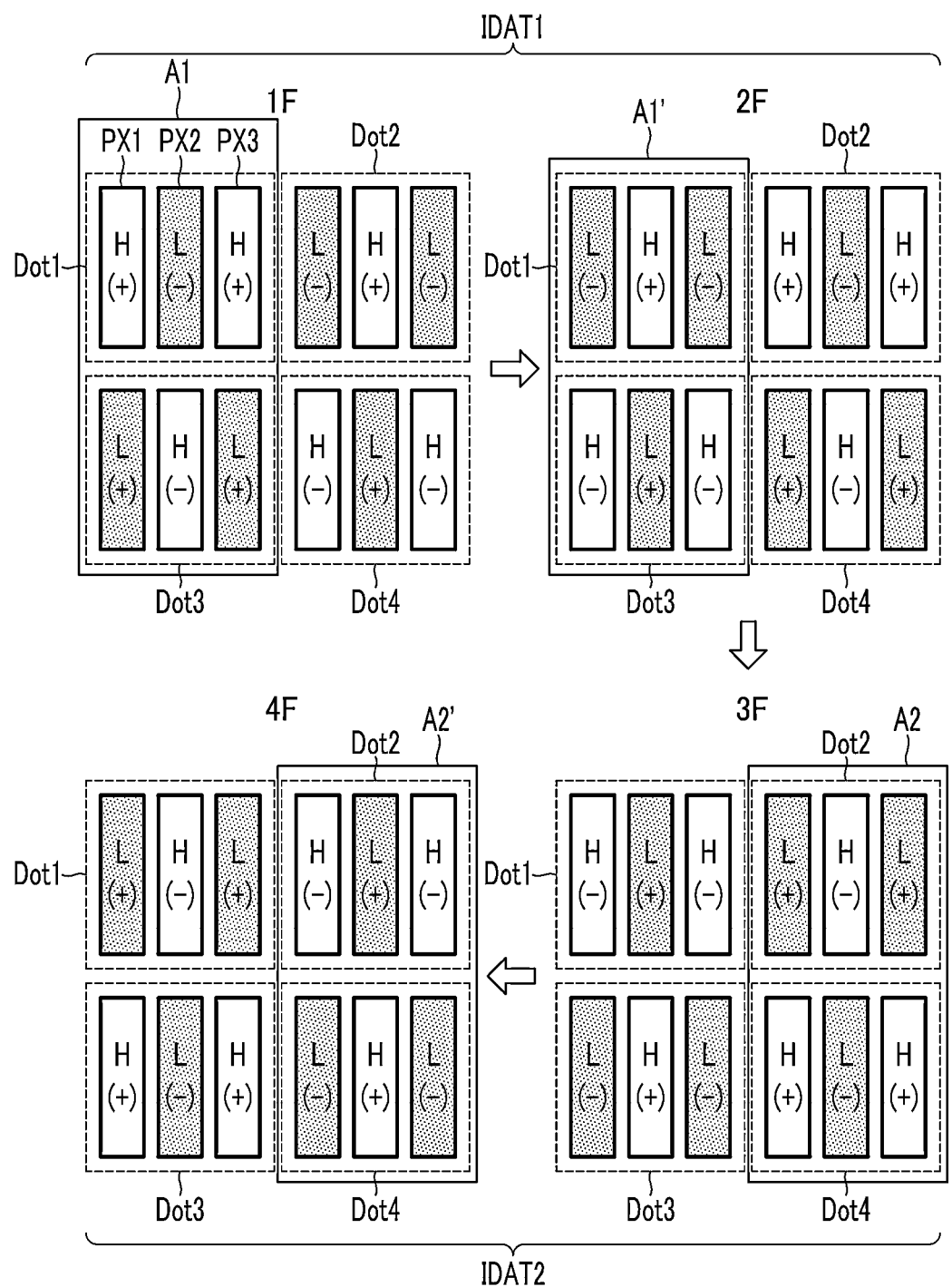

Referring to FIG. 54, the exemplary embodiment shown therein is substantially the same as the exemplary embodiment shown in FIG. 53, except for the polarity inversion pattern of all pixels PX1, PX2 and PX3 in a frame.

According to an exemplary embodiment, as shown in FIG. 54, the polarity of each of the pixels PX1, PX2 and PX3 is inverted every frame in a frame set, however the sequence of the polarity inversion of the frames may be opposite to each other in two adjacent frame sets. In one exemplary embodiment, for example, referring to the polarity of the first pixel PX1 of the first dot Dot1, the polarity may be positive in the first frame 1F of the first frame set, negative in the second frame 2F, positive in the third frame 3F of the second frame set, and positive in the fourth frame 4F. Referring to the polarity of the second pixel PX2 of the first dot Dot1, the polarity may be negative in the first frame 1F of the frame set, positive in the second frame 2F, positive in the third frame 3F of the second frame set, and negative in the fourth frame 4F.

In an exemplary embodiment, as shown in FIG. 54, referring to the pattern moving by one dot every frame set, the polarity of pixels displaying the first image H of the pixels displaying the first pattern image A1 in the first frame 1F is offset from the polarity of pixels displaying the first image H of the pixels displaying the fourth pattern image A2' in the fourth frame 4F, and the polarity of pixels displaying the second image L of the pixels displaying the first pattern image A1 in the first frame 1F is offset from the polarity of pixels displaying the second image L of the pixels displaying the fourth pattern image A2' in the fourth frame 4F. In such an embodiment, the polarity of the pixels displaying the first image H of the pixels displaying the second pattern image A1' in the second frame 2F and the polarity of the pixels displaying the first image H of the pixels displaying the third pattern image A2 in the third frame 3F are offset from each other, and the polarity of the pixels displaying the second image L of the pixels displaying the second pattern image A1' in the second frame 2F and the polarity of the pixels displaying the second image L of the pixels displaying the third pattern image A2 in the third frame 3F are offset from each other. Accordingly, the polarities of the pixels displaying the pattern moving by one dot every frame set are offset from each other such that the vertical line of the moving pattern is effectively prevented from being recognized. In an alternative exemplary embodiment, where the moving pattern is moved every two dots of the dots Dot1, Dot2, Dot3 and Dot4 for the frame set, the display deterioration such as the vertical line recognition by the polarity offset effect is effectively prevented.

Referring to FIG. 55 to FIG. 60, the exemplary embodiments of the driving method of the display device shown therein is substantially the same as the exemplary embodiments of the driving method of the display device, described above, except that a pixel PX may include at least two subpixels as in the exemplary embodiment of FIG. 7. In an exemplary embodiment, as shown in FIG. 55 to FIG. 60, each of pixels PX1, PX2 and PX3 includes the first subpixel PXa and the second subpixel PXb.

In an exemplary embodiment, the subpixels PXa and PXb of the pixel PX may display the images based on the different gamma curves, but not being limited thereto. In an alternative exemplary embodiment, the subpixels PXa and PXb may display the image of a same luminance based on a same gamma curve.

Figure 55:
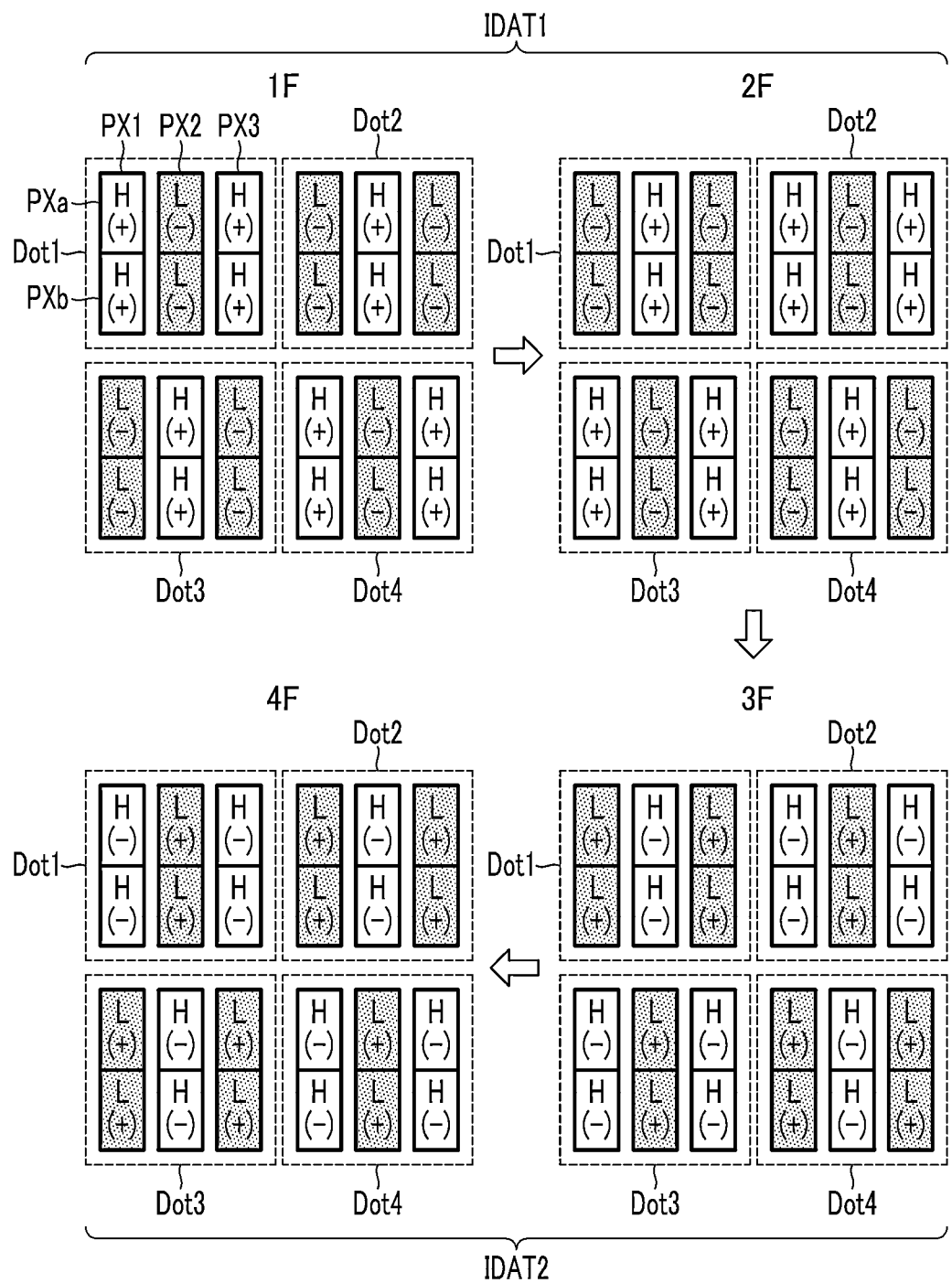

Referring to FIG. 55, an exemplary embodiment of the display device may be driven based on the same method as the exemplary embodiment shown in FIG. 44. In such an embodiment, the driving method of each of the pixels PX1, PX2 and PX3 may be substantially the same as the exemplary embodiment shown in FIG. 44 and FIG. 46 to FIG. 54, and the first subpixel PXa and the second subpixel PXb included in the pixels PX1, PX2 and PX3 may receive the data voltage Vd of the same polarity. In such an embodiment, as shown in FIG. 55, the first subpixel PXa and the second subpixel PXb display different images based on the same gamma curve.

In an alternative exemplary embodiment of the invention, the first and second subpixels PXa and PXb may display the image based on the different gamma curves.

Figure 56:
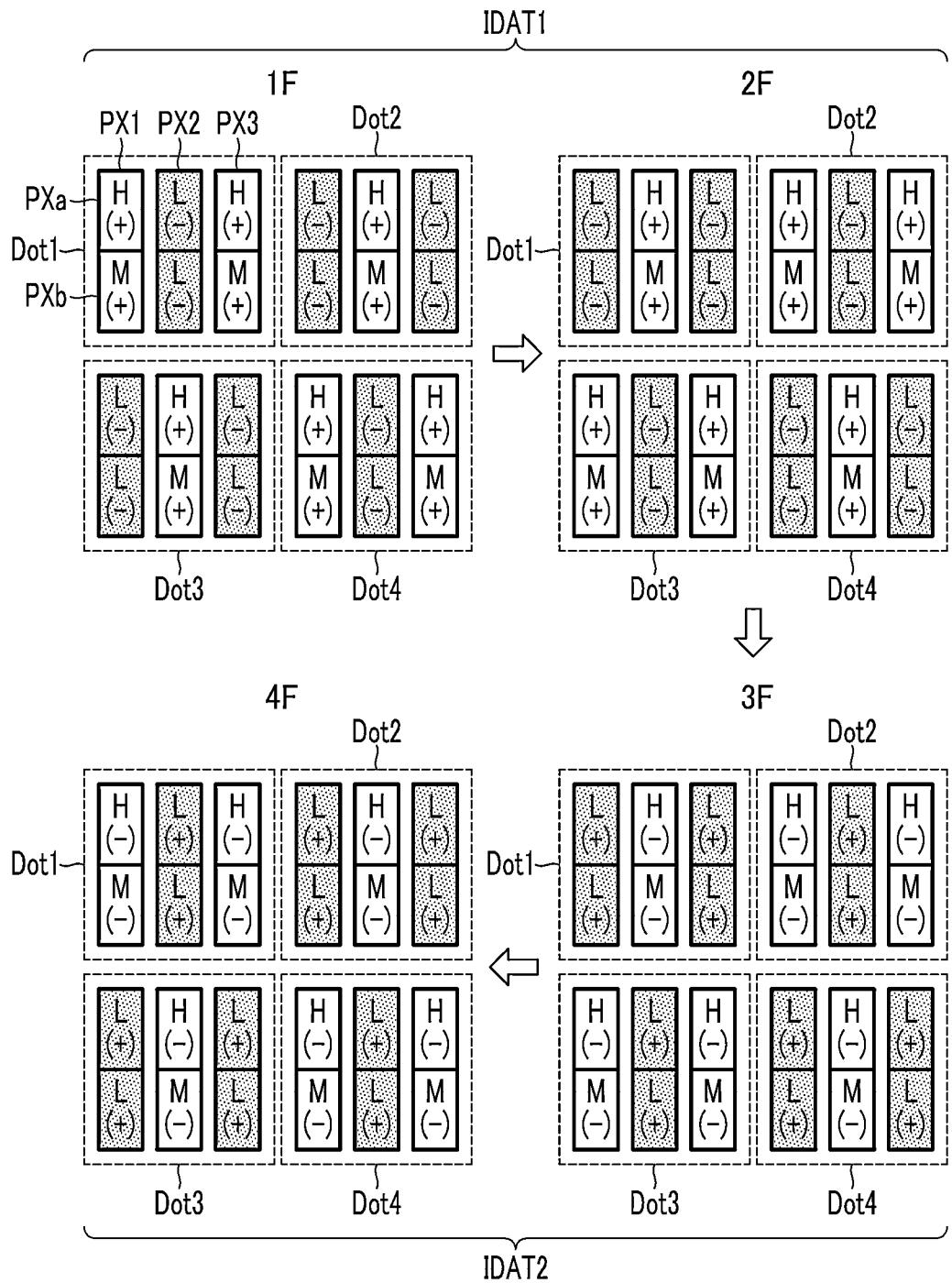
Figure 57:
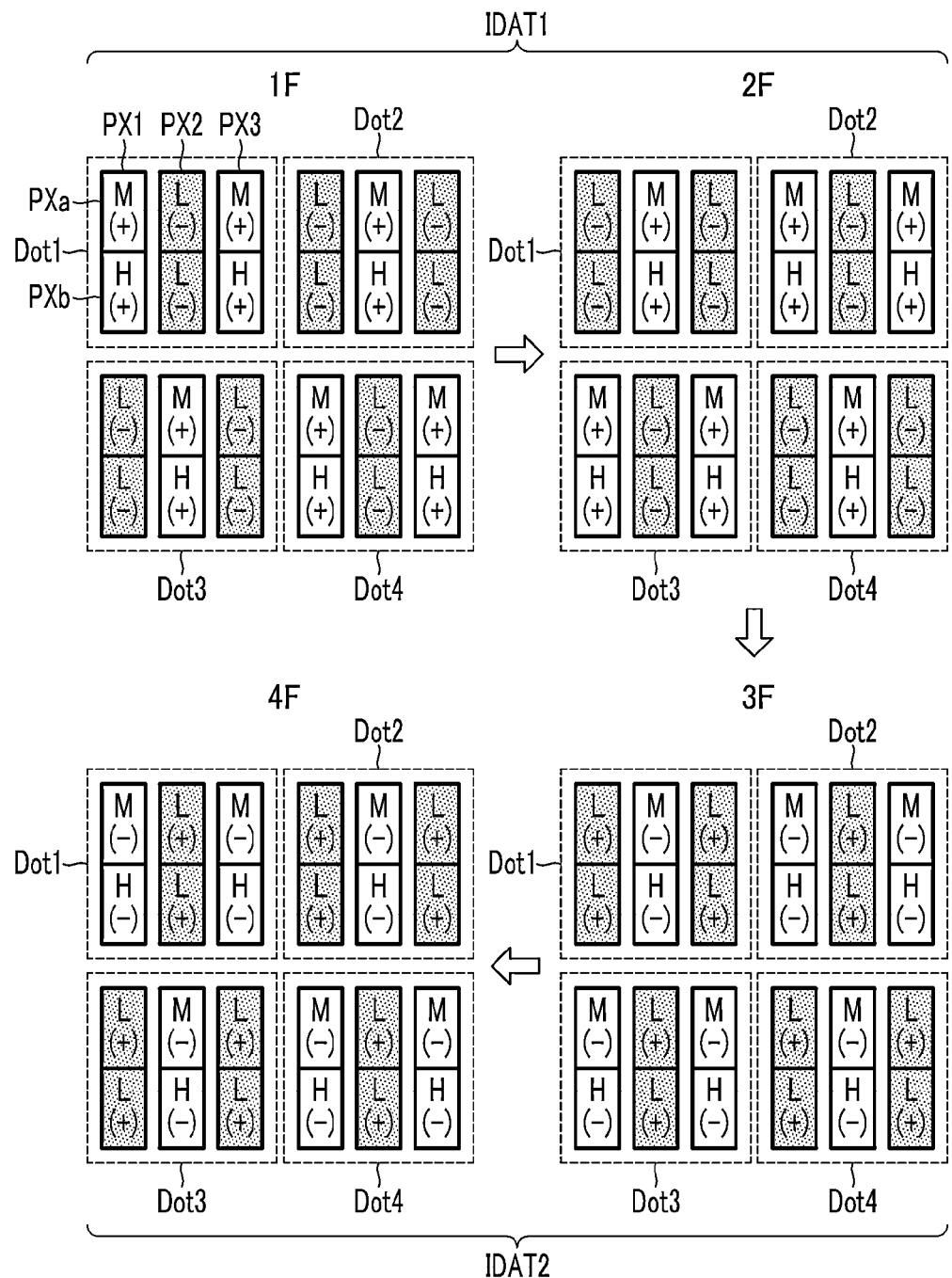

In one exemplary embodiment, for example, referring to FIG. 56, when the first subpixel PXa of the pixel PX corresponding to a pixel that displays the first image H in FIG. 55 displays the first image H, the second subpixel PXb of the pixel PX corresponding to the pixel that displays the first image H in FIG. 55 may display the third image M based on the third gamma curve GM shown in FIG. 17 or the second image L. In an exemplary embodiment, as shown in FIG. 57, the first subpixel PXa of the pixel PX corresponding to the pixel that displays the first image H in FIG. 55 may display the third image M, and the second subpixel PXb the pixel PX corresponding to the pixel that displays the first image H in FIG. 55 may display the first image H.

Figure 58:
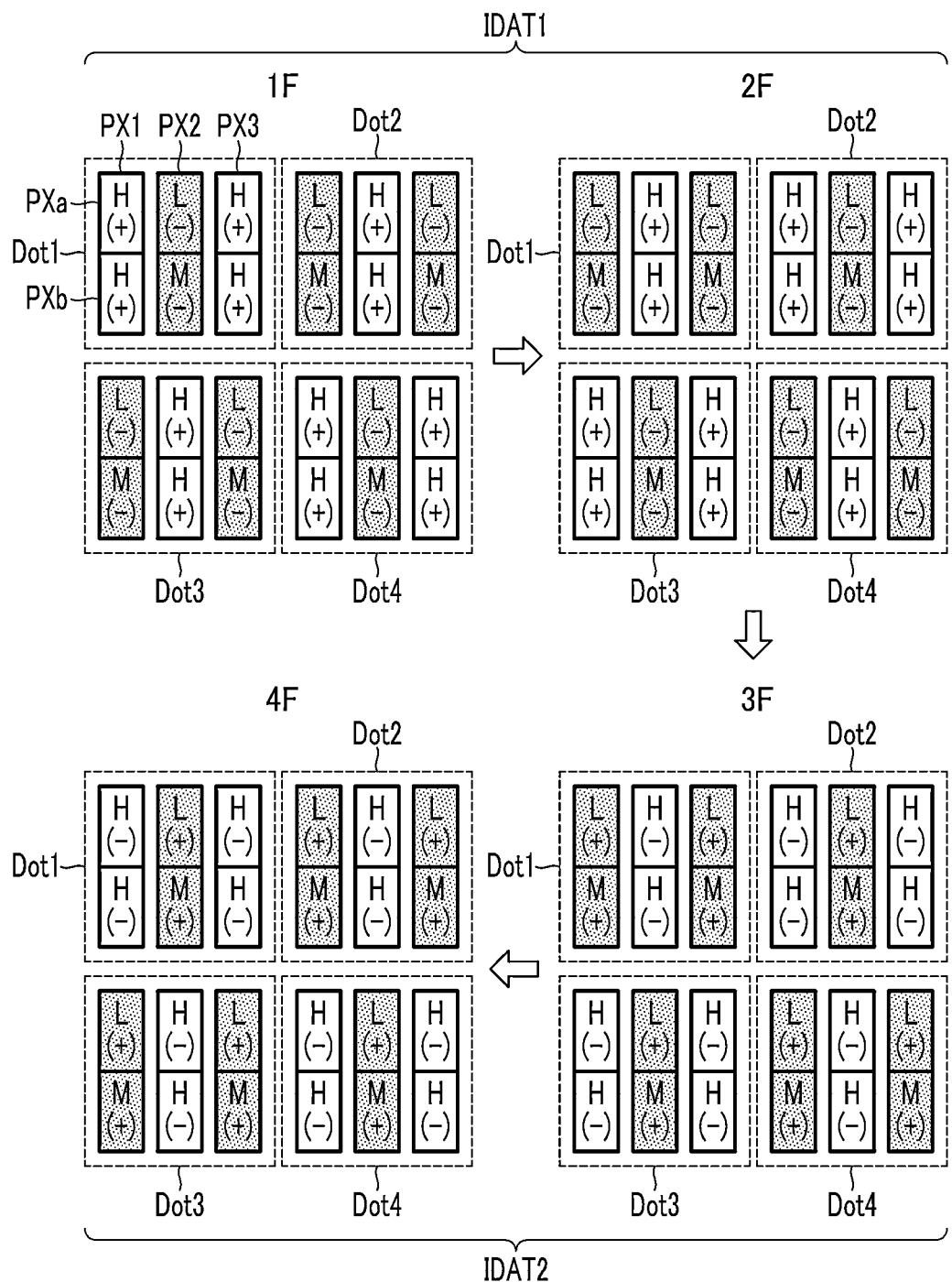

Referring to FIG. 58, in an exemplary embodiment, the pixel PX in which the first and second subpixels PXa and PXb both display the first image H and the pixel PX in which the first subpixel PXa displays the second image L and the second subpixel PXb displays the third image M may be alternately arranged in the row direction or the column direction.

Figure 59:
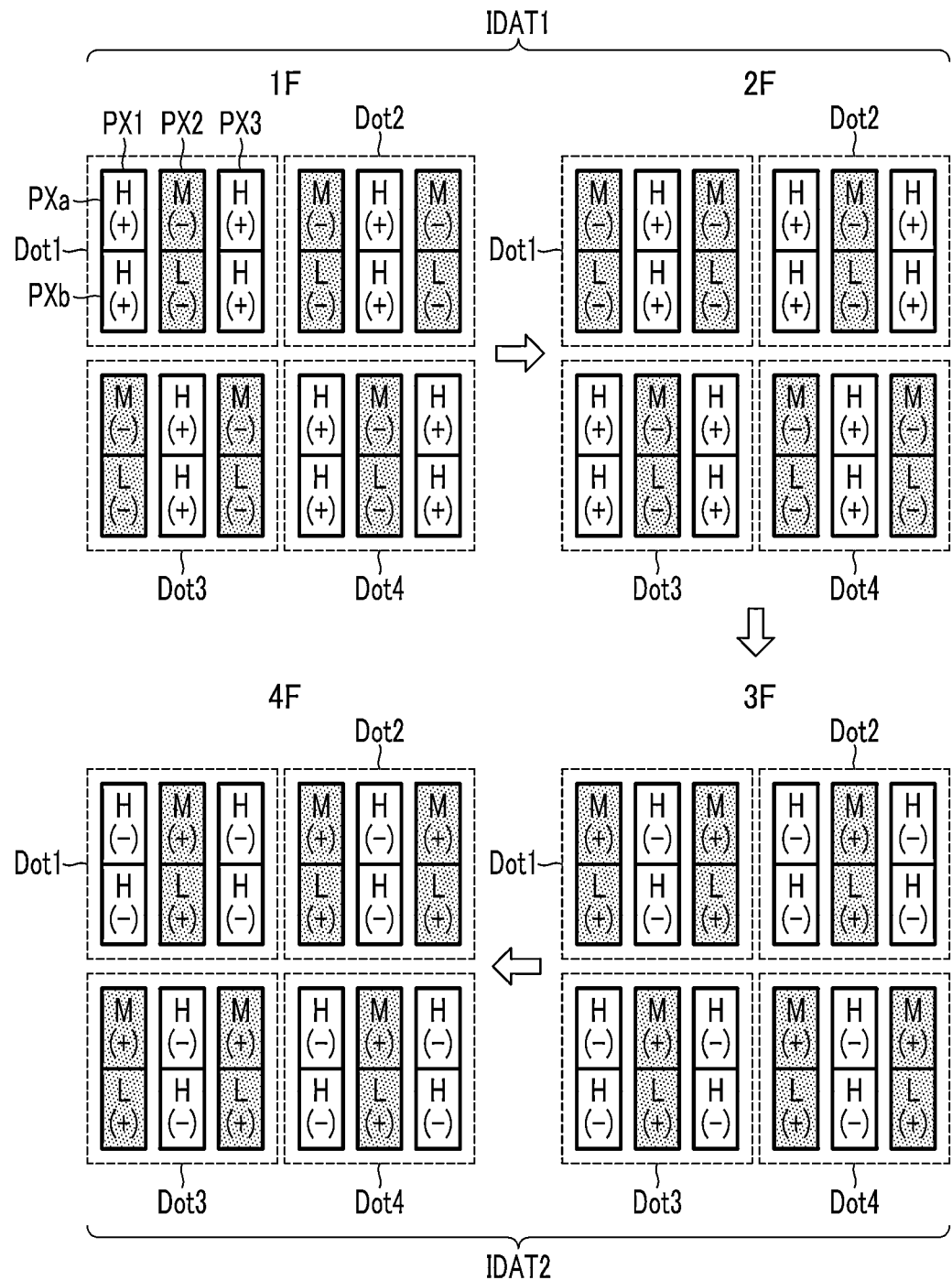

In an exemplary embodiment, as shown in FIG. 59, a position of the second image L and the third image M displayed by the first and second subpixels PXa and PXb may be different from the position of the second image L and the third image M displayed by the first and second subpixels PXa and PXb of the exemplary embodiment shown in FIG. 58.

Figure 60:
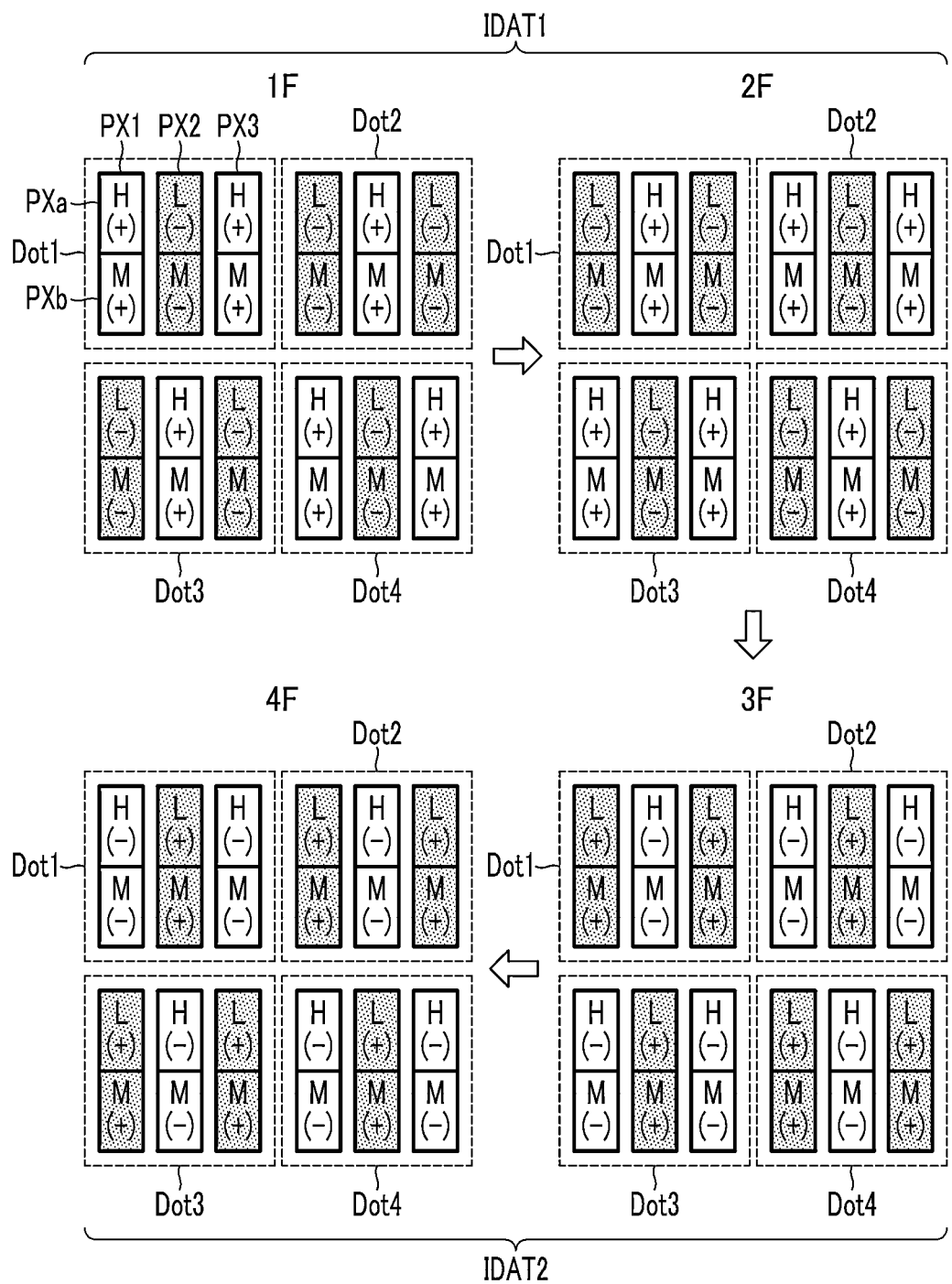

Referring to FIG. 60, the pixel PX in which the first subpixel PXa displays the first image H and the second subpixel PXb displays the third image M and the pixel PX in which the first subpixel PXa displays the second image L and the second subpixel PXb displays the third image M may be alternately arranged in the row direction or the column direction. In an alternative exemplary embodiment of the invention, the display device may display the image based on four or more gamma curves, and in such an embodiment, the third image M displayed by the subpixels PXa and PXb of two adjacent pixels PX in the row direction or the column direction shown in FIG. 60 may be based on different gamma curve.

In the exemplary embodiments shown in FIG. 55 to FIG. 60, the gamma curve for the image of the first and second subpixels PXa and PXb included in each pixel PX may be exchanged. In one exemplary embodiment, for example, as shown in FIG. 60, when the first subpixel PXa of a pixel PX displays the first image H and the second subpixel PXb of the pixel displays the third image M, the first subpixel PXa of an adjacent pixel PX, which is adjacent to the pixel in the row direction or the column direction, displays the third image M and the second subpixel PXb of the adjacent pixel PX displays the second image L. In such an embodiment, the third image M displayed by the subpixels PXa and PXb of two pixels PX may be based on different gamma curves.

In an alternative exemplary embodiment, the first subpixel PXa and the second subpixel PXb may collectively display an image by combining different images based on three or more gamma curves to improve the lateral visibility. In the exemplary embodiments shown in FIG. 55 to FIG. 60, two subpixels PXa and PXb of a pixel PX1, PX2 or PX3 of a dot display the image of the same polarity, however it is not limited thereto. In an alternative exemplary embodiment, as shown in the other exemplary embodiments described above, two subpixels PXa and PXb of a pixel may display the image of the different polarity.

In the several exemplary embodiments shown in FIG. 44 to FIG. 60, the image displayed by two pixels of the pixels PX1, PX2 and PX3 included in the different dots of the dots Dot1, Dot2, Dot3 and Dot4 and representing the same color among the neighboring pixels PX1, PX2 and PX3 may be based on the different gamma curves.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
   a memory which stores gamma data corresponding to a plurality of gamma curves including a first gamma curve and a second gamma curve that are different from each other;
   a gray voltage generator which generates a plurality of gray voltages based on the gamma data;
   a signal controller which receives input image signals;
   a data driver which receives the input image signals from the signal controller and converts the input image signal into data voltages using the gray voltages; and
   a display panel comprising a plurality of pixels which receive the data voltages and displays images,
   wherein
   a pixel of the pixels displays a plurality of images corresponding to a first input image signal during a first frame set comprising a plurality of consecutive frames, and displays a plurality of images corresponding to a second input image signal during a second flame set directly following the first frame set and comprising a plurality of consecutive frames, during each of the first frame set and the second frame set, the images displayed by the pixel includes a first image based on the first gamma curve and a second image based on the second gamma curve, a luminance of the first image is equal to or greater than a luminance of the second image, the second image is displayed by the pixel in two consecutive frames, and a temporal gamma sequence of the images displayed by the pixel in the first frame set is opposite to a temporal gamma sequence of the images displayed by the pixel in the second frame set.

2. The display device of claim 1, wherein
the first frame set includes three or more consecutive frames,
the first image is displayed during one frame in the first frame set, and
the second image is displayed during two or more consecutive frames in the first frame set.

3. The display device of claim 2, wherein
the memory further stores gamma data for a third gamma curve different from the first and second gamma curves,
the pixel further displays a third image based on the third gamma curve in the first frame set,
a luminance of the third image is equal to or less than the luminance of the first image, and
the luminance of the third image is equal to or greater than the luminance of the second image.

4. The display device of claim 3, wherein
the pixels comprise a first pixel and a second pixel, which are adjacent to each other and receive different input image signals during the first frame set,
each of the first pixel and the second pixel display a plurality of images corresponding to a same input image signal during the first frame set,
the images displayed by each of the first pixel and the second pixel during the first frame set includes the first image and the second image, and
the first and second pixels display images based on different gamma curves during a frame of the frame set.

5. The display device of claim 1, wherein
the memory further stores gamma data for a third gamma curve different from the first and second gamma curves,
the pixel further displays a third image based on the third gamma curve in the first frame set,
a luminance of the third image is equal to or less than the luminance of the first image, and
the luminance of the third image is equal to or greater than the luminance of the second image.

6. The display device of claim 5, wherein
the first frame set includes three or more consecutive frames.

7. The display device of claim 6, wherein
the frame in which the pixel displays the third image is between the frame in which the pixel displays the first image and the frame in which the pixel displays the second image in the first frame set.

8. The display device of claim 5, wherein
the third image is displayed in two consecutive frames.

9. The display device of claim 8, wherein
the pixels comprise a first pixel and a second pixel, which are adjacent to each other and receive different input image signals during the first frame set,
each of the first pixel and the second pixel display a plurality of images corresponding to a same input image signal during the first frame set,
the images displayed by each of the first pixel and the second pixel during the first frame set includes the first image and the second image, and
the first and second pixels display images based on different gamma curves during a frame of the first frame set.

10. The display device of claim 5, wherein
the memory further stores gamma data for a fourth gamma curve different from the first, second and third second gamma curves,
the pixel further displays a fourth image based on the fourth gamma curve during the first frame set,
a luminance of the fourth image is equal to or less than the luminance of the third image, and
the luminance of the fourth image is equal to or greater than the luminance of the second image.

11. The display device of claim 10, wherein
the frame in which the pixel displays the fourth image is between the frame in which the pixel displays the third image and the frame in which the pixel displays the second image in the first frame set.

12. The display device of claim 11, wherein
the pixels comprise a first pixel and a second pixel which are adjacent to each other and receive different input image signals during the first frame set,
each of the first pixel and the second pixel display images corresponding to a same input image signal during the first frame set including a plurality of consecutive frames,
each of the images displayed by the first pixel and the second pixel during the first frame set includes the first image and the second image, and
a gamma curve for the image displayed by the first pixel is different from a gamma curve for the image displayed by the second pixel during a frame of the first frame set.

13. The display device of claim 1, wherein
the pixel comprises a first subpixel and a second subpixel which receives a same input image signal during the first frame set,
each of the first subpixel and the second subpixel display a plurality of images corresponding to the same input image signal during the first frame set,
the second image is displayed by one of the first subpixel and the second subpixel, and
the second image displayed by the one of the first subpixel and the second subpixel is displayed in two consecutive frames.

14. The display device of claim 13, wherein
a temporal gamma sequence of the images displayed by the first and second subpixels in the first frame set is opposite to a temporal gamma sequence of the images displayed by the first and second subpixels in the second frame set.

15. The display device of claim 14, wherein
the first frame set includes three or more consecutive frames.

16. The display device of claim 15, wherein
the memory further stores gamma data for a third gamma curve different from the first and second gamma curves, at least one of the first subpixel and the second subpixel further displays a third image based on the third gamma curve in the first frame set, a luminance of the third image is equal to or less than the luminance of the first image, and the luminance of the third image is equal to or greater than the luminance of the second image.

17. The display device of claim 16, wherein the pixels comprise a first pixel and a second pixel, which are adjacent to each other and receive different input image signals during the first frame set, each of the first pixel and the second pixel comprises the first subpixel and the second subpixel which receives a same input image signal during the first frame set, each of the first pixel and the second pixel displays a plurality of images corresponding to a corresponding input image signal of the different input image signals during the first frame set, and the first and second pixels display images based on different gamma curves during a frame of the first frame set.

18. The display device of claim 13, wherein the pixels comprise a first pixel and a second pixel which are adjacent to each other and display images corresponding to different input image signals, each of the first pixel and the second pixel comprises the first subpixel and the second subpixel, each of the first pixel and the second pixel displays a plurality of images corresponding to a same input image signal during the first frame set, and the first and second pixels display images based on different gamma curves during a frame of the first frame set.

19. The display device of claim 13, wherein the memory further stores gamma data for a third gamma curve different from the first and second gamma curves, at least one of the first subpixel and the second subpixel further displays a third image based on the third gamma curve in the first frame set, a luminance of the third image is equal to or less than the luminance of the first image, and the luminance of the third image is equal to or greater than the luminance of the second image.

20. The display device of claim 19, wherein the first frame set includes three or more consecutive frames.

21. The display device of claim 20, wherein a frame in which the third image is displayed by one of the first subpixel and the second subpixel is between a frame in which the first image is displayed by the one of the first subpixel and the second subpixel and a frame in which the second image is displayed by the one of the first subpixel and the second subpixel, in the first frame set.

22. The display device of claim 21, wherein a temporal gamma sequence of the images displayed by the first and second subpixels in the first frame set is opposite to a temporal gamma sequence of the images displayed by the first and second subpixels in the second frame set.

23. The display device of claim 19, wherein the third image displayed by one of the first subpixel and the second subpixel is displayed in two consecutive frames.

24. The display device of claim 23, wherein the pixels comprise a first pixel and a second pixel which are adjacent to each other and receive different input image signals during the first frame set, each of the first pixel and the second pixel comprises the first subpixel and the second subpixel, each of the first pixel and the second pixel displays images corresponding to a same input image signal during the first frame set, and a gamma curve, based on which an image is displayed by at least one of the first subpixel and the second subpixel of the first pixel, is different from a gamma curve, based on which an image is displayed by at least one of the first subpixel and the second subpixel of the second pixel, during a frame of the first frame set.

25. The display device of claim 19, wherein the memory further stores gamma data for a fourth gamma curve different from the first, second and third gamma curves, at least one of the first subpixel and the second subpixel further display a fourth image based on the fourth gamma curve in the first frame set, a luminance of the fourth image is equal to or less than the luminance of the third image, and the luminance of the fourth image is equal to or greater than the luminance of the second image.

26. The display device of claim 25, wherein the frame in which the fourth image is displayed by one of the first subpixel and the second subpixel is between the frame in which the third image is displayed by the first of the first subpixel and the second subpixel and the frame in which the second image is displayed by the one of the first subpixel and the second subpixel in the first frame set.

27. The display device of claim 26, wherein a temporal gamma sequence of the images displayed by the first and second subpixels in the frame set is opposite to a temporal gamma sequence of the images displayed by the first and second subpixels in the second frame set.

28. The display device of claim 27, wherein the pixels comprise a first pixel and a second pixel which are adjacent to each other and receive different input image signals during the first frame set, each of the first pixel and the second pixel comprises the first subpixel and the second subpixel, each of the first pixel and the second pixel displays a plurality of images corresponding to a same input image signal during the first frame set, and a gamma curve, based on which an image is displayed by at least one of the first subpixel and the second subpixel of the first pixel is different from a gamma curve, based on which an image is displayed by at least one of the first subpixel and the second subpixel of the second pixel, during a frame of the first frame set.

29. The display device of claim 1, wherein the pixels comprise a first pixel and a second pixel, which are adjacent to each other and receive different input image signals during the first frame set, each of the first pixel and the second pixel displays a plurality of images corresponding to a same input image signal during the first frame set, each of the images displayed by the first pixel and the second pixel during the first frame set includes the first image and the second image, and the second pixel displays the second image when the first pixel displays the first image in a frame of the first frame set.

30. The display device of claim 1, further comprising:
a backlight unit which provides light to the display panel, wherein the first frame set includes a first frame and a second frame following the first frame,
the pixel displays the first image in the first frame and displays the second image in the second frame, and
the backlight unit provides light having a first luminance to the display panel in the first frame and light having a second luminance, which is lower than the first luminance, to the display panel in the second frame.

31. The display device of claim 30, wherein
a luminance of the second image displayed in the second frame is substantially zero, and
the backlight unit is turned off during the second frame and does not provide light to the pixel.

32. The display device of claim 30, wherein
the backlight unit is turned on during a first period in the second frame to provide light to the pixel, and
a duty ratio of the first period is less than one.

33. The display device of claim 1, further comprising:
a backlight unit which provides light to the display panel, wherein the frame set includes a first frame and a second frame following the first frame,
the pixel displays the second image in the first frame and displays the first image in the second frame, and
luminance of the light provided to the pixel by the backlight unit in the second frame is higher than luminance of the light provided to the pixel by the backlight unit in the first frame.

34. The display device of claim 33, wherein
a luminance of the second image displayed in the first frame is substantially zero, or
a luminance of the first image displayed in the second frame is a highest luminance.

35. The display device of claim 1, wherein
the display panel further comprises a liquid crystal layer comprising a plurality of liquid crystal molecules, and
when the pixel displays an image of a second luminance lower than a first luminance after the pixel displays an image of the first luminance in two adjacent frames, a response speed of the liquid crystal molecules is less than or equal to about 4.17 milliseconds when a frame frequency is about 240 hertz and a luminance of the image displayed by the pixel is changed from about 99% to about 1% of a difference between the first luminance and the second luminance.

36. The display device of claim 1, wherein
the display panel further comprises a liquid crystal layer comprising a plurality of liquid crystal molecules, and
when the pixel displays an image of a second luminance less than a first luminance after the pixel displays an image of the first luminance in two adjacent frames, a response speed of the liquid crystal molecules is less than or equal to about 8.3 milliseconds when a frame frequency is about 120 hertz and a luminance of the image displayed by the pixel is changed from about 99% to about 1% of a difference between the first luminance and the second luminance.

37. The display device of claim 1, wherein
the display panel further comprises a plurality of data lines which transmit the data voltages, and
polarities of data voltages applied to two adjacent data lines are opposite to each other.

38. The display device of claim 37, wherein
the pixels arranged in a pixel column direction are alternately connected to two different data lines.

39. The display device of claim 38, wherein
a polarity of the data voltage applied to the plurality of pixels is inverted every frame.

40. The display device of claim 37, wherein
the pixels arranged in a pixel column direction are connected to a same data line.

41. The display device of claim 40, wherein
a polarity of the data voltage applied to the plurality of pixels is inverted every frame.

42. The display device of claim 40, wherein
a polarity of the data voltage applied to the plurality of pixels is inverted every n frames, wherein n is a natural umber greater than two.

43. The display device of claim 1, wherein
the first image and the second image for the first pixel are alternately displayed during the first frame set.

44. The display device of claim 43, wherein
polarities of data voltages applied to two adjacent data lines are opposite to each other.

45. The display device of claim 44, wherein
the pixels arranged in a pixel column direction are alternately connected to two different data lines.

46. The display device of claim 45, wherein
a polarity of the data voltage applied to the plurality of pixels is inverted every frame.

47. The display device of claim 45, wherein
a polarity of the data voltage applied to the plurality of pixels is inverted every n frames, wherein n is a natural number greater than one.

48. The method display device of claim 44, wherein
the pixels arranged in a pixel column direction are connected to a same data line.

49. The display device of claim 48, wherein
a polarity of the data voltage applied to the plurality of pixels is inverted every frame.

50. The display device of claim 48, wherein
a polarity of the data voltage applied to the plurality of pixels is inverted every n frames, wherein n is a natural number greater than one.

51. The display device of claim 50, wherein
a polarity arrangement sequence of the data voltage applied to the first pixel in the first frame set is opposite to a polarity arrangement sequence of the data voltage applied to the first pixel in a second frame set following the first frame set.

52. The display device claim 1, wherein
each of the first pixel and the second pixel comprises a first subpixel and a second subpixel.

53. A method of driving a display device, the display device including a memory storing gamma data for a plurality of gamma curves including a first gamma curve and a second gamma curve that are different from each other, a gray voltage generator, a signal controller, a data driver, and a display panel comprising a plurality of pixels, the method comprising:
receiving input image signals by the signal controller;
generating a plurality of gray voltages based on the gamma data by the gray voltage generator;
receiving the input image signals from the signal controller and converting the input image signals into data voltages using the gray voltages by the data driver;
displaying a plurality of images corresponding to a first input image signal by a pixel during a first frame set including a plurality of consecutive frames by the display panel; and displaying a plurality of images corresponding to a second input image signal by the pixel during a second frame set directly following the first frame set and comprising a plurality of consecutive frames by the display panel, wherein during each of the first frame set and the second frame set, the images displayed by the pixel includes a first image based on the first gamma curve and a second image based on the second gamma curve, a luminance of the first image is equal to or greater than a luminance of the second image, the second image is displayed by the same pixel in two consecutive frames, and a temporal gamma sequence of the images displayed by the pixel in the first frame set is opposite to a temporal gamma sequence of the images displayed by the pixel in the second frame set.

54. The method of claim 53, wherein
the pixels comprise a first pixel and a second pixel which are adjacent to each other and receive different input image signals during the first frame set,
each of the first pixel and the second pixel display a plurality of images corresponding to a same input image signal during the first frame set,
the images displayed by each of the first pixel and the second pixel during the first frame set includes the first image and the second image, and
the first and second pixels display images based on different gamma curves during a frame of the first frame set.

55. The method of claim 53, wherein
the pixel comprises a first subpixel and a second subpixel which receive the same input image signal,
each of the first subpixel and the second subpixel displays a plurality of images corresponding to the same input image signal during the first frame set, and
the second image displayed by one of the first subpixel and the second subpixel is displayed in two consecutive frames.

56. The method of claim 53, wherein
the display panel further comprises a plurality of data lines which transmit the data voltages, and
polarities of data voltages applied to two adjacent data lines are opposite to each other.

57. The method of claim 56, wherein
the pixels arranged in a pixel column direction are alternately connected to two different data lines of the display device.

58. The method of claim 57, wherein
a polarity of the data voltage applied to the pixels is inverted every frame.

59. The method of claim 57, wherein
a polarity of the data voltage applied to the pixels is inverted every n frames, wherein n is a natural umber greater than two.

60. The display device of claim 57, wherein
a polarity of the data voltage applied to the plurality of pixels is inverted every n frames, wherein n is a natural umber greater than two.

61. The method of claim 56, wherein
the pixels arranged in a pixel column direction are connected to a same data line.

62. The method of claim 61, wherein
a polarity of the data voltage applied to the pixels is inverted every frame.

63. The method of claim 61, wherein
a polarity of the data voltage applied to the plurality of pixels is inverted every n frames, wherein n is a natural number greater than two.

64. The method of claim 53, wherein
the first image and the second image for the first pixel are alternately displayed during the first frame set.

65. The method of claim 64, wherein
polarities of data voltages applied to two adjacent data lines are opposite to each other.

66. The method of claim 65, wherein
the pixels arranged in a pixel column direction are alternately connected to two different data lines.

67. The method of claim 66, wherein
a polarity of the data voltage applied to the pixels is inverted every frame.

68. The method of claim 66, wherein
a polarity of the data voltage applied to the pixels is inverted every n frames, wherein n is a natural number greater than two.

69. The method of claim 65, wherein
the pixels arranged in a pixel column direction are connected to a same data line.

70. The method of claim 69, wherein
a polarity of the data voltage applied to the pixels is inverted every frame.

71. The method of claim 69, wherein
a polarity of the data voltage applied to the pixels is inverted every n frames, wherein n is a natural number greater than two.

72. The method of claim 71, wherein
a polarity arrangement sequence of the data voltage applied to the first pixel in the first frame set is opposite to a polarity arrangement sequence of the data voltage applied to the first pixel in a second frame set following the first frame set.

73. The method of claim 53, wherein
each of the first pixel and the second pixel comprises a first subpixel and a second subpixel.

* * * * *